USO10524157B2

United States Patent
Cho et al.

(10) Patent No.: US 10,524,157 B2
(45) Date of Patent: Dec. 31, 2019

(54) METHOD FOR TRANSMITTING AND RECEIVING DATA IN WIRELESS COMMUNICATION SYSTEM AND APPARATUS SUPPORTING THE SAME

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,770

(22) PCT Filed: Aug. 26, 2016

(86) PCT No.: PCT/KR2016/009556
§ 371 (c)(1),
(2) Date: May 4, 2018

(87) PCT Pub. No.: WO2017/078259
PCT Pub. Date: May 11, 2017

(65) Prior Publication Data
US 2018/0324632 A1    Nov. 8, 2018

Related U.S. Application Data

(60) Provisional application No. 62/251,112, filed on Nov. 5, 2015, provisional application No. 62/335,618, filed on May 12, 2016.

(51) Int. Cl.
*H04L 12/26*      (2006.01)
*H04W 28/02*     (2009.01)
(Continued)

(52) U.S. Cl.
CPC ....... *H04W 28/0268* (2013.01); *H04W 28/02* (2013.01); *H04W 28/24* (2013.01);
(Continued)

(58) Field of Classification Search
CPC . H04W 28/02; H04W 28/0268; H04W 28/24; H04W 48/14; H04W 76/10; H04W 76/22; H04W 76/25; H04W 76/27
See application file for complete search history.

(56) References Cited

U.S. PATENT DOCUMENTS

2005/0015493 A1   1/2005   Anschutz et al.
2007/0155376 A1*   7/2007   Payyappilly .......... H04W 76/22
                                                               455/422.1
(Continued)

FOREIGN PATENT DOCUMENTS

EP          1 782 584 B1    8/2011
WO    WO 2006/038083 A1    4/2006

*Primary Examiner* — Minh Trang T Nguyen
(74) *Attorney, Agent, or Firm* — Birch, Stewart, Kolasch & Birch, LLP

(57) ABSTRACT

The present invention relates to a method and apparatus for transmitting and receiving data performed by a base station in a wireless communication system. The present invention may provide a method and apparatus for receiving a first message requesting a first service quality from a device, selecting a first session for transmitting the first message according to a specific reference among at least one preconfigured session, transmitting a configuration change request message that requests a configuration change of the first session based on the first service quality to a network node, receiving a configuration change response message indicating a configuration change result in response to the configuration change request message, and transmitting the first message through the first session and the second session according to the configuration change response message.

13 Claims, 51 Drawing Sheets

(51) Int. Cl.
  *H04W 76/10* (2018.01)
  *H04W 76/25* (2018.01)
  *H04W 28/24* (2009.01)
  *H04W 48/14* (2009.01)
  *H04W 76/22* (2018.01)
  *H04W 76/27* (2018.01)

(52) U.S. Cl.
  CPC ........... *H04W 48/14* (2013.01); *H04W 76/10* (2018.02); *H04W 76/22* (2018.02); *H04W 76/25* (2018.02); *H04W 76/27* (2018.02)

(56) References Cited

U.S. PATENT DOCUMENTS

| | | |
|---|---|---|
| 2008/0132269 A1 | 6/2008 | Shen et al. |
| 2013/0003566 A1 | 1/2013 | Munoz De La Torre Alonso et al. |
| 2014/0064070 A1* | 3/2014 | Paladugu ............ H04L 47/2475 370/230 |
| 2014/0313974 A1* | 10/2014 | Chandramouli ........ H04W 4/06 370/328 |

* cited by examiner

R/R/E/LCID sub-header

Fig. 12
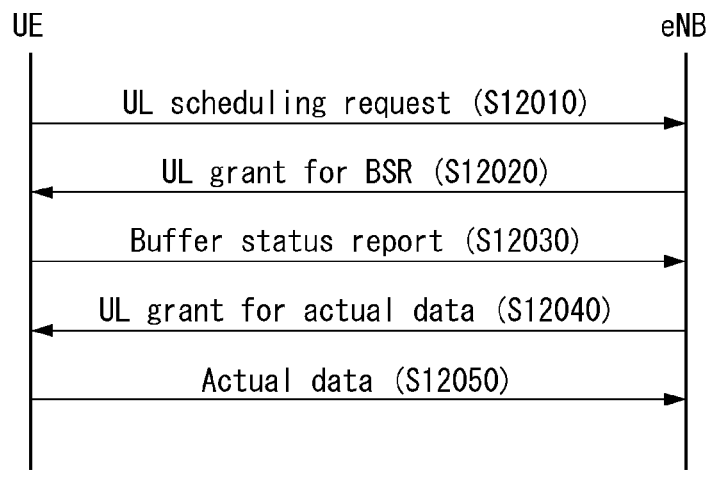
(a)
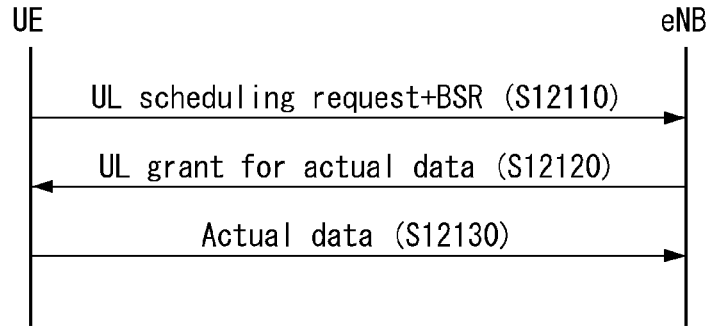
(b)

Fig. 27

| Use case category | User Experienced Data Rate | E2E Latency | Mobility |
|---|---|---|---|
| Broadband access in dense areas | DL: 300 Mbps<br>UL: 50 Mbps | 10 ms | On demand,<br>0-100 km/h |
| Indoor ultra-high broadband access | DL: 1 Gbps,<br>UL: 500 Mbps | 10 ms | Pedestrian |
| Broadband access in a crowd | DL: 25 Mbps<br>UL: 50 Mbps | 10 ms | Pedestrian |
| 50+ Mbps everywhere | DL: 50 Mbps<br>UL: 25 Mbps | 10 ms | 0-120 km/h |
| Ultra low-cost broadband access for low ARPU areas | DL: 10 Mbps<br>UL: 10 Mbps | 50 ms | on demand:<br>0-50 km/h |
| Mobile broadband in vehicles (cars, trains) | DL: 50 Mbps<br>UL: 25 Mbps | 10 ms | On demand, up to 500 km/h |
| Airplanes connectivity | DL: 15 Mbps per user<br>UL: 7.5 Mbps per user | 10 ms | Up to 1000 km/h |
| Massive low-cost/long-range/low-power MTC | Low<br>(typically 1-100 kbps) | Seconds to hours | On demand,<br>0-500 km/h |
| Broadband MTC | See the requirements for the Broadband access in dense areas and 50+Mbps everywhere categories | | |
| Ultra low latency | DL: 50 Mbps<br>UL: 25 Mbps | <1 ms | Pedestrian |
| Resilience and traffic surge | DL: 0.1-1 Mbps<br>UL: 25 Mbps | Regular communication: not critical | 0-120 km/h |
| Ultra-high reliability & Ultra low latency | DL: From 50 kbps to 10 Mbps;<br>UL: From a few bps to 10 Mbps | 1 ms | on demand:<br>0-500 km/h |
| Ultra-high availability and reliability | DL: 10 Mbps<br>UL: 10 Mbps | 10 ms | on demand:<br>0-500 km/h |
| Broadcast like services | DL: Up to 200 Mbps<br>UL: Modest (e.g. 500kbps) | <100 ms | on demand:<br>0-500 km/h |

Fig. 33
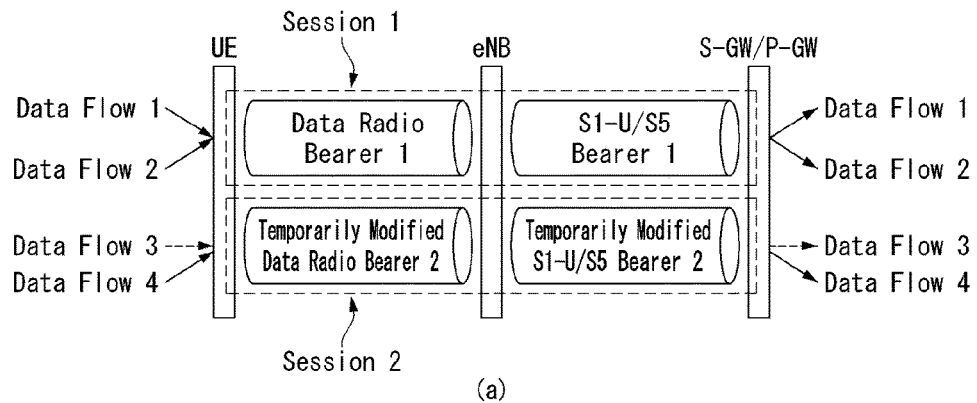
(a)
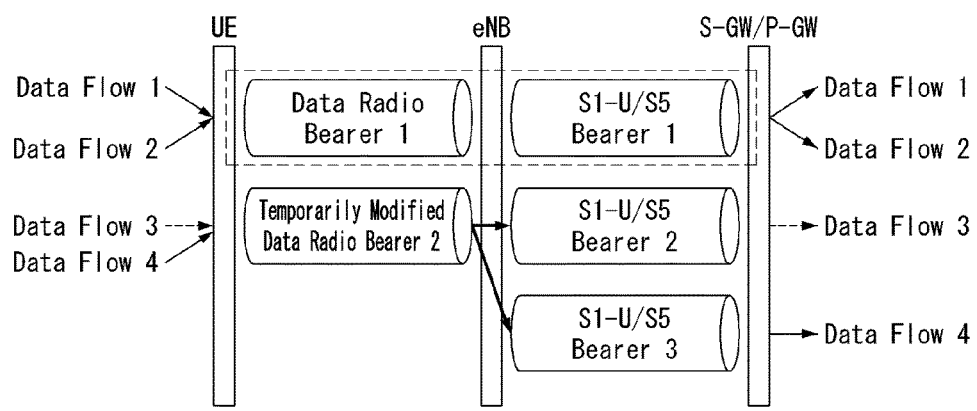
(b)

Fig. 34
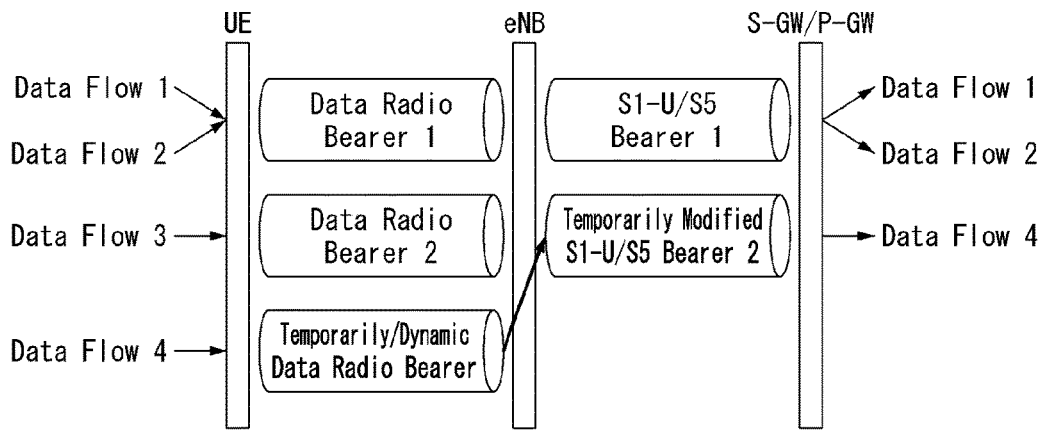
(a)
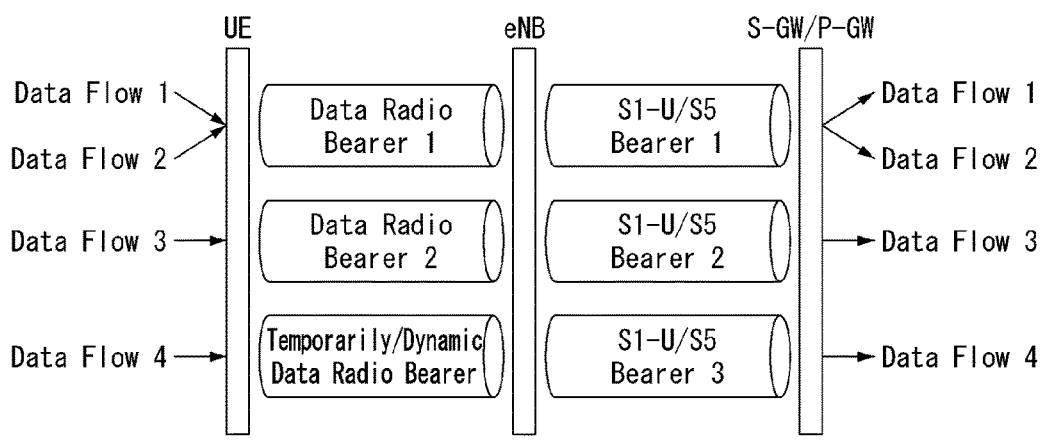
(b)

BSR MAC Sub-header

Fig. 49

| R | PI | E | Selected LCID |
|---|----|---|---------------|
| F |    |   | L             |

(a) MAC Sub-header Type 1

| R | PI | E | Selected LCID |
|---|----|---|---------------|
| F |    |   | L             |
| L |    |   |               |

(b) MAC Sub-header Type 1

| Priority Level |
|----------------|

(c) MAC CE

Fig. 50

| D/C | R | PI | R | PDCP SN |
|---|---|---|---|---|
| PDCP SN(cont.) ||||
| Data ||||

(a) PDCP PDU Type 1

| R | PI | R | PDCP SN |
|---|---|---|---|
| Data ||||

....

| MAC-I |
|---|
| MAC-I(cont.) |
| MAC-I(cont.) |
| MAC-I(cont.) |

(b) PDCP PDU Type 2

METHOD FOR TRANSMITTING AND RECEIVING DATA IN WIRELESS COMMUNICATION SYSTEM AND APPARATUS SUPPORTING THE SAME

CROSS REFERENCE TO RELATED APPLICATIONS

This application is the National Phase of PCT International Application No. PCT/KR2016/009556, filed on Aug. 26, 2016, which claims priority under 35 U.S.C. 119(e) to U.S. Provisional Application Nos. 62/251,112, filed on Nov. 5, 2015, and 62/335,618 filed on May 12, 2016, all of which are hereby expressly incorporated by reference into the present application.

TECHNICAL FIELD

The present invention relates to a method for transmitting and receiving data of a terminal in a wireless communication system, and more particularly, to a method for transmitting and receiving data by configuring a logical path for transmitting and receiving the data and an apparatus for supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and apparatus for configuring a logical path for transmitting and receiving data according to Quality of Service (QoS) of a service.

In addition, an object of the present invention is to provide a method and apparatus for transmitting data through a preconfigured path or a part of the path without separate logical path configuration.

In addition, an object of the present invention is to provide a method and apparatus for transmitting a plurality of data of which required Quality of Service is different from each other through a single logical path.

In addition, an object of the present invention is to provide a method and apparatus for reducing delay of transmitting data by transmitting and receiving data through a preconfigured path or a part of the path.

In addition, an object of the present invention is to provide a method and apparatus for not configuring a logical path separately according to Quality of Service by transmitting data of which Quality of Service is different to a network node or a device through a single logical path.

The technical objects to attain in the present disclosure are not limited to the above-described technical objects and other technical objects which are not described herein will become apparent to those skilled in the art from the following description.

Technical Solution

In order to solve the problem described above, the present invention provides a method and apparatus for configuring a bearer for transmitting and receiving data in a wireless communication system. Particularly, a method for configuring a bearer according to an embodiment of the present invention includes receiving a first message requesting a first service quality from a device, where the first message includes a first indicator indicating a transmission through a configuration change of a preconfigured session, selecting a first session for transmitting the first message according to a specific criteria among at least one preconfigured session, where the first session is a session configured for transmitting at least one message requesting a second service quality, transmitting a configuration change request message that requests a configuration change of the first session based on the first service quality to a network node, receiving a configuration change response message indicating a configuration change result in response to the configuration change request message, and transmitting the first message through the first session or the second session according to the configuration change response message, where the message includes at least one of a destination address field including destination information of the message or a source address field including transmitter information of the message.

In addition, in the present invention, the message is transmitted through the first session, when the configuration change response message indicates a configuration change success.

In addition, in the present invention, the message is transmitted through the second session, when the configuration change response message indicates a configuration change failure.

In addition, the present invention further includes transmitting a request message requesting a configuration of the second session to the network node; and receiving a response message in response to the request message.

In addition, the present invention further includes transmitting a request message requesting a logical wireless path configuration between the BS and the device based on the first service quality to the device; and receiving a response message in response to the request message.

In addition, the present invention further includes receiving a second message including a second identifier indicating whether the BS supports a transmission through a configuration change of a preconfigured session from the BS.

In addition, in the present invention, the specific criteria is one of a priority or a similarity with the first service quality.

In addition, the present invention further includes recovering the configuration of the first session, when a transmission of the first message is completed.

In addition, the present invention further includes configuring a configuration change maintenance time of the first session based on the first service quality with the terminal or the network node.

In addition, the present invention further includes recovering the configuration of the first session when the configuration change maintenance time expires.

In addition, the present invention includes a communication unit for transmitting and receiving a radio signal with exterior; and a processor functionally connected to the communication unit, and the processor is configured to perform: receiving a first message requesting a first service quality from a device, where the first message includes a first indicator indicating a transmission through a configuration change of a preconfigured session, selecting a first session for transmitting the first message according to a specific criteria among at least one preconfigured session, where the first session is a session configured for transmitting at least one message requesting a second service quality, transmitting a configuration change request message that requests a configuration change of the first session based on the first service quality to a network node, receiving a configuration change response message indicating a configuration change result in response to the configuration change request message, and transmitting the first message through the first session or the second session according to the configuration change response message, where the message includes at least one of a destination address field including destination information of the message or a source address field including transmitter information of the message.

Technical Effects

According to the present invention, a plurality of data of which Quality of Service is different from each other is transmitted through a single logical path, and there is an effect of reducing delay required for configuring separate logical path according to Quality of Service.

In addition, according to the present invention, a plurality of data of which Quality of Service is different from each other is transmitted through a single logical path, and there is an effect of reducing signaling for configuring separate logical path according to Quality of Service.

In addition, according to the present invention, a plurality of data of which Quality of Service is different from each other is transmitted through a single logical path, and there is an effect of reducing resource for managing a logical path.

The technical effects obtained in the present invention are not limited to the technical effects described above, and other technical effects not mentioned herein may be understood to those skilled in the art from the description below.

DESCRIPTION OF DRAWINGS

FIG. 12 illustrates latency required for each process of a contention-based random access procedure required by the 3GPP LTE-A system to which the present invention can be applied.

FIGS. 25 to 27 are diagrams illustrating an example of types and requirements of 5G service.

FIG. 33 is a diagram illustrating an example of configuring a logical path for data transmission and reception to which the present invention is applied.

FIG. 34 is a diagram illustrating another example of configuring a logical path for data transmission and reception to which the present invention is applied.

FIGS. 46 to 50 are diagrams illustrating an example of data structure to which the present invention may be applied.

BEST MODE FOR INVENTION

Figure 1:
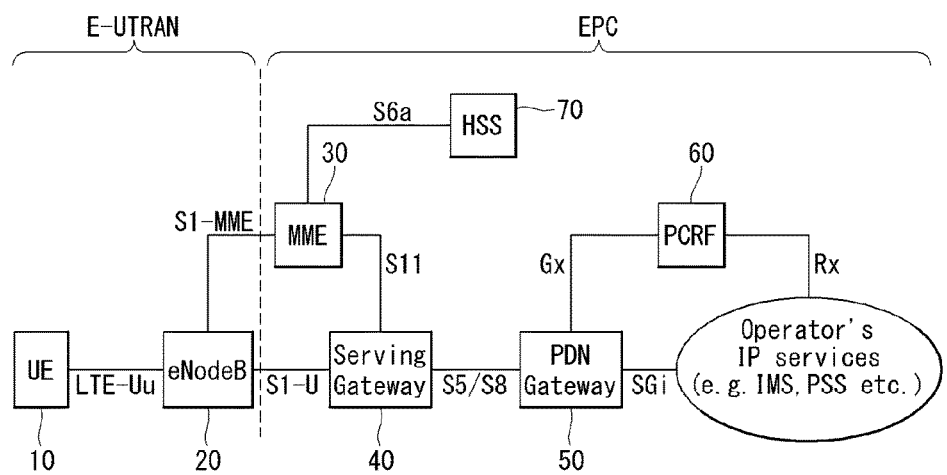
FIG. 1 is a view illustrating an Evolved Packet System which is associated with the Long Term Evolution (LTE) system to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a terminal node of a network, which directly communicates with a terminal. In some cases, a specific operation described as being performed by the base station may also be performed by an upper node of the base station. Namely, it is apparent that, in a network including a plurality of network nodes including a base station, various operations performed for communication with a terminal may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like. The term 'terminal" may be fixed or mobile, and may be replaced with the term 'user equipment (UE)', 'mobile station (MS)', 'user terminal (UT)', 'mobile subscriber station (MSS)', 'subscriber station (SS)', 'advanced mobile station (AMS)', 'wireless terminal (WT)', 'machine-type communication (MTC) device', 'machine-to-machine (M2M) device', 'device-to-device (D2D) device', and the like.

Hereinafter, the downlink (DL) means communication from a base station to a terminal, and the uplink (UL) means communication from a terminal to a base station. In the downlink, a transmitter may be part of a base station, and a receiver may be part of a terminal. In the uplink, a transmitter may be part of a terminal, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Figure 2:
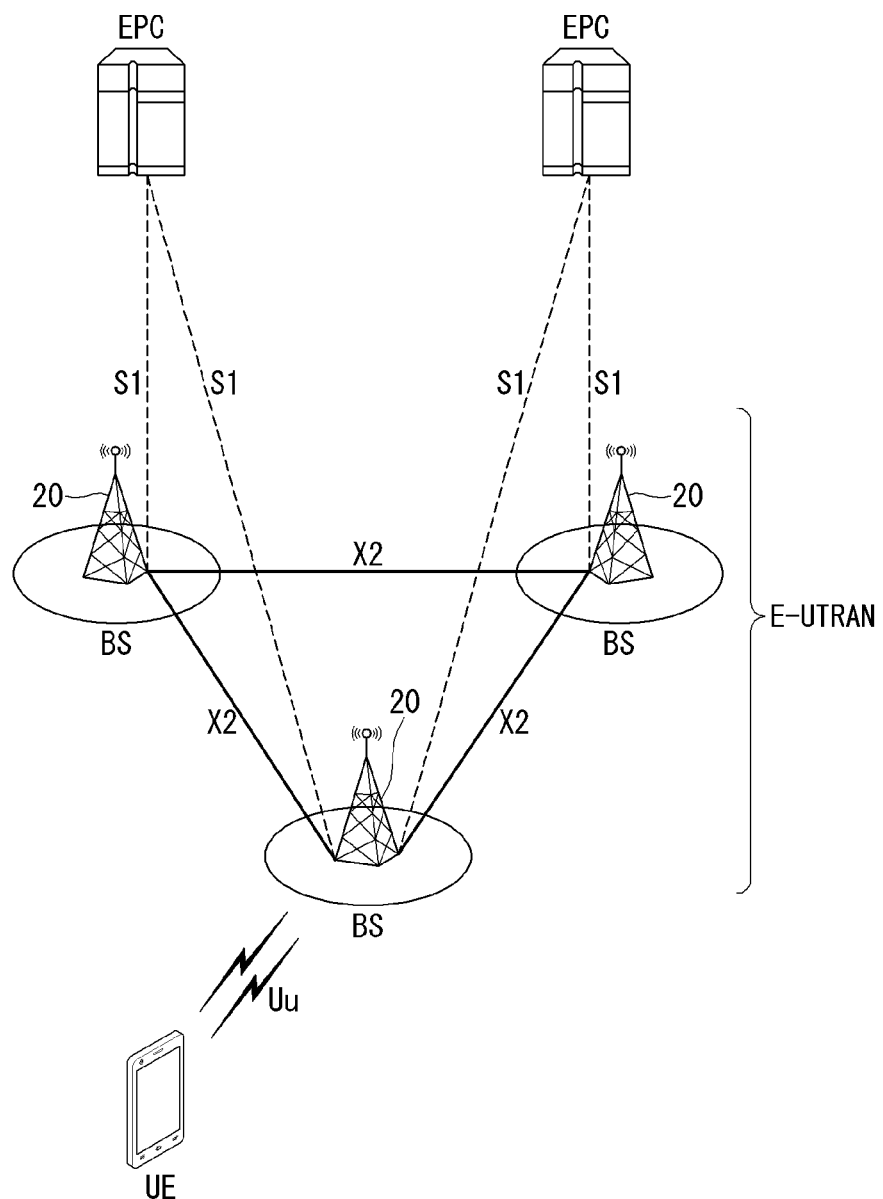
FIG. 2 shows a wireless communication system to which the present invention is applied.

FIG. 2 illustrates a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
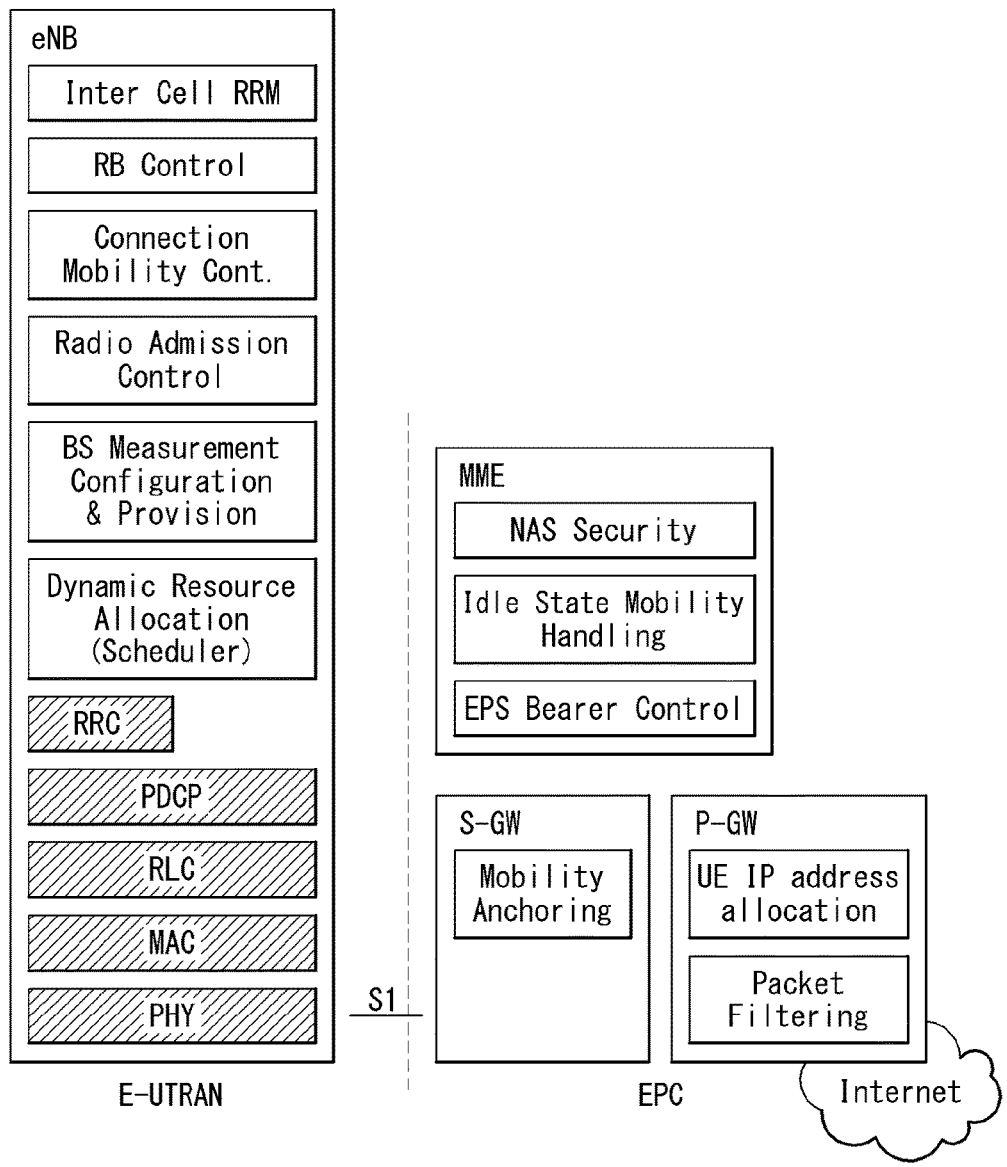
FIG. 3 illustrates a functional split of an E-UTRAN and an EPC to which the present invention can be applied.

FIG. 3 illustrates a functional split of an E-UTRAN and an EPC to which the present invention can be applied.

Referring to FIG. 3, a deviate crease line block indicates radio protocol layer, and an empty block indicates the functional entity of a control plane.

A base station performs the following function. (1) radio resource management (RRM) functions, such as radio bearer control, radio admission control, connection mobility control, and dynamic resource allocation to a terminal, (2) Internet protocol (IP) header compression and the encryption of a user data stream, (3) the routing of user plane data toward an S-GW, (4) the scheduling and transmission of a paging message, (5) the scheduling and transmission of broadcast information, and (6) measurement for mobility and scheduling and a measurement report configuration.

The MME performs the following functions. (1) the distribution of a paging message to base stations, (2) security control, (3) idle state mobility control, (4) SAE bearer control, and (5) the ciphering and integrity protection of non-access stratum (NAS) signaling.

The S-GW performs the following functions. (1) the termination of a user plane packet for paging and (2) user plane switching for the support of terminal mobility.

Figure 4:
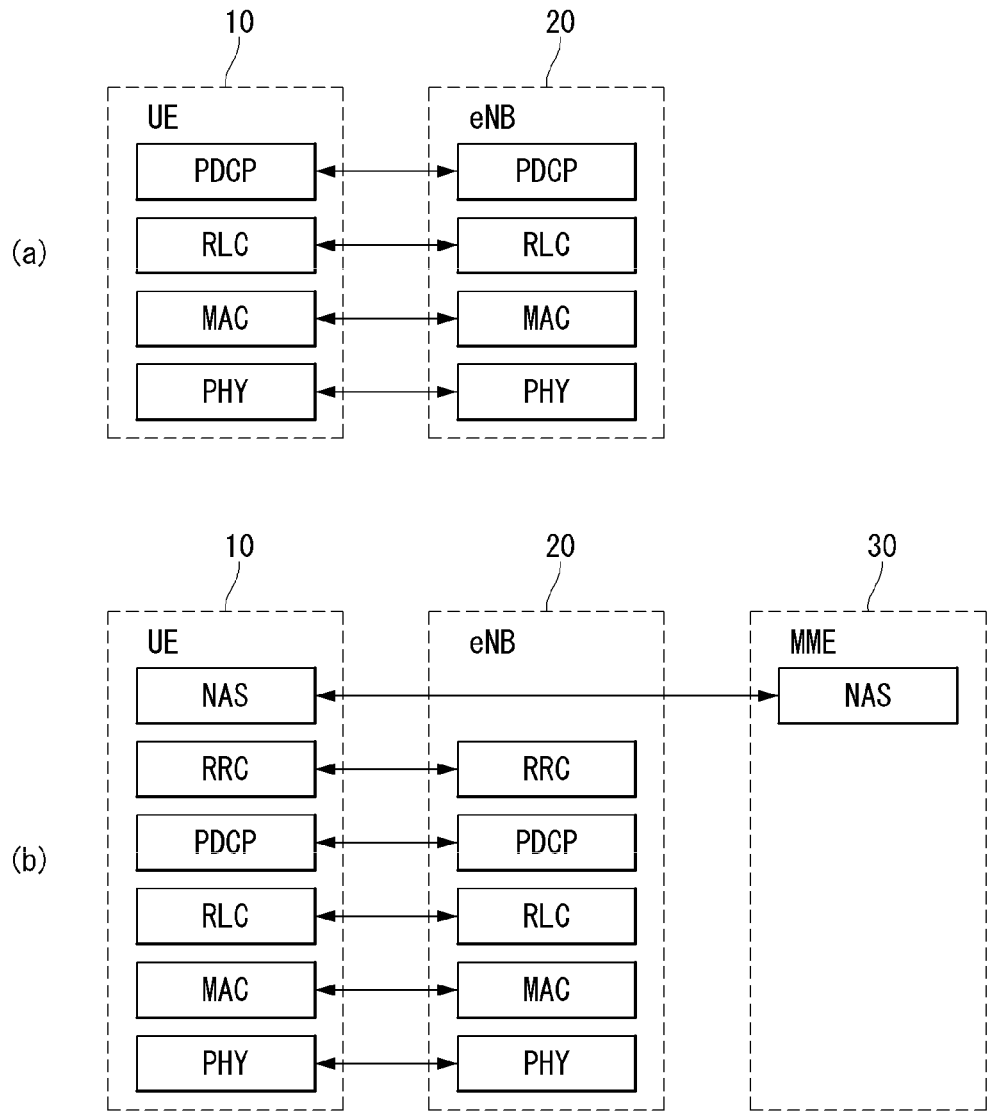
FIG. 4 is a diagram illustrating an example of a radio protocol architecture to which the technical characteristics of the present invention may be applied.

FIG. 4 is a block diagram showing an example of radio protocol architecture to which the technical characteristics of the present invention may be applied.

FIG. 4(*a*) shows an example of radio protocol architecture for a user plane, and FIG. 4(*b*) is a block diagram showing an example of radio protocol architecture for a control plane.

The user plane is a protocol stack for user data transmission, and the control plane is a protocol stack for control signal transmission.

Referring to FIGS. 4(*a*) and 4(*b*), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "/" includes both the concepts of "or" and "and") to a transport block provided to a physical channel on the transport channel of an MAC service data unit (SDU) that belongs to a logical channel. The MAC layer provides service to a radio link control (RLC) layer through the logical channel.

The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a terminal and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a terminal and the RRC layer of an E-UTRAN, the terminal is in the RRC connected state. If not, the terminal is in the RRC idle state.

A downlink transport channel through which a network transmits data to a terminal includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a terminal transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel. A transmission time interval (TTI) is a unit time of subframe transmission.

Figure 5:
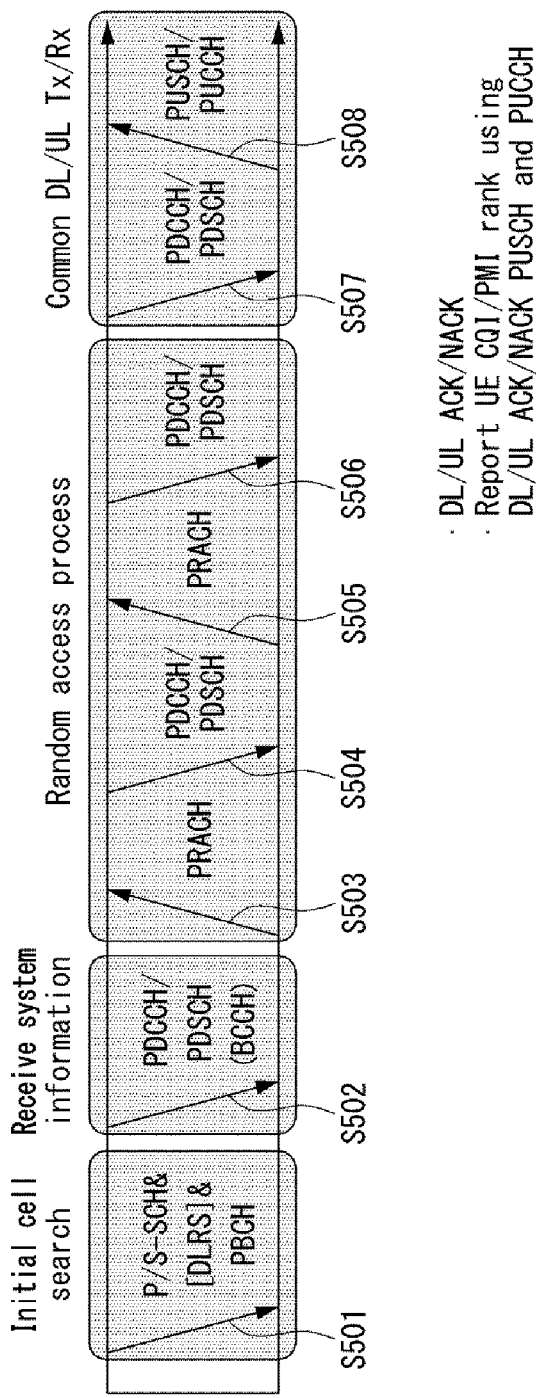
FIG. 5 illustrates physical channels used for the 3GPP LTE/LTE-A system to which the present invention can be applied and a general signal transmission method using the physical channels.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S5010 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S5020 step to obtain more specific system information.

Next, the UE may carry out a random access procedure such as the steps of S5030 to S5060 to complete a connection process to the eNB. To this purpose, the UE transmits a preamble S5030 through a physical random access channel (PRACH) and receives a response message in response to the preamble through a PDSCH corresponding to the PRACH S5040. In the case of contention-based random access, the UE may carry out a contention resolution procedure including transmission of an additional PRACH signal S5050 and reception of a PDCCH signal and the PDSCH signal corresponding to the PDCCH signal S5060.

Afterwards, the UE which has carried out the procedure above may carry out reception S5070 of the PDCCH signal and/or PDSCH signal and transmission S5080 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

Hereinafter, the RRC state and RRC connection method of a terminal is described in detail.

The RRC state means whether the RRC layer of a terminal has been logically connected to the RRC layer of an E-UTRAN. A case where the RRC layer has been connected is called an RRC connected state, and a case where the RRC layer has not been connected is called an RRC idle state. A terminal in the RRC connected state has an RRC connection, and thus an E-UTRAN may check the presence of the corresponding terminal in a cell unit, thus being capable of effectively controlling the terminal.

In contrast, a terminal in the RRC idle state cannot be checked by an E-UTRAN and is managed by a core network (CN) in a tracking area unit, that is, an area unit greater than a cell. That is, whether the terminal in the RRC idle state is present in a large area unit is checked. In order to receive a common mobile communication service, such as voice or data, the terminal needs to switch to the RRC connected state.

When a user first turns on a terminal, the terminal first searches for a proper cell and then stays in the RRC idle state in the corresponding cell. When the terminal in the RRC idle state needs to set up an RRC connection, it establishes the RRC connection with an E-UTRAN through an RRC connection procedure and switches to the RRC connected state. A case where the terminal in the RRC idle state needs to establish an RRC connection includes several cases, and may include the necessity of uplink data transmission for a reason, such as a call attempt by a user, for example, or response message transmission when a paging message is received from an E-UTRAN.

A non-access stratum (NAS) layer located over the RRC layer performs the functions of session management and mobility management.

In order to manage the mobility of a terminal in the NAS layer, two types of state; such as EPS Mobility Management-REGISTERED (EMM-REGISTERED) and EMM-DEREGISTERED have been defined. The two states are applied to the terminal and the MME. Initially, the terminal is in the EMM-DEREGISTERED state. The terminal performs a process of registering with a corresponding network through an initial attach procedure in order to access a network. When the attach procedure is successfully performed, the terminal and the MME become the EMM-REGISTERED state.

In order to manage a signaling connection between a terminal and an EPC, two states of an EPS connection management (ECM)-IDLE state and an ECM-CONNECTED state have been defined. The two states are applied to the terminal and the MME. When the terminal in the ECM-IDLE state sets up an RRC connection with an E-UTRAN, the corresponding terminal becomes the ECM-CONNECTED state.

When the MME in the ECM-IDLE state sets up an S1 connection with the E-UTRAN, it becomes the ECM-CONNECTED state. When the terminal is in the ECM-IDLE state, the E-UTRAN does not have context information of the terminal. Accordingly, the terminal in the ECM-IDLE state performs a terminal-based mobility-related procedure, such as cell selection or cell reselection, without a command from a network. In contrast, when the terminal is in the ECM-CONNECTED state, the mobility of the terminal is managed by a command from the network. If the location of the terminal in the ECM-IDLE state is different from that known to the network, the terminal notifies the network of the corresponding location of the terminal through a tracking area update procedure.

System information is described below.

System information includes essential information that must be known to a terminal in order for the terminal to access a base station. Accordingly, the terminal must have received all of pieces of system information before it accesses the base station and must always have the newest system information. Furthermore, the system information is information that must be known to all of terminals within one cell, and a base station periodically transmits the system information.

In accordance with Paragraph 5.2.2 of 3GPP TS 36.331 V8.7.0 (2009-09) "Radio Resource Control (RRC); Protocol specification (Release 8)", system information is divided into a master information block (MIB), a scheduling block (SB), and a system information block (SIB). The MIB allows a terminal to be aware of the physical configuration, for example, a bandwidth of a corresponding cell. The SB provides notification of transmission information, for example, the transmission cycle of SIBs. The SIB is an assembly of pieces of related system information. For example, which SIB includes only information of a neighboring cell, and which SIB includes only information of an uplink radio channel used by a terminal.

Figure 6:
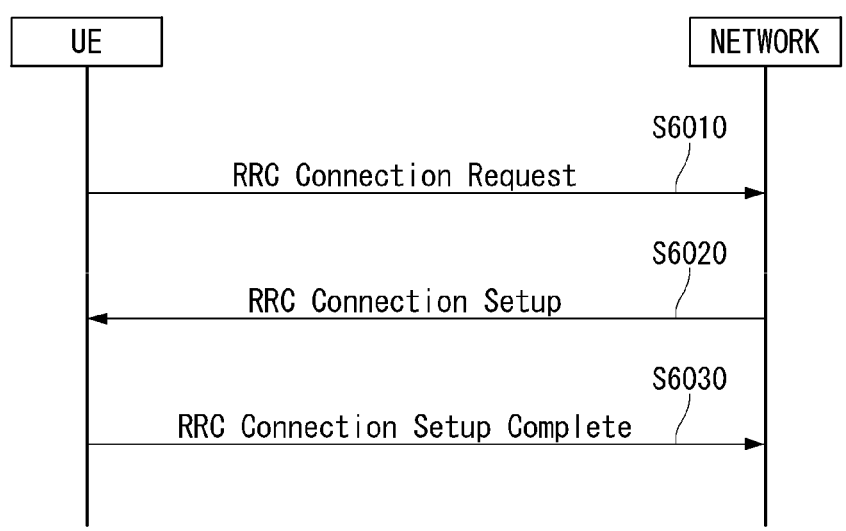
FIG. 6 is a flowchart showing an RRC connection establishment procedure to which the present invention can be applied.

FIG. 6 is a flowchart showing an RRC connection establishment procedure to which the present invention can be applied.

A UE sends to a network an RRC connection request message for requesting an RRC connection (step S6010). The network sends an RRC connection setup message in response to the RRC connection request (step S6020). After receiving the RRC connection setup message, the UE enters an RRC connection mode.

The UE sends to the network an RRC connection setup complete message used to confirm successful completion of the RRC connection establishment (step S6030).

Figure 7:
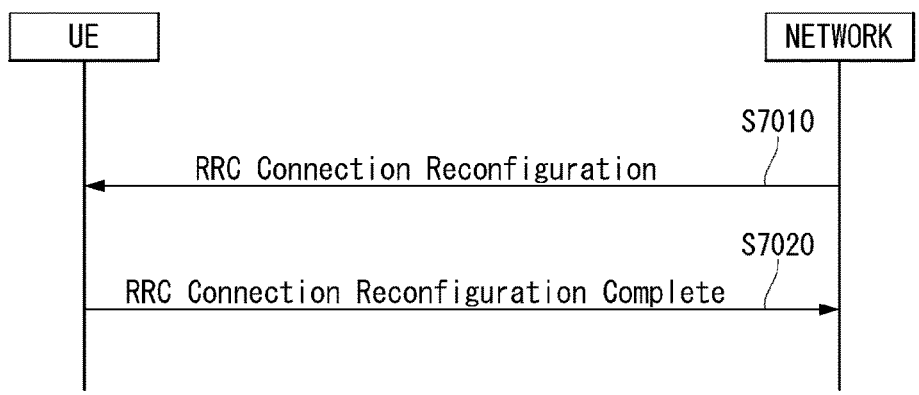
FIG. 7 is a flowchart showing an RRC connection reconfiguration procedure to which the present invention can be applied.

FIG. 7 is a flowchart showing an RRC connection reconfiguration procedure. An RRC connection reconfiguration is used to modify an RRC connection.

This is used to establish/modify/release a Radio Bearer (RB), perform handover, setup/modify/release a measurement.

A network sends to a UE an RRC connection reconfiguration message for modifying the RRC connection (step S7010). In response to the RRC connection reconfiguration, the UE sends to the network an RRC connection reconfiguration complete message used to confirm successful completion of the RRC connection reconfiguration (step S7020).

Buffer Status Reporting (BSR)

Figure 8:
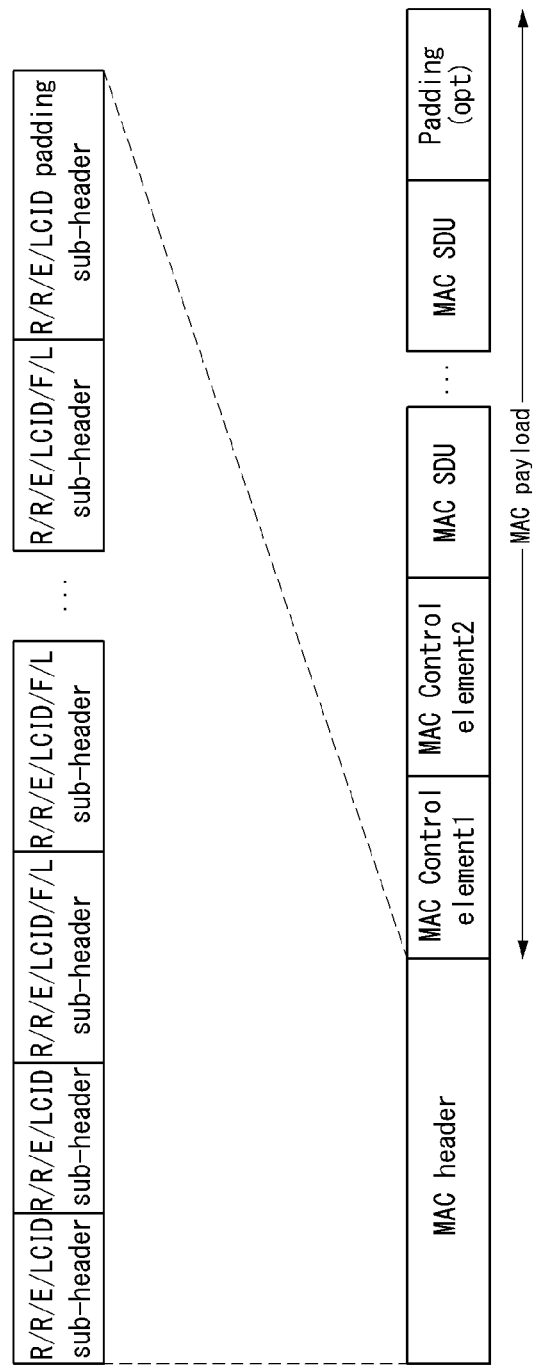
FIG. 8 illustrates a format of an MAC control element for reporting a buffer state in a wireless communication system to which the present invention can be applied.

FIG. 8 illustrates an MAC PDU used by an MAC entity in a wireless communication system to which the present invention can be applied.

With reference to FIG. 8, the MAC PDU includes an MAC header, at least one MAC service data unit (SDU), and at least one MAC control element; and may further comprise padding. Depending on the situation, at least one of the MAC SDU and the MAC control element may not be included in the MAC PDU.

As shown in FIG. 8, the MAC control element usually precedes the MAC SDU. And the size of the MAC control element can be fixed or varied. In case the size of the MAC control element is variable, whether the size of the MAC control element has been increased can be determined through an extended bit. The size of the MAC SDU can also be varied.

The MAC header can include at least one or more sub-headers. At this time, at least one or more sub-headers included in the MAC header correspond to the MAC SDU, MAC control element, and padding, respectively, which the order of the sub-headers is the same as the disposition order of the corresponding elements. For example, as shown in FIG. 10, if the MAC PDU includes an MAC control element 1, an MAC control element 2, a plurality of MAC SDUs, and padding, sub-headers can be disposed in the MAC header so that a sub-header corresponding to the MAC control element 1, a sub-header corresponding to the MAC control element 2, a plurality of sub-headers corresponding respectively to the plurality of MAC SDUs, and a sub-header corresponding to padding can be disposed according to the corresponding order.

The sub-header included in the MAC header, as shown in FIG. 12, can include 6 header fields. More specifically, the sub-header can include 6 header fields of R/R/E/LCID/F/L.

As shown in FIG. 8, for the sub-header corresponding to the MAC control element of a fixed size and the sub-header corresponding to the last one among the data fields included in the MAC PDU, sub-headers including 4 header fields can be used. Therefore, in case a sub-header includes 4 fields, the four fields can be R/R/E/LCID.

Figure 9:
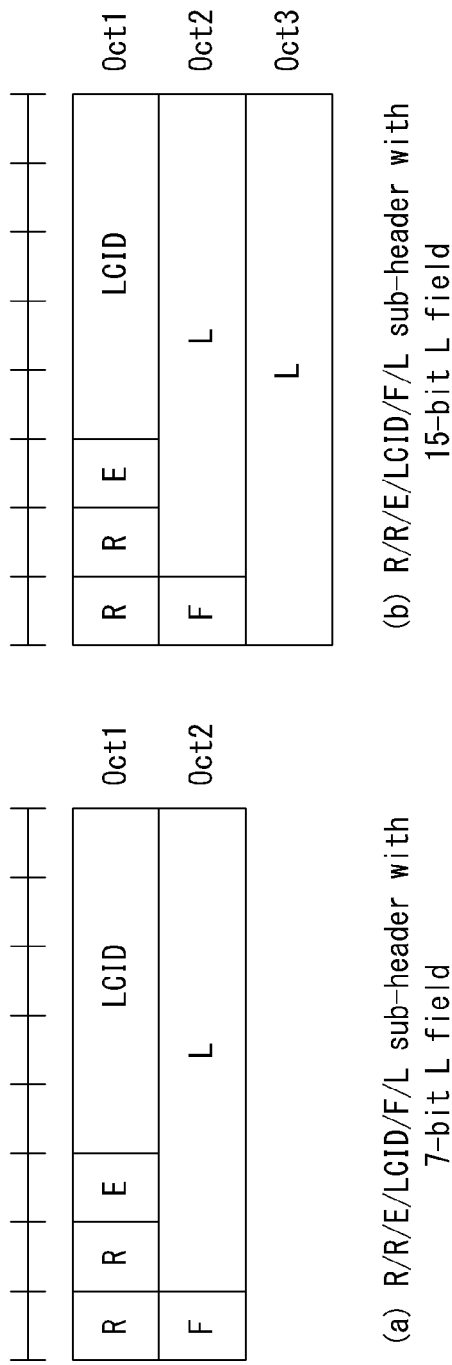
FIG. 9 illustrates one example of a component carrier and carrier aggregation in a wireless communication system to which the present invention can be applied.
Figure 10:
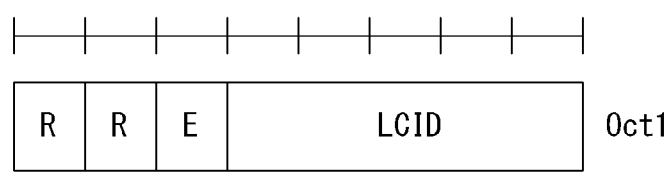
FIG. 10 illustrates a contention-based random access procedure in a wireless communication system to which the present invention can be applied.

FIGS. 9 and 10 illustrate a sub-header of an MAC PDU in a wireless communication system to which the present invention can be applied.

In the following, each field is described with reference to FIGS. 9 and 10.

1) R: Reserved bit, not used.

2) E: Extended bit, indicating whether the element corresponding to a sub-header is extended. For example, if E field is '0', the element corresponding to the sub-header is terminated without repetition; if E field is '1', the element corresponding to the sub-header is repeated one more time and the length of the element is increased twice of the original length.

3) LCID: Logical Channel Identification. This field is used for identifying a logical channel corresponding to the MAC SDU or identifying the corresponding MAC control element and padding type. If the MAC SDU is related to a sub-header, this field then indicates a logical channel which the MAC SDU corresponds to. If the MAC control element is related to a sub-header, then this field can describe what the MAC control element is like.

Table 1 shows the LCID values for DL-SCH.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 2 shows LCID values for an UL-SCH.

TABLE 2

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, a UE can report its buffer state to the network by setting an index value for any of a truncated BSR in the LCID field, a short BSR, and a long BSR.

The index values and a mapping relationship of the LCID values of Tables 1 and 2 are shown for an illustrative purpose, and the present invention is not limited to the example.

4) F: Format field. Represents the size of the L field

5) L: Length field. Represents the size of the MAC SDU corresponding to a sub-header and the size of the MAC control element. If the size of the MAC SDU corresponding to a sub-header or the size of the MAC control element is equal to or smaller than 127 bits, 7 bits of the L field can be used (FIGS. 9(a)) and 15 bits of the L field can be used for the other cases (FIG. 9(b)). In case the size of the MAC control element varies, the size of the MAC control element can be defined through the L field. In case the size of the MAC control element is fixed, the F and the L field may be omitted as shown in FIG. 10 since the size of the MAC control element can be determined without defining the size of the MAC control element through the L field.

Figure 11:
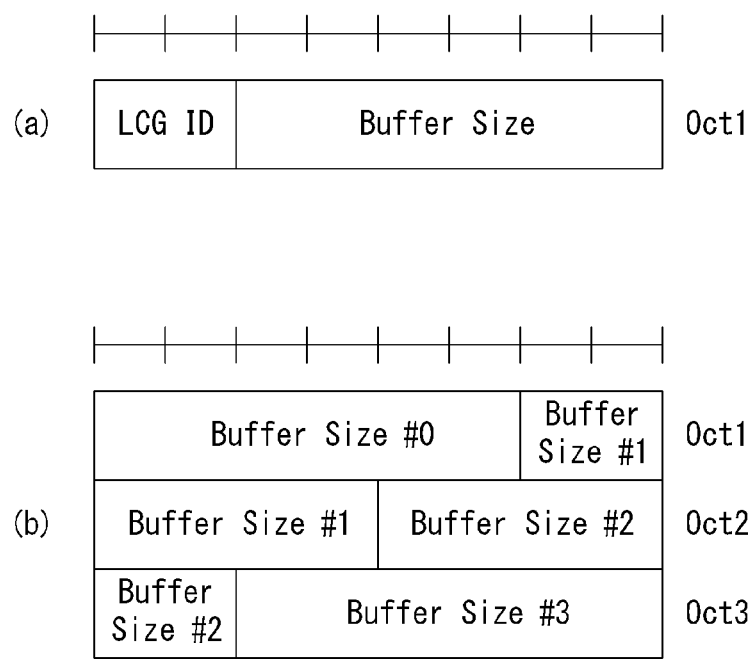
FIG. 11 illustrates a non-contention based random access procedure in a wireless communication system to which the present invention can be applied.

FIG. 11 illustrates a format of an MAC control element for reporting a buffer state in a wireless communication system to which the present invention can be applied.

In case the truncated BSR and short BSR are defined in the LCID field, the MAC control element corresponding to a sub-header can be configured to include a logical channel group identification (LCG ID) field and a buffer size field indicating a buffer state of the logical channel group as shown in FIG. 11(a). The LCG ID field is intended to identify a logical channel group to which to report a buffer state and can have the size of two bits.

The buffer size field is intended to identify the total amount of data available for all of the logical channels belonging to a logical channel group after the MAC PDU is created. The available data include all of the data that can be transmitted from the RLC layer and the PDCP layer, and the amount of data is represented by the number of bytes. The buffer size field can have the size of 6 bits.

In case a long BSR is defined for the LCID field of a sub-header, the MAC control element corresponding to a sub-header can include 4 buffer size fields indicating buffer states of the four groups having LCG IDs ranging from 0 to 3 as shown in FIG. 11(b). Each buffer size field can be used to identify the total amount of data available for each logical channel group.

Uplink Resource Allocation Procedure

In the case of the 3GPP LTE/LTE-A system, a method for data transmission and reception based on scheduling of an eNB is used to maximize utilization of radio resources. This again implies that in case a UE has data to transmit, the UE requests the eNB to allocate uplink resources in the first place and is capable of transmitting data by using only the uplink resources allocated by the eNB.

FIG. 12 illustrates an uplink resource allocation process of a UE in a wireless communication system to which the present invention can be applied.

For efficient use of radio resources in uplink transmission, an eNB needs to know which data and how much of the data to transmit to each UE. Therefore, the UE transmits to the eNB the information about uplink data that the UE attempts to transmit directly, and the eNB allocates uplink resources to the corresponding UE in accordance to the UE's transmission. In this case, the information about uplink data that the UE transmits to the eNB is the amount of uplink data stored in the UE's buffer, which is called buffer status report (BSR). When radio resources on the PUSCH are allocated during a current TTI and a reporting event is triggered, the UE transmits the BSR by using the MAC control element.

FIG. 12(a) illustrates an uplink resource allocation process for actual data in case the uplink radio resources for buffer status reporting are not allocated to the UE. In other words, in the case of a UE making a transition from the DRX mode to an active mode, since no data resources are allocated beforehand, the UE has to request resources for uplink data, starting with SR transmission through the PUCCH, and in this case, an uplink resource allocation procedure of five steps is employed.

FIG. 12(a) illustrates the case where the PUSCH resources for transmitting BSR are not allocated to the UE, and the UE first of all transmits a scheduling request (SR) to the eNB to receive PUSCH resources S12010.

The scheduling request is used for the UE to request the eNB to allocate the PUSCH resources for uplink transmission in case radio resources are not scheduled on the PUSCH during a current TTI although a reporting event has occurred. In other words, when a regular BSR has been triggered but uplink radio resources for transmitting the BSR to the eNB are not allocated to the UE, the UE transmits the SR through the PUCCH. Depending on whether the PUCCH resources for SR have been configured, the UE may transmit the SR through the PUCCH or starts a random access procedure. More specifically, the PUCCH resources through the SR can be transmitted are set up by an upper layer (for example, the RRC layer) in a UE-specific manner, and the SR configuration include SR periodicity and SR sub-frame offset information.

If the UE receives from the eNB an UL grant with respect to the PUSCH resources for BSR transmission S12020, the UE transmits the BSR to the eNB, which has been triggered through the PUSCH resources allocated by the UL grant S12030.

By using the BSR, the eNB checks the amount of data for the UE to actually transmit through uplink transmission and transmits to the UE an UL grant with respect to the PUSCH resources for transmission of actual data S12040. The UE, which has received the UL grant meant for transmission of actual data, transmits to the eNB actual uplink data through the allocated PUSCH resources S12050.

FIG. 12(b) illustrates an uplink resource allocation process for actual data in case the uplink radio resources for buffer status reporting are allocated to the UE.

FIG. 12(b) illustrates the case where the PUSCH resources for BSR transmission have already been allocated to the UE; the UE transmits the BSR through the allocated PUSCH resources and transmits a scheduling request to the eNB along with the BSR transmission S12110. Next, by using the BSR, the eNB check the amount of data that the UE actually transmits through uplink transmission and transmits to the UE an UL grant with respect to the PUSCH resources for transmission of actual data S12120. The UE, which has received an UL grant for transmission of actual data, transmits actual uplink data to the eNB through the allocated PUSCH resources S12130.

Random Access Procedure (RACH)

Figure 13:
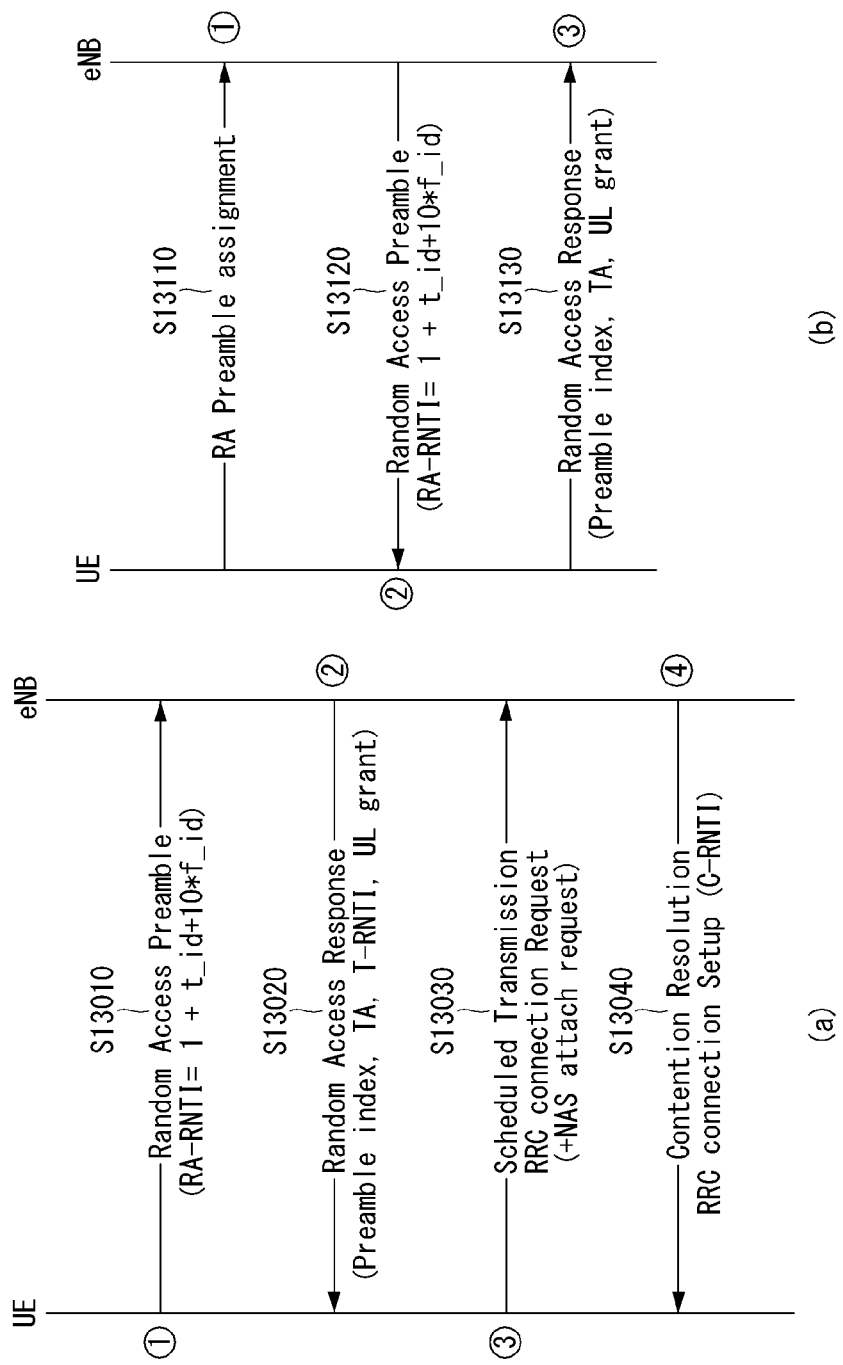
FIG. 13 illustrates one example of a random access procedure in the LTE system.

FIG. 13 illustrates one example of a random access procedure in the LTE system.

The UE carries out the random access procedure (RACH) at the time of the initial connection in the RRC_IDLE state, initial connection after radio link failure, handover requiring the RACH, and generation of uplink or downlink data requiring the RACH while in the RRC_CONNECTED state. Part of RRC messages such as the RRC connection request message, cell update message, and UTRAN Registration Area (URA) update message are also transmitted through the random access procedure. Logical channels such as Common Control Channel (CCCH), Dedicated Control Channel (DCCH), and Dedicated Traffic Channel (DTCH) can be mapped to a transmission channel RACH. A transmission channel RACH is mapped to a physical channel such as the Physical Random Access Channel (PRACH).

If the UE's MAC layer commands the UE's physical layer to start PRACH transmission, the UE's physical layer first selects one access slot and one signature to transmit the PRACH preamble to the uplink. Two types of random access procedure are defined: contention based and non-contention based random access procedure.

FIG. 13(a) illustrates one example of a contention based random access procedure, while FIG. 13(b) illustrates one example of a non-contention based random access procedure.

First, contention based random access procedure will be described with reference to FIG. 13(a).

The UE receives information about random access from the eNB through system information and stores the received information. Afterwards, in case random access is required, the UE transmits a random access preamble (which is also called a message 1) to the base station S13010.

If the eNB receives a random access preamble from the UE, the eNB transmits a random access response (which is also called a message 2) to the UE S13020. To be specific, downlink scheduling information with respect to the random access response message is CRC masked with a Random Access-Radio Network Temporary Identifier (RA-RNTI) and transmitted on the L1 or L2 control channel (PDCCH). The UE, having receiving a downlink scheduling signal masked with the RA-RNTI, receives a random access response message from a Physical Downlink Shared Channel (PDSCH) and decodes the received random access response message. Afterwards, the UE checks the random access response message whether it contains random access response information directed to the UE.

Existence of random access response information directed to the UE can be determined by checking a Random Access Preamble ID (RAID) with respect to a preamble that the UE has transmitted.

The random access response information includes Timing Alignment (TA) representing timing offset information for synchronization, allocation information of radio resources used for uplink, and a temporary C-RNTI for UE identification.

In case random access response information is received, the UE carries out uplink transmission (which is also called a message 3) to a uplink Shared Channel (SCH) according to the radio resource allocation information included in the response information. At this time, uplink transmission may be expressed as scheduled transmission.

After receiving the uplink transmission from the UE, the eNB transmits a message for contention resolution (which is also called a message 4) to the UE through a Downlink Shared Channel (DL-SCH) S13040.

Next, non-contention based random access procedure will be described with reference to FIG. 13(b).

Before the UE transmits a random access preamble, the eNB allocates a non-contention based random access preamble to the UE S13110.

The non-contention based random access preamble can be allocated through a handover command or dedicated signaling such as a PDCCH. In case a non-contention based random access preamble is allocated to the UE, the UE transmits the allocated non-contention based random access preamble to the eNB S13120.

Afterwards, the eNB is able to transmit a random access response (which is also called a message 2) to the UE similarly to the S2002 step of the contention based random access procedure S13130.

Although HARQ has not been applied to the random access response during the random access procedure above, the HARQ can be applied to uplink transmission with respect to the random access response or a message for contention resolution. Therefore, the UE doesn't necessarily have to transmit ACK or NACK with respect to the random access response.

Next, a UL data transmission method in the LTA(-A) or 802.16 system will be described briefly.

A cellular system such as the LTE(-A) or 802.16m system employs an eNB scheduling-based resource allocation method.

In a system which employs the eNB scheduling based resource allocation method, the UE with data to be transmitted (i.e., UL data) requests resources for transmission of the corresponding data from the eNB before transmitting the data.

The scheduling request of the UE can be carried out through Scheduling Request (SR) transmission to a PUCCH or Buffer Status Report (BSR) transmission to a PUSCH.

Also, in case resources used for transmitting SR or BSR are not limited to the UE, the UE can request uplink resources from the eNB through an RACH procedure.

As described above, the eNB which has received a scheduling request from the UE allocates uplink resources to be used for the corresponding UE through a downlink control channel (i.e., UL grant message or DCI in the case of the LTE(-A) system).

At this time, a UL grant transmitted to the UE may be used to inform the UE of which subframe the resources allocated to the UE correspond to through explicit signaling, but the UL grant may be used to define a predefined timing between the UE and the eNB for resource allocation with respect to a subframe after specific time (for example, 4 ms in the case of the LTE system).

As described above, the eNB's allocating resources to the UE after X ms (for example, 4 ms in the case of the LTE(-A) system) implies that the UE allocates resources by taking into account all of the time periods for the UE to receive and decode a UL grant, to prepare data to be transmitted, and to encode the prepared data.

EMM and ECM State

EPS mobility management (EMM) and an EPS connection management (ECM) state are described.

Figure 14:
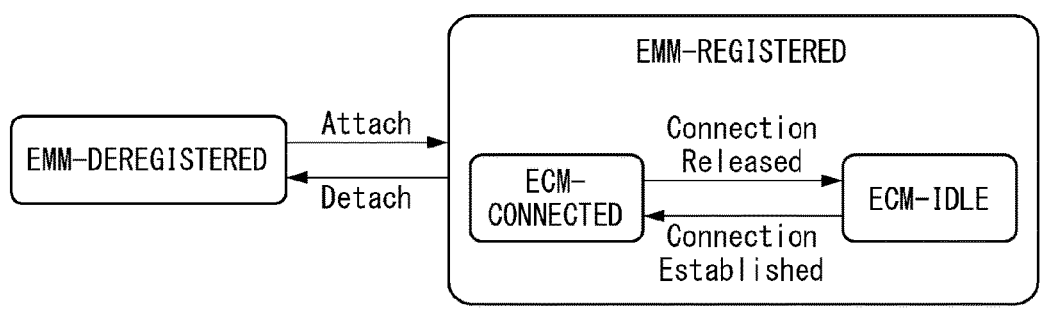
FIG. 14 is a diagram illustrating EMM and an ECM state in a wireless communication system to which the present invention may be applied.

FIG. 14 is a diagram illustrating EMM and an ECM state in a wireless communication system to which the present invention may be applied.

Referring to FIG. 14, in order to manage the mobility of a terminal in the NAS layer located in the control plane of the terminal and the MME, an EMM registration state (EMM-REGISTERED) and an EMM deregistration state (EMM-DEREGISTERED) may be defined depending on whether the terminal has been attached to or detached from a network. The EMM-REGISTERED state and the EMM-DEREGISTERED state may be applied to the terminal and the MME.

At the initial stage, such as a case where a terminal is first powered on, the terminal is in the EMM-DEREGISTERED state. In order to access the network, the terminal performs a process of registering with the corresponding network through an initial attach procedure. When the connection procedure is successfully performed, the terminal and the MME make transition to the EMM-REGISTERED state. Furthermore, if the terminal is powered off or a radio link fails (if a packet error rate exceeds a reference value on the radio link), the terminal is detached from the network and makes transition to the EMM-DEREGISTERED state.

Furthermore, in order to manage a signaling connection between the terminal and the network, an ECM connected state (ECM-CONNECTED) and an ECM idle state (ECM-IDLE) may be defined. The ECM-CONNECTED state and the ECM-IDLE state may also be applied to the terminal and the MME. An ECM connection includes an RRC connection established between a terminal and a base station and an S1 signaling connection established between a base station and an MME. That is, what an ECM connection has been established/released means that both the RRC connection and the S1 signaling connection have been established/released.

An RRC state indicates whether the RRC layer of a terminal and the RRC layer of a base station have been logically connected. That is, if the RRC layer of the terminal and the RRC layer of the base station are connected, the terminal is in the RRC connected state (RRC_CONNECTED). If the RRC layer of the terminal and the RRC layer of the base station are not connected, the terminal is in the RRC idle state (RRC_IDLE).

A network may check the presence of a terminal in the ECM-CONNECTED state in a cell unit and can effectively control the terminal.

In contrast, the network cannot check the presence of the terminal in the ECM-IDLE state, and a core network (CN) manages the terminal in a tracking area unit, that is, an area unit larger than a cell. When the terminal is in the ECM idle state, the terminal performs discontinuous reception (DRX) configured by NAS using an ID uniquely allocated in a tracking area. That is, the terminal may receive the broadcasting of system information and paging information by monitoring a paging signal at a specific paging occasion every terminal-specific paging DRX cycle.

Furthermore, when the terminal is in the ECM-IDLE state, the network does not have context information of the terminal. Accordingly, the terminal in the ECM-IDLE state may perform a terminal-based mobility-related procedure, such as cell selection or cell reselection, without a need to receive a command from the network. If the location of the terminal in the ECM idle state is different from that known to the network, the terminal may notify the network of the location of the corresponding terminal through a tracking area update (TAU) procedure.

In contrast, when the terminal is in the ECM-CONNECTED state, the mobility of the terminal is managed by a command from the network. In the ECM-CONNECTED state, the network is aware of a cell to which the terminal belongs. Accordingly, the network may transmit and/or receive data to the terminal or from the terminal, may control mobility, such as handover of the terminal, and may perform cell measurement for a neighboring cell.

As described above, in order for a terminal to receive a common mobile communication service such as voice or data, the terminal must shift to the ECM-CONNECTED state. At the initial stage, such as a case where the terminal is first powered on, the terminal is in the ECM-IDLE state like the EMM state. When the terminal is successfully registered with a corresponding network through an initial attach procedure, the terminal and an MME make transition to the ECM connected state. Furthermore, if the terminal has been registered with the network, but a radio resource has not been allocated because traffic has been deactivated, the terminal is in the ECM-IDLE state. When uplink or downlink new traffic is generated in the corresponding terminal, the terminal and the MME make transition to the ECM-CONNECTED state through a service request procedure.

Figure 15:
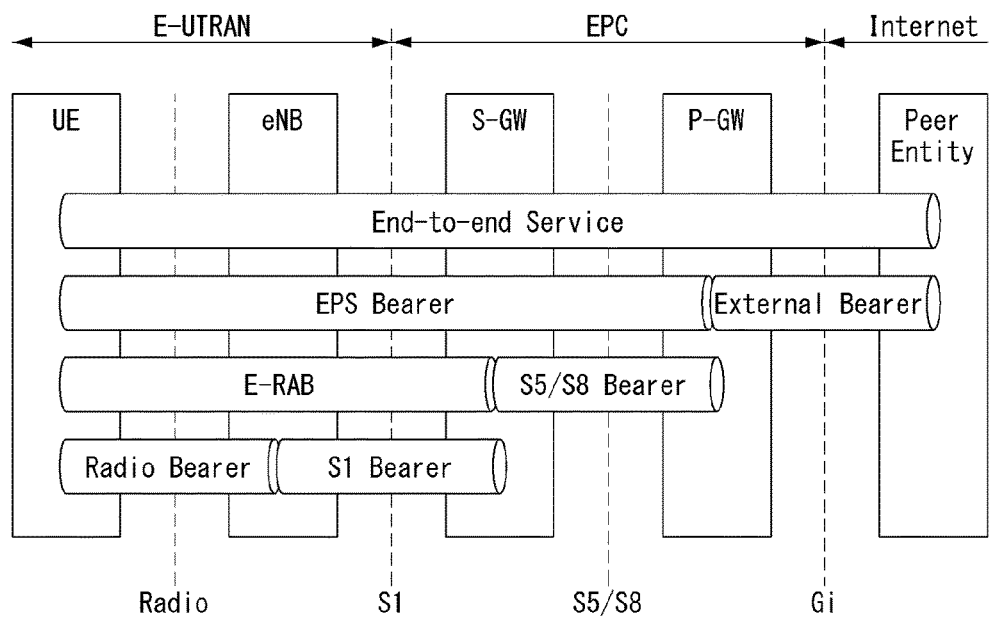
FIG. 15 is a diagram illustrating a bearer structure in a wireless communication system to which the present invention may be applied.

FIG. 15 is a diagram illustrating a bearer structure in a wireless communication system to which the present invention may be applied.

When a UE is connected to a Packet Date Network (PDN), a PDN connection is generated, and the PDN connection may also be called an EPS session. A PDN is an internet protocol network which is exterior or interior of a service provider, and provides a service function such as an internet or IP Multimedia Subsystem (IMS).

The EPS session has one or more EPS bearer. The EPS bearer is the transmission path of traffic generated between a terminal and a PDN GW in order for the EPS to transfer user traffic. One or more EPS bearers may be configured per terminal.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a terminal and an EPC. If the E-RAB is present, the E-RAB bearer and the EPS bearer are mapped in a one-to-one manner. A data radio bearer (DRB) transfers the packet of the EPS bearer between the terminal and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The terminal binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The terminal stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A terminal may have one default bearer or one or more dedicated bearers per PDN. The least default bearer having an EPS session with respect to one PDN is called a default bearer.

The EPS bearer may be classified based on an identity. The EPS bearer identity is allocated by a terminal or an MME. The dedicated bearer(s) is combined with a default bearer by a linked EPS bearer identity (LBI).

When a terminal is initially attached to a network through an initial attach procedure, it receives an IP address allocated thereto and thus a PDN connection is generated. A default bearer is generated at the EPS interval. The default bearer is maintained without being released unless the PDN connection with the terminal is terminated although there is no traffic between the terminal and a corresponding PDN. When the corresponding PDN connection is terminated, the default bearer is also released. In this case, all of bearers in the interval forming a default bearer with the terminal are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a terminal uses a service (e.g., Internet) through a default bearer, if the terminal uses a service (e.g., video on demand (VoD)) insufficient to receive quality of service (QoS) using only the default bearer, a dedicated bearer when the terminal demands the dedicated bearer. If there is no traffic of the terminal, the dedicated bearer is released. A terminal or a network may generate a plurality of dedicated bearers, if necessary.

An IP flow may have a different QoS characteristic depending on that a terminal uses which service. When a network establishes/modifies an EPS session for the terminal, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a terminal. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a terminal via the EPS, it is mapped to an EPS bearer capable of providing proper QoS according to a QoS rule stored in the P-GW.

The PCC rule is divided into a dynamic PCC rule and a pre-defined PCC rule. The dynamic PCC rule is dynamically provided from the PCRF to the P-GW when the EPS session is established/modified. In contrast, the pre-defined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a terminal uses a service through a default bearer, if the terminal uses a service incapable of receiving QoS using only the default bearer, a dedicated bearer is generated in response (on-demand) to a request from the terminal.

Figure 16:
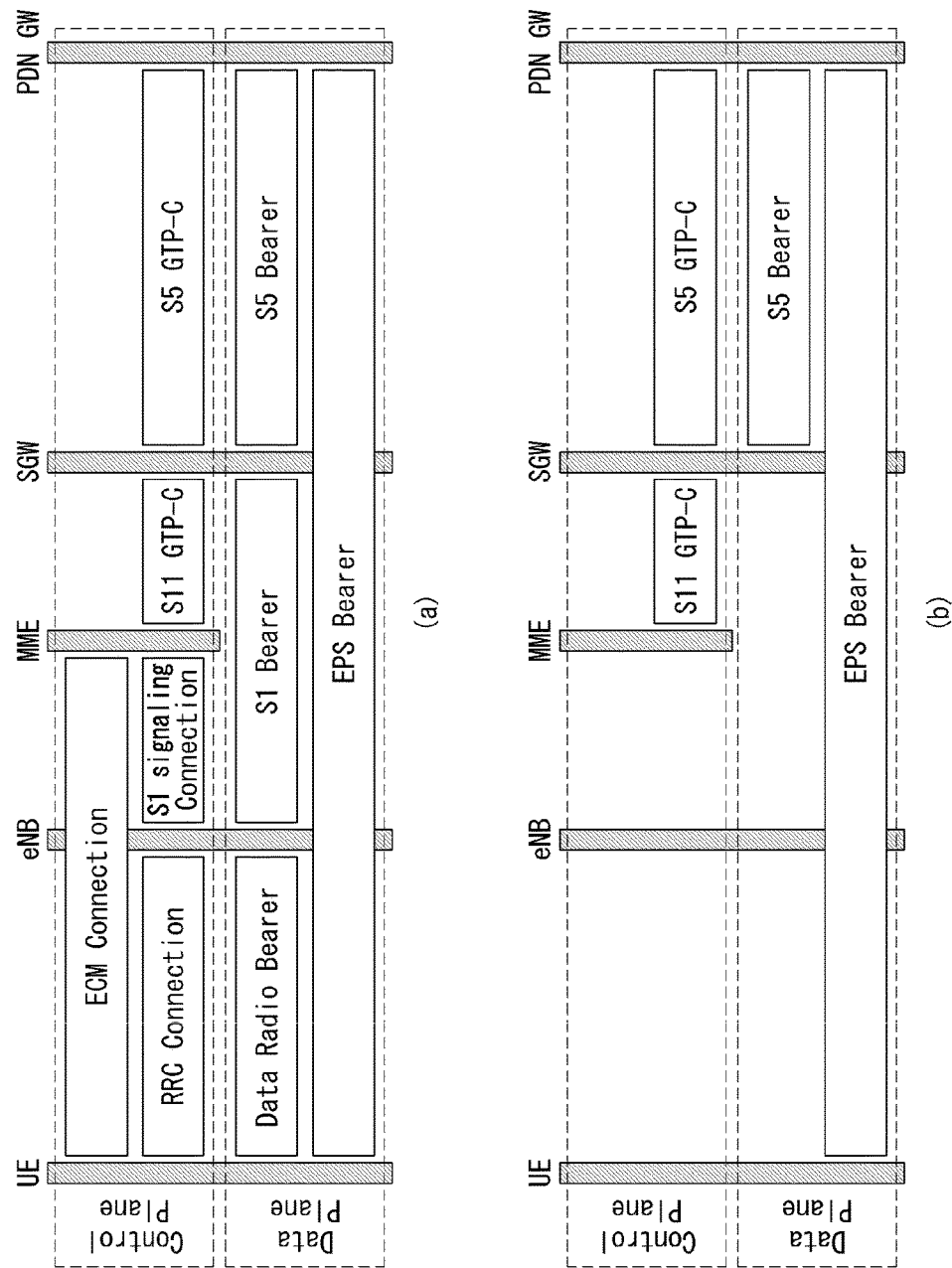
FIG. 16 is a diagram illustrating the transmission path of a control plane and a user plane in an EMM registration state in a wireless communication system to which the present invention may be applied.

FIG. 16 is a diagram illustrating the transmission path of a control plane and a user plane in an EMM registration state in a wireless communication system to which the present invention may be applied.

FIG. 16(a) illustrates an ECM-CONNECTED state, and FIG. 16(b) illustrates ECM-IDLE.

When a terminal becomes the EMM-Registered state by successfully attaching to a network, it is provided with a service using an EPS bearer. As described above, the EPS bearer is divided into a DRB, an S1 bearer, and an S5 bearer for each interval.

As in FIG. 16(a), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 16(b), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

Figure 17:
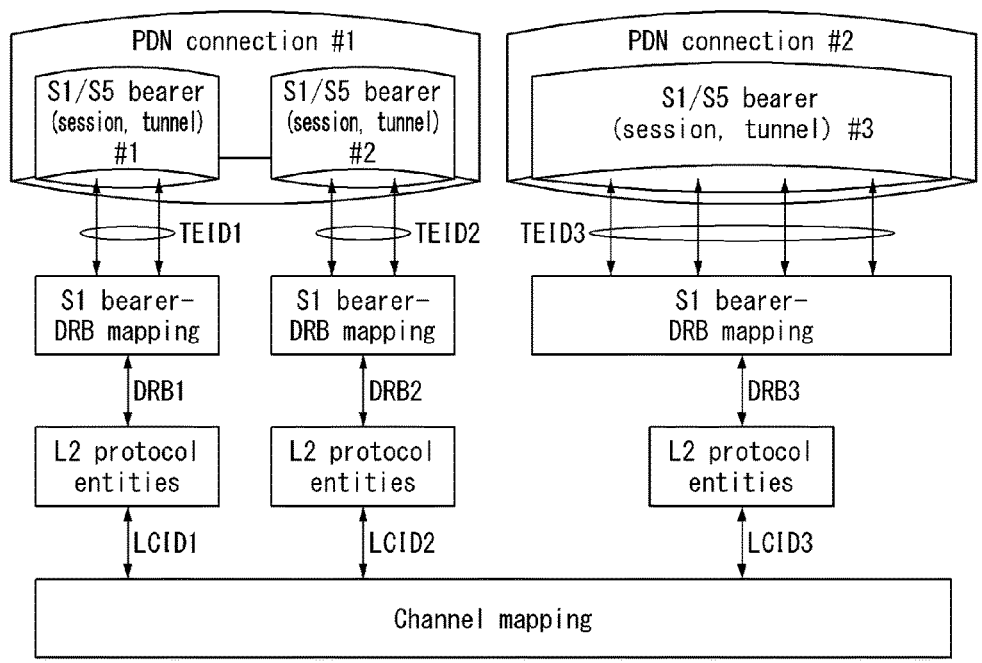
FIG. 17 is a diagram illustrating an example of a mapping relation between a bearer and a channel.

FIG. 17 is a diagram illustrating an example of a mapping relation between a bearer and a channel.

As shown in FIG. 17, a PDN connection including S5/S1 bearer may be mapped to a DRB. In this case, the S5/S8 bearer and the S1 bearer have 1:1 mapping relation.

The DRB is mapped to L2 Protocol entities, and the L2 Protocol entities are mapped to each transport channel.

Figure 18:
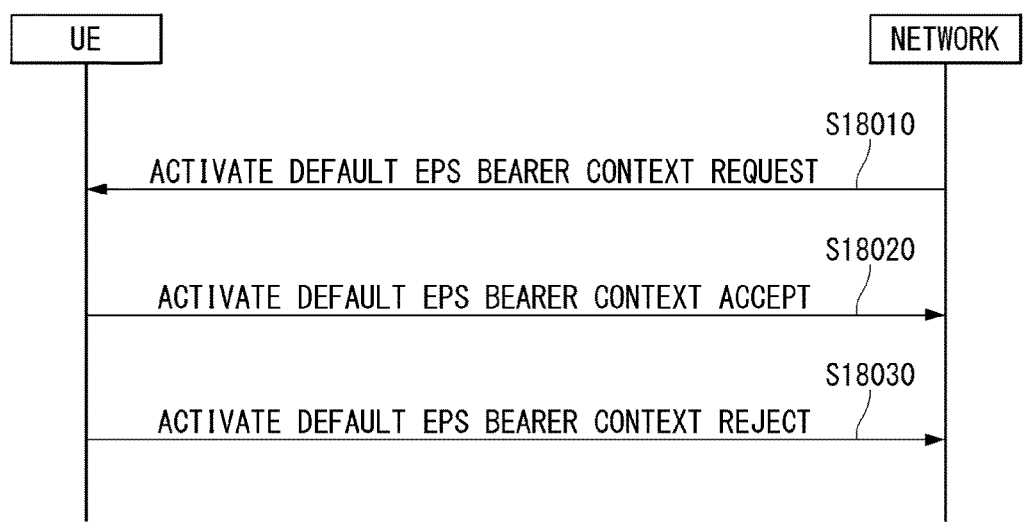
FIG. 18 is a diagram showing an example of a default bearer activation procedure.

FIG. 18 is a diagram illustrating an example of a default bearer activation procedure.

In order to activate a default bearer, an MME may perform a default bearer context activation procedure by transmitting an ACTIVATE DEFAULT EPS BEARER CONTEXT REQUEST message, and may enter BEARER CONTEXT ACTIVE PENDING state (step, S18010).

In the case that the default bearer is activated as a part of an attach procedure, the MME may transmit the ACTIVATE DEFAULT EPS BEARER CONTEXT REQUEST message together with an ATTACH ACCEPT message, and may not start T3485 timer.

Except the attach procedure, in the case that the default bearer is activated in response to a stand-alone PDN CONNECTIVITY REQUEST message, the MME sends the ACTIVATE DEFAULT EPS BEARER CONTEXT REQUEST message independently, and starts T3485 timer.

The MME may allocate an EPS bearer identifier and may include it in the ACTIVATE DEFAULT EPS BEARER CONTEXT REQUEST message. The MME obtains PTI from the PDN CONNECTIVITY REQUEST, and includes it in the ACTIVATE DEFAULT EPS BEARER CONTEXT REQUEST message.

Both of the network identifier part and the operator identifier part may be included in the Access Point Name IE.

After the ACTIVATE DEFAULT EPS BEARER CONTEXT REQUEST message is received, in the case that a timer for APN indicated by the message is operating, the UE may stop T336 timer, and may transmit an ACTIVATE DEFAULT EPS BEARER CONTEXT ACCEPT message and enter BEARER CONTEXT ACTIVE state (step, S18020).

In the case that the default bearer is activated as a part of the attach procedure, the UE may transmit the ACTIVATE DEFAULT EPS BEARER CONTEXT ACCEPT message together with an ATTACH COMLETE message.

In the case that the default bearer is activated as a response to the stand-alone PDN CONNECTIVITY REQUEST message, the UE may transmit the ACTIVATE DEFAULT EPS BEARER CONTEXT ACCEPT message independently.

In the case that WLAN offload indication information element is included in the ACTIVATE DEFAULT EPS BEARER CONTEXT REQUEST message, the UE may store the WLAN offload acceptability values, and may use the E-UTRAN offload acceptability value in order to determine whether a PDN connection is offloadable.

In order to identify a UE requested PDN connectivity procedure in relation to the default bearer context activation, the UE may check PTI of the ACTIVATE DEFAULT EPS BEARER CONTEXT REQUEST message.

After receiving the ACTIVATE DEFAULT EPS BEARER CONTEXT ACCEPT message, the MME may enter a BEARER CONTEXT ACTIVE state, and may stop T3485 timer when it is operating.

In the case that the PDN CONNECTIVITY REQUEST message includes a low priority indicator setup as "MS is configured for NAS signaling low priority", the MME may store the NAS signaling low priority indication in the default EPS bearer context.

In the case that the default EPS bearer context activation is a part of the attach procedure, an ESN sub layer may notify ESM failure to an EMM sub layer.

In the case that that the default EPS bearer context activation is not a part of the attach procedure, the UE may transmit an ACTIVATE DEFAULT EPS BEARER CONTEXT REJECT message, and may enter a BEARER CONTEXT INACTIVE (step, S18030).

The ACTIVATE DEFAULT EPS BEARER CONTEXT REJECT message may include ESM causes that are represented as one of the following cause values, generally.

26: insufficient resources;
31: request rejected, unspecified; or
95-111: protocol errors.

After receiving the ACTIVATE DEFAULT EPS BEARER CONTEXT REJECT message, the MME may enter a state BEARER CONTEXT INACTIVE state, and when T3485 timer is operating, the MME may stop it.

Figure 19:
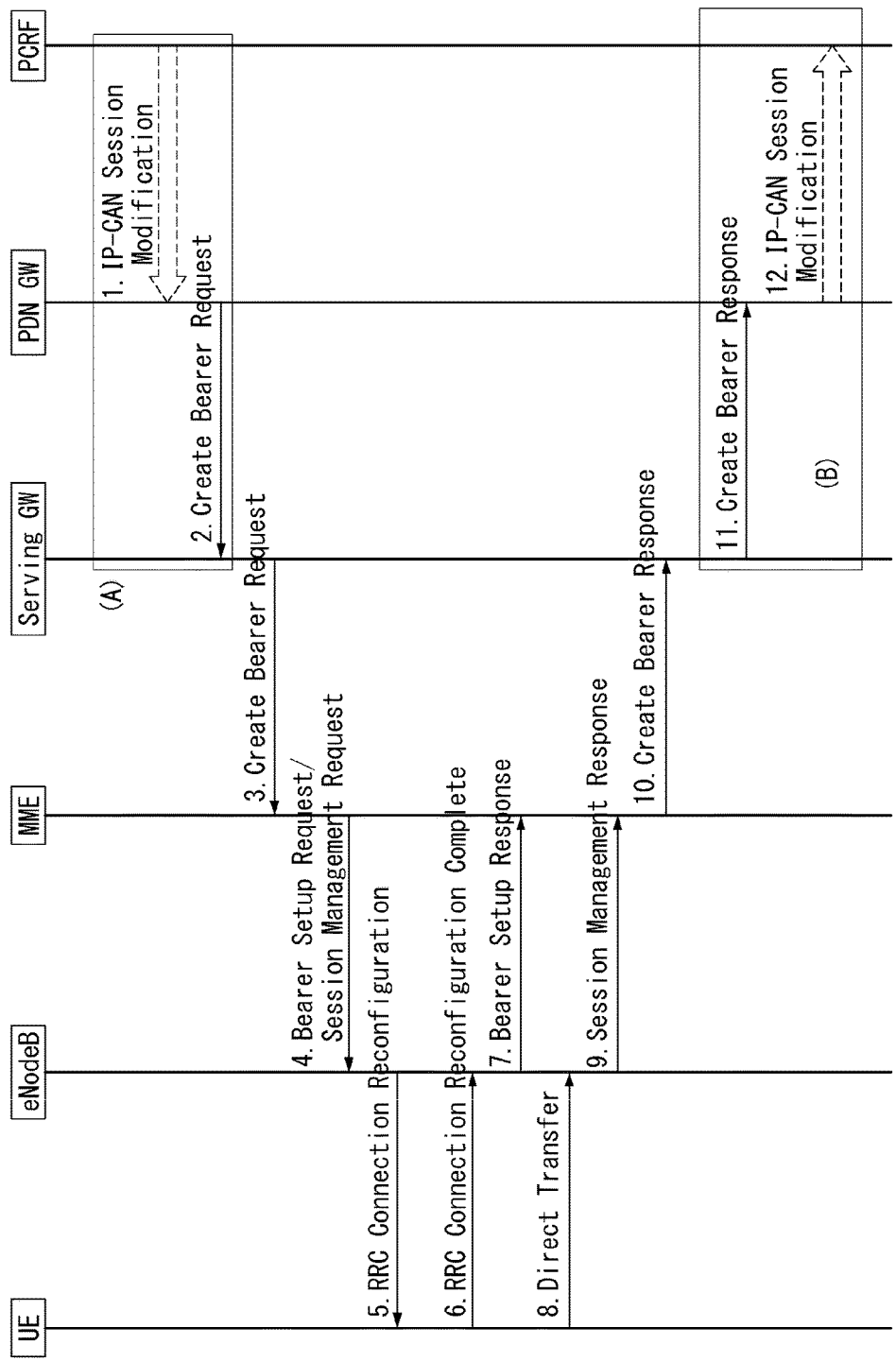
FIG. 19 is a diagram showing an example of a dedicated bearer deactivation procedure.

FIG. 19 is a diagram illustrating an example of a dedicated bearer deactivation procedure.

FIG. 19 above is a flowchart illustrating a dedicated bearer activation procedure for S5/S8 based on GPRS Tunneling Protocol (GTP).

First, if a dynamic PCC is disposed, the PCRF transmits a PCC decision provision (QoS policy) message to the PDN GW.

Next, the PDN GW transmits a Create Bearer Request message (IMSI, PTI, EPS Bearer QoS, TFT, S5/S8 TEID, Charging Id, LBI, Protocol Configuration Options) for requesting the creation of a bearer to the Serving GW.

Next, the Serving GW transmits a Create Bearer Request (IMSI, PTI, EPS Bearer QoS, TFT, S1-TEID, PDN GW TEID (GTP-based S5/S8), LBI, Protocol Configuration Options) message to the MME.

Next, the MME transmits a Bearer Setup Request (EPS Bearer Identity, EPS Bearer QoS, Session Management Request, S1-TEID) message for requesting a bearer configuration to an eNodeB.

Next, the eNodeB transmits an RRC Connection Reconfiguration (Radio Bearer QoS, Session Management Request, EPS RB Identity) message to a UE.

Next, the UE transmits an RRC Connection Reconfiguration Complete message to the eNodeB in order to notify the eNodeB of radio bearer activation.

Next, the eNodeB transmits a Bearer Setup Response (EPS Bearer Identity, S1-TEID) message to the MME in order to notify the MME of the radio bearer activation in the UE.

Next, the UE transmits a Direct Transfer (Session Management Response) message to the eNodeB.

Next, the eNodeB transmits an Uplink NAS Transport (Session Management Response) message to the MME.

Next, the MME transmits a Create Bearer Response (EPS Bearer Identity, S1-TEID, User Location Information (ECGI)) message to the Serving GW in order to notify the Serving GW of the bearer activation.

Next, the Serving GW transmits a Create Bearer Response (EPS Bearer Identity, S5/S8-TEID, User Location Information (ECGI)) message to the PDN GW in order to notify the PDN GW of the bearer activation.

If a dedicated bearer activation procedure has been triggered by a PCC Decision Provision message from the PCRF, the PDN GW indicates whether a requested PCC decision (QoS policy) has been performed for the PCRF.

Figure 20:
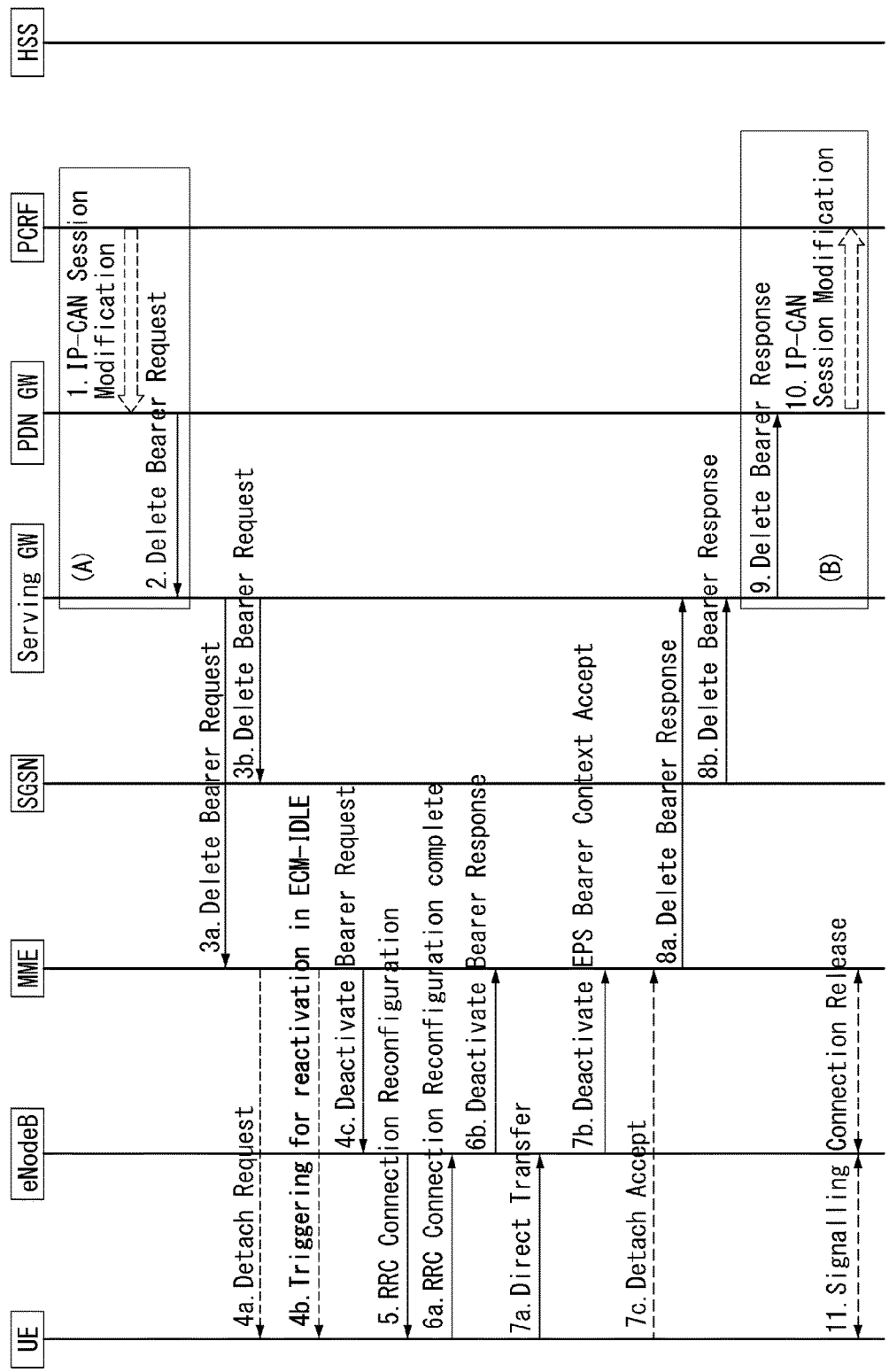
FIG. 20 is a diagram showing an example of a dedicated bearer deactivation procedure.

FIG. 20 is a diagram illustrating an example of a dedicated bearer deactivation procedure.

FIG. 20 above is a flowchart illustrating a dedicated bearer deactivation procedure for S5/S8 based on GPRS Tunneling Protocol (GTP).

The procedure of FIG. 20 may be used for deactivating a dedicated bearer or deactivating all bearers belonged to a PDN address.

In the case that a default bearer belonged to a PDN connection is deactivated, a PDN GW deactivates all bearers belonged to the PDN connection. The detailed procedure is referred to FIG. 20 above.

Figure 21:
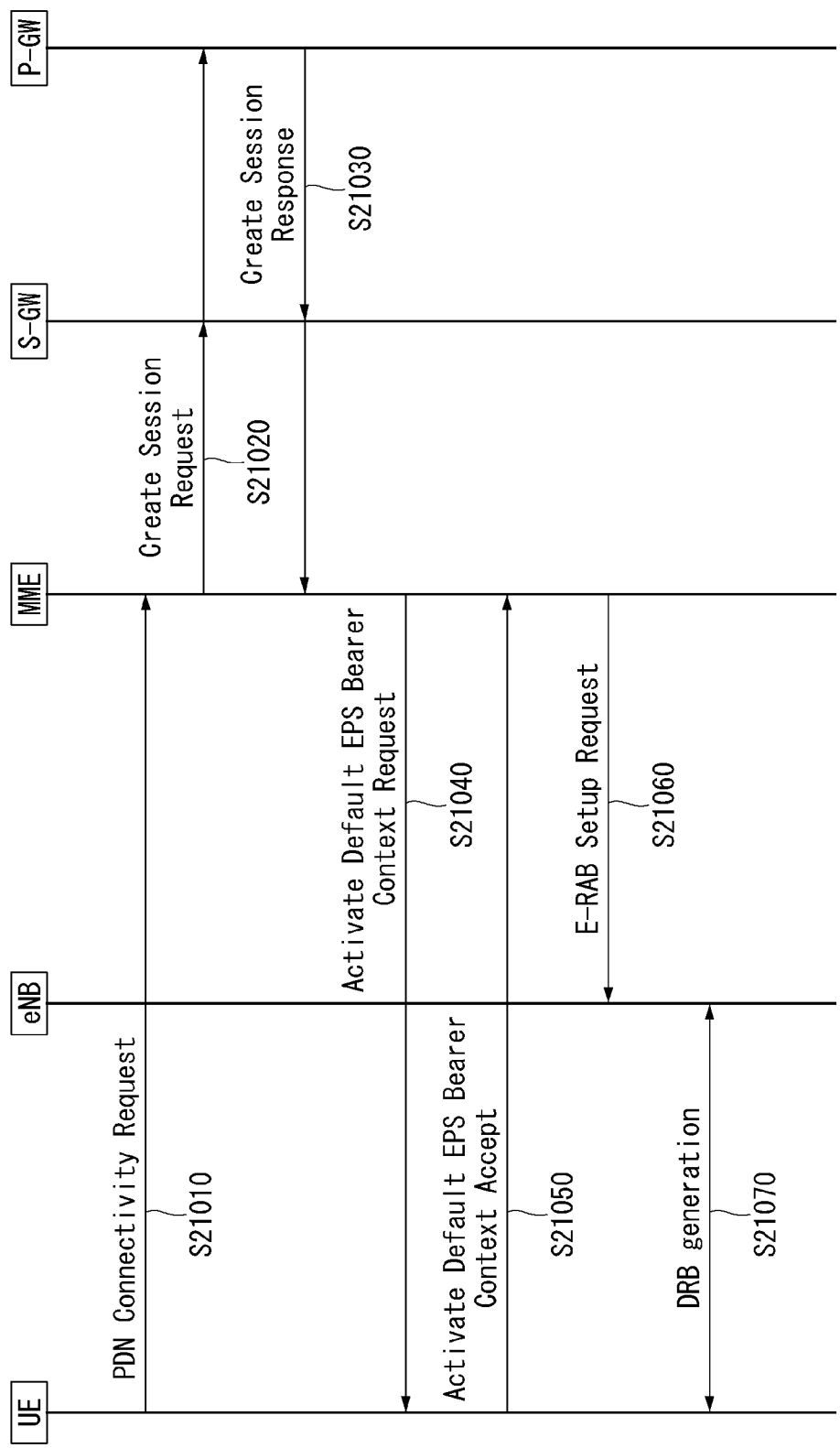
FIGS. 21 and 22 are diagrams illustrating an example of a procedure for generating a default bearer of a UE in a connected state.
Figure 22:
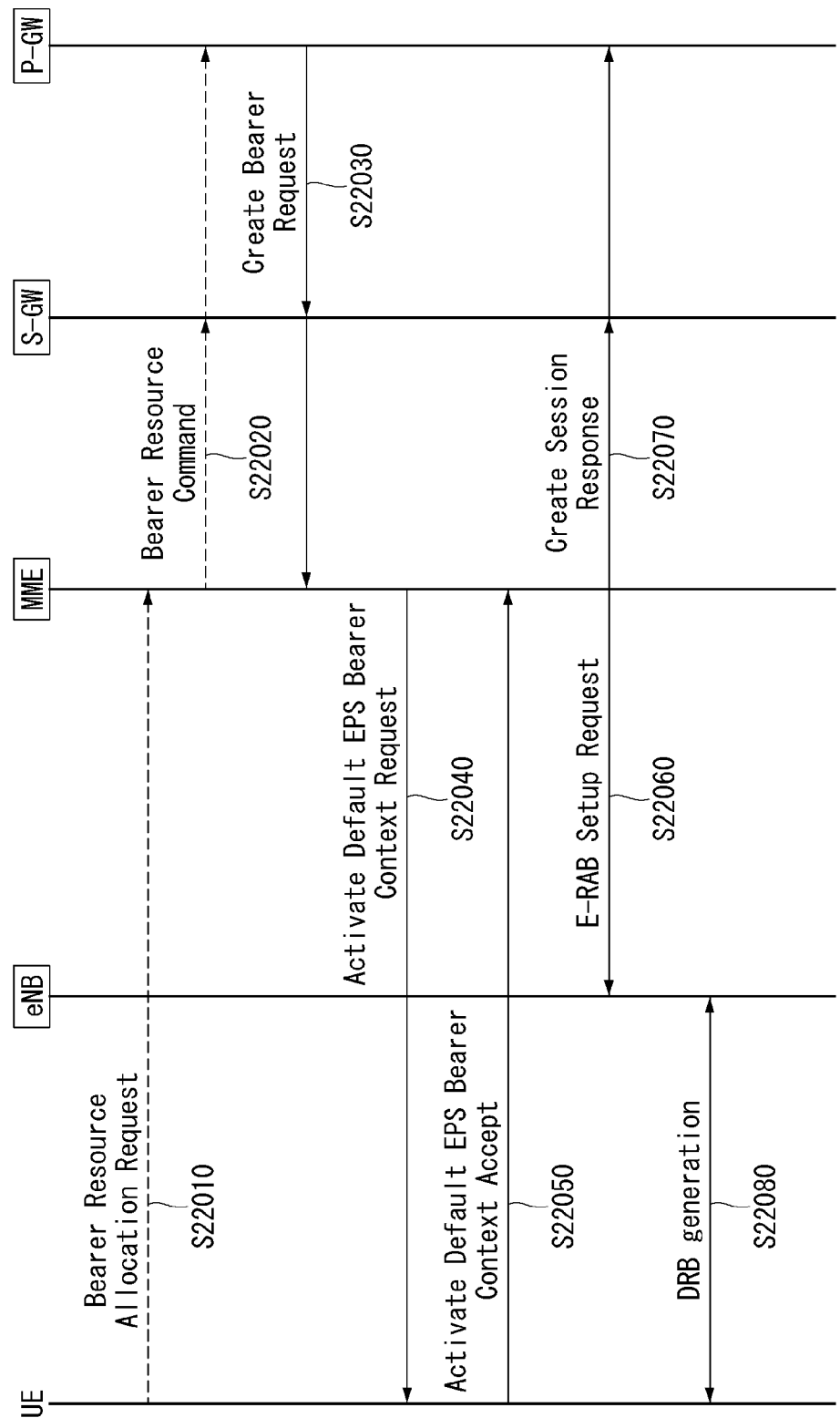

FIGS. 21 and 22 are diagrams illustrating an example of a procedure for generating a default bearer of a UE in a connected state.

The UE in a connected state in FIG. 21 transmits a PDN Connectivity Request message to an MME in order to generate a new EPS bearer for providing a new service (step, S21010).

The MME that receives the PDN Connectivity Request message transmits a Create Session Request message to an S-GW in order to generate a new session, and the S-GW transmits it to a P-GW (step, S21020).

In the case that the P-GW is intended to generate a new session by a request of the UE, the P-GW transmits a Create Session Response message to the S-GW, and the S-GW transmits it to the MME (step, S21030).

Later, the MME transmits an Activate Default EPS Bearer Context Request message to the UE, as described in FIG. 18, and in response to it, the UE transmits an Activate Default EPS Bearer Context Response message to the MME (steps, S21040 and S21050).

Then, the MME transmits an E-RAB Setup Request message that requests a configuration of a Radio Access Bearer (RAB) to an eNB (step, S21060), and the eNB generates a DRB with the UE (step, S21070).

FIG. 22 is a flowchart illustrating another example of a procedure for generating a default bearer of the UE in a connected state.

Referring to FIG. 22, the UE transmits a bearer resource allocation request message to the UE (step, S22010). The MME that receives the bearer resource allocation request message transmits a bearer resource command message to an S-GW, and the S-GW transmits it to a P-GW (step, S22020).

In the case that the request of the UE is accepted, the default bearer activation procedure may be progressed.

For the default bearer activation procedure, the P-GW transmits a Create Bearer Request message to the S-GW, and the S-GW transmits it to the MME (step, S22030).

Later, the MME transmits an Activate Default EPS Bearer Context Request message to the UE, as described in FIG. 17, and in response to it, the UE transmits an Activate Default EPS Bearer Context Response message to the MME (steps, S22040 and S22050).

Then, the MME transmits an E-RAB Setup Request message that requests a configuration of a Radio Access Bearer (RAB) to an eNB (step, S22060), and transmits a Create Session Response message to the P-GW through the S-GW (step, S22070).

The eNB that receives the E-RAB Setup Request message generates a DRB with the UE (step, S22080).

Figure 23:
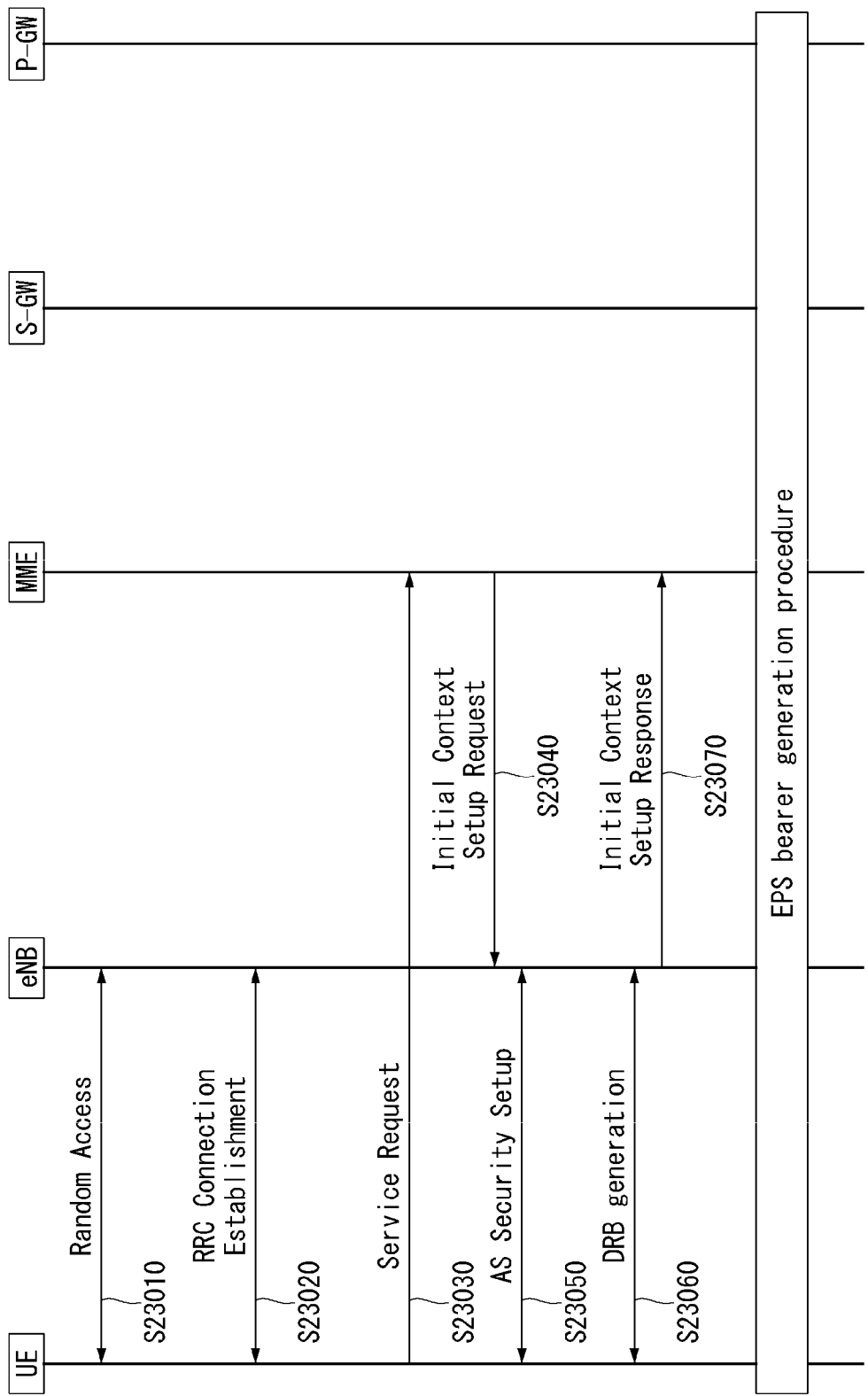
FIG. 23 is a diagram illustrating an example of a procedure for generating a default bearer of a UE in a non-connected state.

FIG. 23 is a diagram illustrating an example of a procedure for generating a default bearer of a UE in a non-connected state.

Referring to FIG. 23, a UE in a non-connected state performs a Random Access Procedure described above with an eNB in order to generate an EPS bearer for providing a service (step, S23010), and establishes an RRC connection (step, S23020).

In this case, in the RRC connection establishment procedure, the UE may transmit a Service request message to the eNB, and the eNB may transmit the Service request message to the MME (step, S23030).

The MME that receives the Service request message transmits an Initial Context Setup Request message to the eNB (step, S23040), and the eNB performs an AS Security Setup Request Procedure with the UE (step, S23050).

Later, the eNB generates a DRB with the UE (step, S23060), and transmits an Initial Context Setup Response message to the MME (step, S23070).

And then, an EPS bearer is generated through the procedure described in FIG. 21 or FIG. 22 above.

However, in the case of transmitting data by configuring a logical path for transmitting and receiving data through the procedure described in FIG. 21 to FIG. 23, delay may occur owing to the procedure for generating the logical path, and resource consumption may occur owing to managements of a plurality of logical paths in a network.

Table 3 below represents an example of a delay time according to a UE state.

TABLE 3

| | | E2E data transmission delay (ms) | |
|---|---|---|---|
| | Item | UE in connected state | UE in idle state |
| Standard | State shift (ref. 3GPP TR) | 0 | 85 |
| | EPS bearer configuration (ref. Huawei) | 176 | 176 |
| Implementation (ref. T-mobile) | DNS (Domain Name System) | 220 | 220 |
| | TCP (Transmission Control Protocol) connection | 220 | 220 |
| | TLS (Transport Layer Security) handshake | 220~440 | 220~440 |
| | App. data request | 220 | 220 |
| | Total | 1056~1276 | 1056~1276 |

Referring to Table 3, transmission delay exceeds 1 second for all cases in the existing system. For a communication service provider and a network manufacturer, there is a restriction in a method for reducing an implementation item delay by developing a network platform in which a function such as mobile contents caching, DNS caching, and the like is mounted. Accordingly, a technique for reducing delay is required for atypical contents service (e.g., telepresence) and a service in which delay restriction is existed (e.g., V2N Traffic Flow Optimization). Accordingly, in order to reduce delay for providing a service, the present invention proposes a method for using a part or the whole of a logical path which is generated previously or transmitting data transmitted via the same network node through a single logical path even in the case that a service quality is different.

Figure 24:
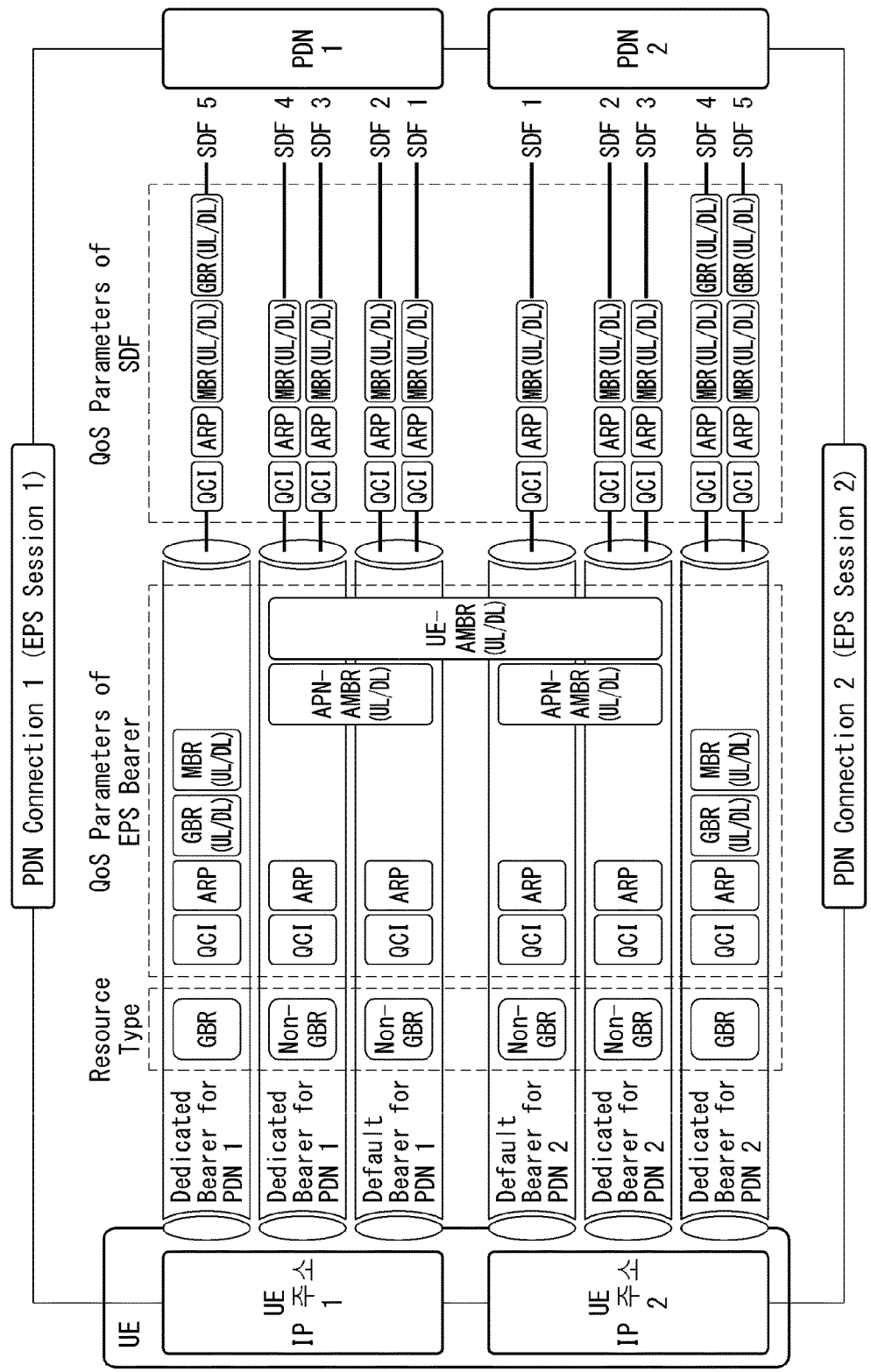
FIG. 24 is a diagram illustrating an example of a parameter configuration for Quality of Service (QoS) management.

FIG. 24 is a diagram illustrating an example of a parameter configuration for Quality of Service (QoS) management.

Referring to FIG. 24, a wireless communication system applies a QoS policy in a Service Data Flow (SDF) unit including one or more IP flows in which a user traffic is classified for each service and an EPS bearer unit which is a logical path through which one or more SDFs are transmitted. That is, QoS of the data transmitted and received is managed by the following QoS parameters.

Resource type: Whether to guarantee a bandwidth

Guaranteed bit rate (GBR): Guaranteed minimum bandwidth

Maximum bit rate (MBR): Allowed maximum bandwidth

Access Point Name-Aggregate Maximum Bit Rate (APN-AMBR): Maximum bandwidth allowed for each APN UE-AMBR: Maximum bandwidth allowed for each UE When packets are incoming with a bandwidth or broader specified in MBR, APN-AMBR and UE-AMBR, which are QoS parameters, each entity mentioned below discards the over-incoming packets.

Rate Policing for Downlink Data

First step: A P-GW discards packets that exceed MBR for each incoming SDF.

Second step: A P-GW discards packets that exceed MBR for each one or more SDF incoming in each GBR EPS bearer and discards packets that exceed APN-AMBR for one or more SDF incoming in all non-GBR EPS bearers.

Third step: An eNB discards packets that exceed UE-AMBR for one or more SDFs incoming in all Non-GBR EPS bearers.

Rate Policing for Uplink Data

First step: A UE discards packets that exceed MBR (GBR) and APN-AMBR (Non-GBR).

Second step: An eNB discards packets that exceed MBR (GBR) and UE-AMBR (Non-GBR).

Third step: A P-GW discards packets that exceed APN-AMBR for one or more SDF incoming in all non-GBR EPS bearers and discards packets that exceed MBR for each SDF.

Such that additional data transmission delay does not occur owing to the logical path configuration procedure as shown in FIG. 21 to FIG. 23, the following problems may occur in the approaches of generating/maintaining a logical path (e.g., EPS bearer in 3GPP) for data which is going to be transmitted before data generation in advance.

Degradation of quality for other services of a user: The rate policing may influence on the quality (e.g., data rate) of other services which are actually provided.

Decrease of receptive capability of other users/services: In the case that network resources are in short, owing to preoccupied resources (GBR) and the like, a request for generating a new EPS bearer may be rejected or an EPS bearer of which priority is low may be released.

Figure 25:
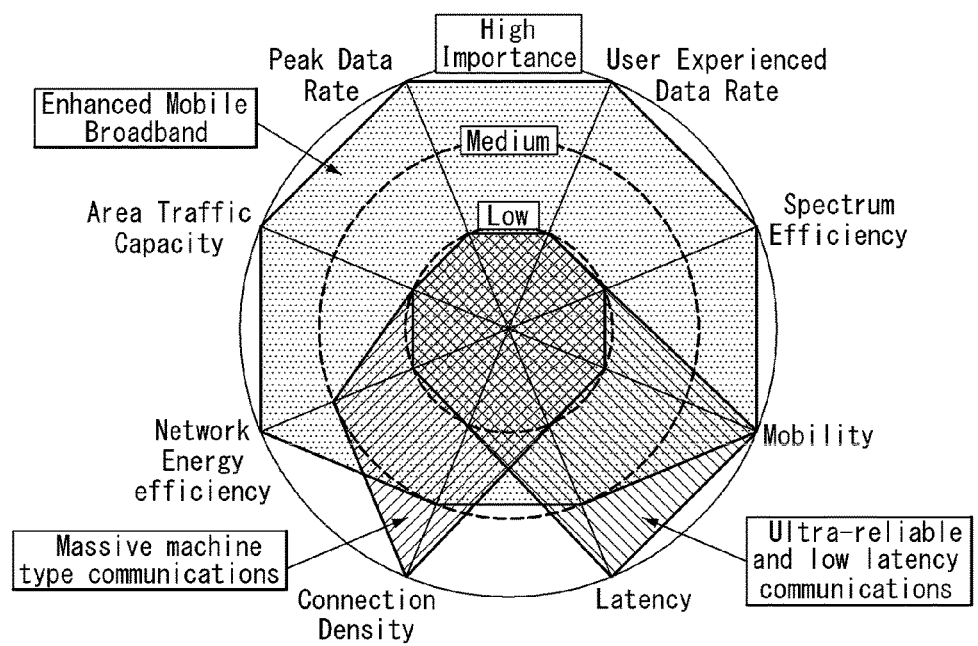
Figure 26:
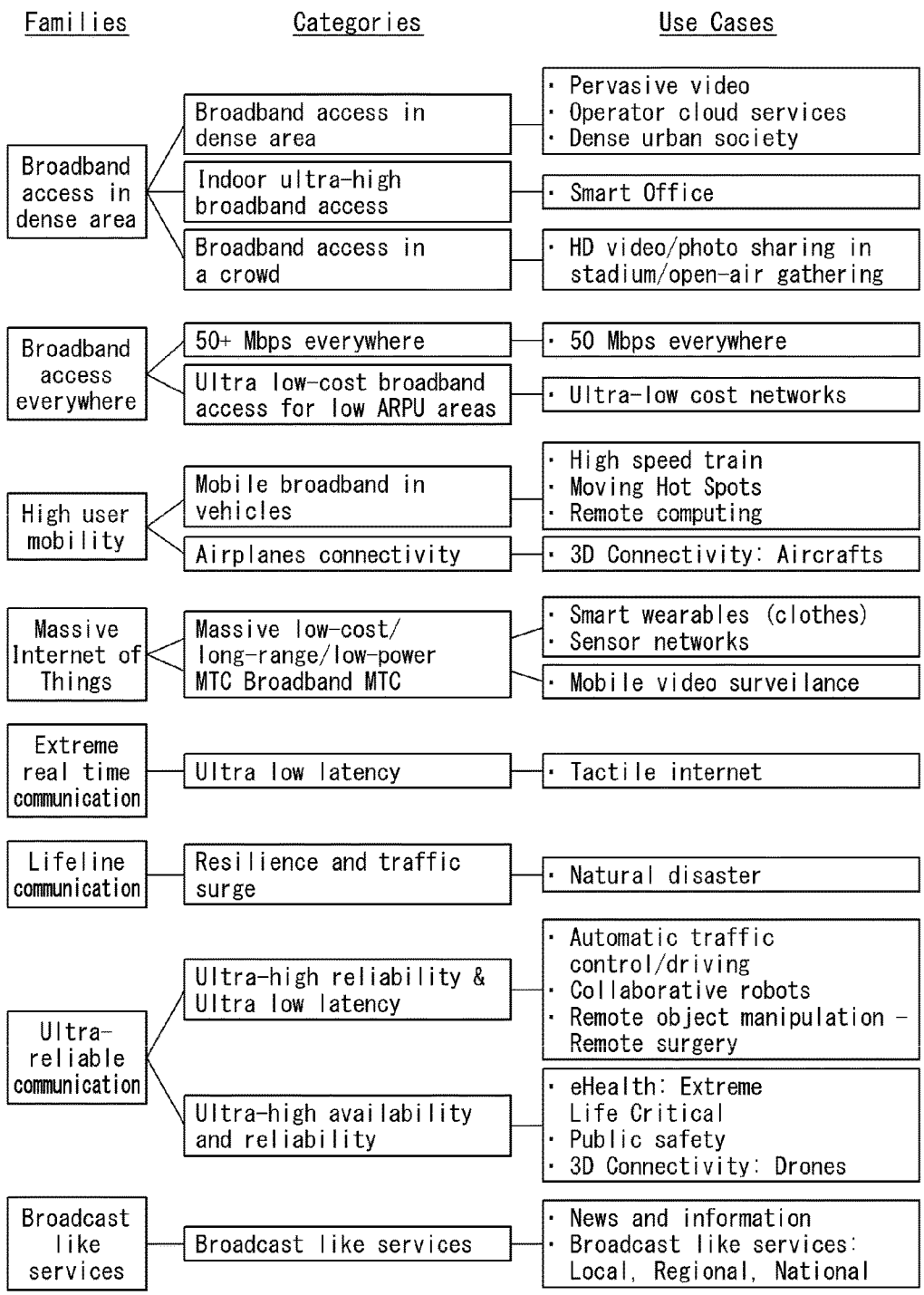

FIGS. 25 and 26 are diagrams illustrating an example of types and requirements of 5G service.

Referring to FIG. 25 and FIG. 26, 5G service may be divided into 'Enhanced Mobile Broadband' that requires transmission/reception of massive data, 'Massive Machine type Communication' that requires massive UE access and 'Ultra-reliable and Low latency Communication' that requires high reliability and low latency, largely.

FIG. 26 above shows an example of types, properties and user cases of each service, and FIG. 27 above illustrates an example of requirements for each service.

Referring to FIG. 27, in 5G system, each service requires different transmission delay. For example, the services shown in FIG. 26 require the transmission delay of minimum 1 ms to maximum 100 ms.

However, referring to Table 4 below, in a current system, initial transmission delay exceeds 1 sec for all cases.

TABLE 4

| | | E2E data transmission delay (ms) | |
|---|---|---|---|
| Item | | UE in connected state | UE in idle state |
| Standard | State shift | 0 | 85 |
| | EPS bearer configuration | 176 | 176 |
| Implementation | DNS (Domain Name System) Lookup | 220 | 220 |
| | TCP (Transmission Control Protocol) connection | 220 | 220 |
| | TLS (Transport Layer Security) handshake | 220~440 | 220~440 |
| | App. data request | 220 | 220 |
| | Total | 1056~1276 | 1141~1361 |

Accordingly, in order to satisfy requested delay of a service, the present invention proposes a method that may decrease initial transmission delay.

Figure 28:
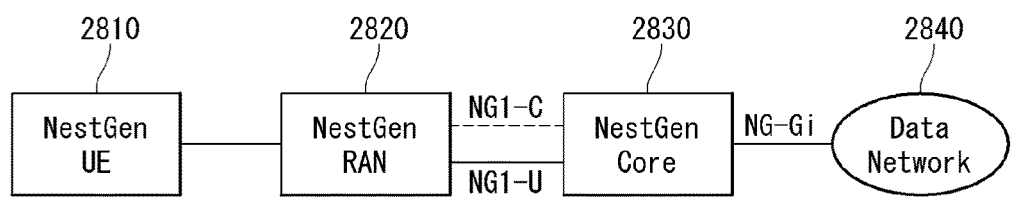
FIG. 28 is a diagram illustrating an example of a wireless communication system architecture for supporting next generation RAN to which the methods proposed in the present disclosure may be applied.
Figure 29:
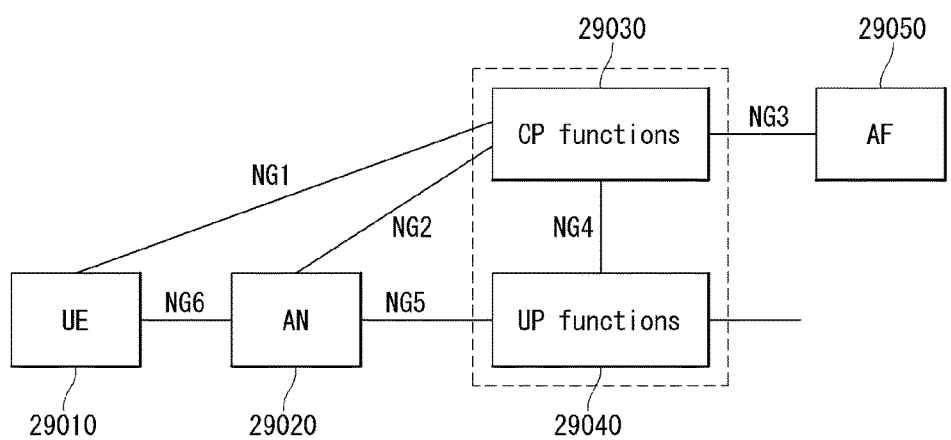
FIG. 29 is a diagram illustrating another example of a wireless communication system architecture for supporting next generation RAN to which the methods proposed in the present disclosure may be applied.
Figure 30:
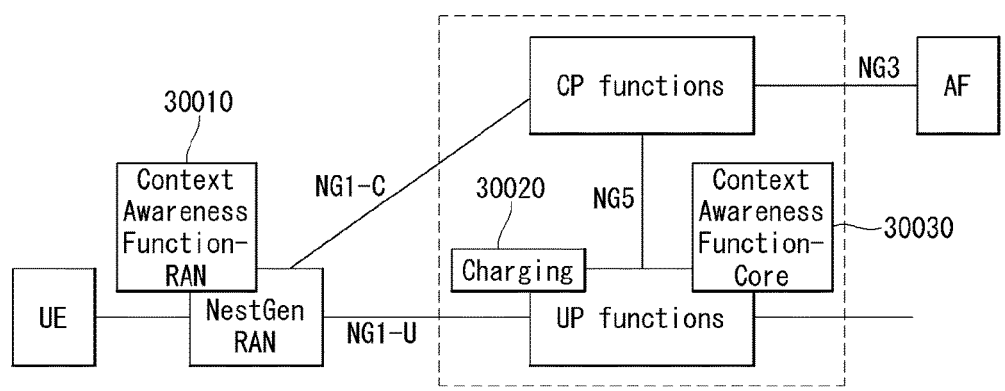
FIG. 30 illustrates an example of QoS structure used in QoS framework to which the method proposed in the present disclosure may be applied.

Next, with reference to FIG. 28 to FIG. 30, examples of wireless communication system architectures for supporting next generation RAN to which the methods proposed in the present disclosure may be applied.

FIG. 28 is a diagram illustrating an example of a wireless communication system architecture for supporting next generation RAN to which the methods proposed in the present disclosure may be applied.

The wireless communication system architecture for supporting next generation RAN may be represented as 'high level architecture'.

The next generation may be briefly represented as "Next Gen" or the like, and the next generation may be commonly called as a term of future communication generation including 5G and the like.

For the convenience of description, hereinafter, the next generation is represented or called as "Next Gen".

Architecture of the "Next Gen" to which the methods proposed in the present disclosure may be applied may support new RAT(s), evolved LTE and non-3GPP access types.

An example of the non-3GPP access types may be a WLAN access, a fixed access, and so on.

In addition, the "Next Gen" architecture supports unified authentication framework with respect to other access systems, and supports simultaneous connection with a plurality of UEs through a plurality of access technologies.

Furthermore, the "Next Gen" architecture permits a core network and an independent evolution of RAN, and minimizes access dependency.

In addition, the "Next Gen" architecture supports separation of control plane and user plane functions, and supports transmissions of IP packets, non-IP PDUs and Ethernet frames.

Referring to FIG. 28, the "Next Gen" architecture may include a NextGen UE 2810, NextGen RAN 2820, NextGen Core 2830 and Data network 2840.

Here, in a wireless communication system of the "Next Gen", a UE may be represented as "NextGen UE", a RAN defining a wireless protocol architecture between a UE and an eNB may be represented as "NextGen RAN", and a Core Network performing a mobility control of a UE, a flow management of IP packets, and so on may be represented as "NextGen Core".

For example, "NextGen RAN" may correspond to E-UTRAN in LTE(-A) system, "NextGen Core" may correspond to EPC in LTE(-A) system and network entities that perform a function such as an MME, an S-GW, a P-GW, and so on in LTE PCE may also be included in NextGen Core.

NG1-C interface and NG1-U interface are existed between the NextGen RAN and the NextGen Core, and NG-Gi interface is existed the NextGen Core and the Data Network.

Here, NG1-C represents a reference point for a control plane between the NextGen RAN and the NextGen Core, and NG1-U represents a reference point for a user plane between the NextGen RAN and the NextGen Core.

NG-NAS represents a reference point for a control plane between the NextGen UE and the NextGen Core, although it is not shown in FIG. 28.

In addition, NG-Gi represents a reference point between the NextGen Core and the Data network.

Here, the Data network may be an operator external public network, a private data network, an intra-operator data network, or the like.

FIG. 29 is a diagram illustrating another example of a wireless communication system architecture for supporting next generation RAN to which the methods proposed in the present disclosure may be applied.

Particularly, in FIG. 29, the NextGen Core of FIG. 28 is subdivided into a control plane (CP) function and a user plane (UP) function, and interfaces among UE/AN/AF are shown in detail.

Referring to FIG. 29, a QoS handling method based on flow will be described in more detail.

Referring to FIG. 29, a policy of Quality Of Service (QoS) to which the present invention is applied may be stored and configured in a Control Plane (CP) Function 29030 due to the following reasons.

Application in a User Plane (UP) Function 29040

A transmission in an Admission Control 29020 and a UE 29010 for applying QoS

Hereinafter, parameters for defining the QoS framework will be described.

Flow Priority Indicator (FPI): This represents parameters defining a priority in each flow process in the UP Functions 29040 and the AN Functions 29020. This corresponds to a priority in a congested case as well as a scheduled priority.

In addition, the FPI represents whether the flow requires a flow bit rate in which the flow is guaranteed and/or a maximum flow bit rate.

Flow Descriptor: Packet filters in relation to a specific flow process. Identification in uplink should be performed in the UE and the AN 29020, but limited to layer 3 and layer 4.

Maximum Flow Bitrate (MFB): This is a parameter that represents uplink and downlink bit rate value that may be applied for a flow or a combination of flows.

The parameter represents a maximum bit rate authorized for a data floor.

Flow Priority Level (FPL): This is a parameter that defines a state importance of a flow for an access to AN 29020 resource. Additionally, the FPL represents whether to access AN 29020 non-prioritized resource. The non-prioritized resource should be a resource of being emptable in advance or an allocated resource protected from pre-emption.

Session Bitrate: This is a parameter that represents a bit rate value in uplink and downlink for establishing a user session. The Session Bitrate parameter represents an allowed maximum bit rate for a user session.

A support of the GFP depends on QoS design of the radio interface.

As shown in FIG. 29, the CP functions and the UP functions are functions included in the NestGen CN (denoted by a dotted line), and may be implemented by a single physical device or by different respective physical devices.

FIG. 30 illustrates an example of QoS structure used in QoS framework to which the method proposed in the present disclosure may be applied.

Content Requirement Awareness Function in the Core (CAF-Core)

The CAF-Core 30030 supports a mechanism for identifying application sessions (e.g., video download, web page download, listening to music, posting for a social media network, etc.) and for enforcing QoS policies in relation to a discovered application.

The CAF-Core receives QoS policies from a Core CP. The application discovery is performed by a means of non-standardized algorisms (e.g., use pattern, heuristics, and SNF discovery for encoded traffic).

The CAF performs QoS enforcement in a CN based on the QoS policies received from the Core CP.

The CAF-Core may process the QoS policies, and may obtain dynamic QoS targets and local enforcement actions in a CN.

In addition, within restrictions of the QoS policies provided by NG Core CP functions, based on user plane traffic mix, simultaneous competing flows, and current contents requirements of network status and resource usability, this may update these in real time. As such, the CAF-Core enforces QoS policies within the given policy restrictions, and there is no deviation exceeding a range.

Content Requirement Awareness Function in the RAN (CAF-RAN)

The CAF-RAN 30010 supports a mechanism for identifying application sessions (e.g., video download, web page download, listening to music, posting for a social media network, etc.) and for enforcing QoS policies.

The CAF-RAN receives QoS policies from a Core CP. The CAF-RAN may use application discovery information provided by the Core, the application discovery information may suggest additional specific requirements for a certain application session and may establish a traffic for a given session simultaneously. The CAF-RAN performs QoS enforcement based on the QoS policies received from the Core CP. This includes a traffic formation for DL and UL. The DL traffic formation helps to control a flow of UL traffic.

The CAF-RAN may process the QoS policies, and may obtain dynamic QoS targets and local enforcement actions in a RAN. In addition, within restrictions of the QoS policies provided by NG Core, based on user plane traffic mix, simultaneous competing flows, and current contents requirements of network status and resource usability, this may update these in real time. As such, the CAF-RAN enforces QoS policies within the given policy restrictions, and there is no deviation exceeding a range.

The RAN is restricted by charging performed in the core, and accordingly, there is no influence on charging performed in an UP function in the core. A specific amount of traffic charged by the core is provided with the RAN in relation to packet marking together with application marking, and the CAF-RAN enforces and preserves the charged amount in relation to bits.

Coordination Between CAF-Core and CAF-RAN

A CAF-Core may perform an application discovery, and may provide information in a form of packet marking based in received policies from a CN CP.

The formation of traffic and the policy execution of CAF-RAN are restricted by a packet marking which is represented by the policies received from the CAF-Core and the CN CP. This helps the CAF-Core and the CAF-RAN to operate in cooperative manner, and the charging is performed by an application represented by the CAF-Core.

Next, CN CP Function and CN UP Function are described.

The CN CP Function and the CN UP Function may be implemented by a single physical device or respective physical devices.

CN CP Function

QoS policies are stored in CN CP Functions. In session establishment, a subscriber or application-specific policies are transmitted to a CAF existed in a RAN and a CN CP Function.

CN UP Function

In a core, the UP Function takes charge of traffic charging support (CDR, granted quota for on-line) based on the policies considering outcome of a CAF. In addition, the CN UP function marks a downlink traffic transmitted to a RAN.

Policy Provisioning and Enforcement

An operator provides specific QoS policies to a subscriber of NG Core Cp function and an application. The CP function of the core provides the policies to the RAN and the CN UP function.

The execution actions are obtained from the policy points according to the current contents requirements of the user plane traffic mix, simultaneous competing flows, and network status and resource availability.

Charging

The Traffic charging 30020 support (CDR, granted quota for on-line) based on the policies considering outcome of a CAF is performed in the CN UP function.

Multiple Levels of Policies

Followings show other configuration of QoS policies provided with UP functions and RAN.

Intent level QoS policies representing a configuration of a floor may be identified by a packet marking, SDF descriptor, and the like in an abstract QoS target (e.g., voice type QoS, QoS, Smoothed Bit rate QoS (limit the bandwidth variation for the traffic), bulk traffic (a traffic may be discarded when radio conditions are not good or load of a cell is too excessive)).

Transport QoS level policies representing a configuration of a floor may be identified by a packet marking, SDF descriptor, and the like in an explicit QoS targets (priority, delay, jitter, etc.).

CP functions of a CAF-RAN and a CAF-Core are responsible for Transport locally map Intent level QoS policies belonged to QoS level policies based on local CAF policies and local (radio) condition (current context of user plane traffic mix, simultaneous competing flows and network status and resource availability), and limited by upper restrictions of intent level QoS policies.

Parameters Required for QoS Framework

The following parameters are required for defining QoS framework.

Policy description:

Range of definition: Application name or application type

Definition of Intent: High Definition experience for RT multimedia or explicit QoS target level (e.g., maximum packet delay 150 ms for IMS video)

Maximum Flow Bitrate: UL and DL bit rate value that may be applied for a single PDU session or combining PDU sessions for a given UE.

Allocation and Retention Priority level (ARP): A priority level that means pre-emption capability and vulnerability of the pre-emption for a given PDU session.

Figure 31:
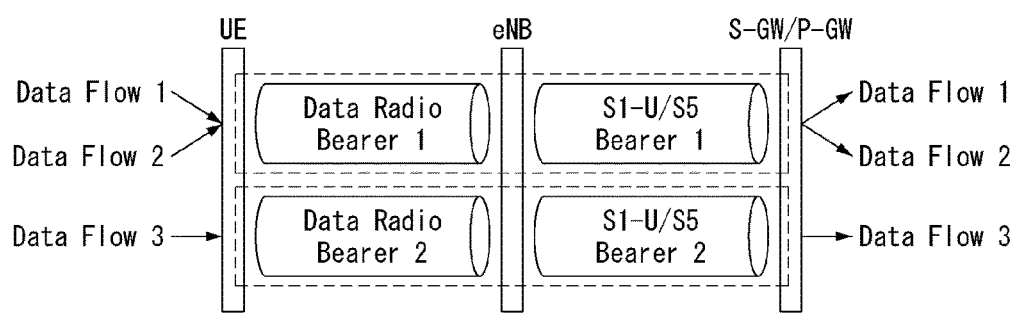
FIG. 31 is a diagram illustrating an example of a logical path for data transmission and reception.

FIG. 31 is a diagram illustrating an example of a logical path for data transmission and reception.

Referring to FIG. 31, a data flow of a user traffic classified by each service is transmitted through an EPS bearer according to each Quality of Service (QoS). For example, in the case that data flow 1 and data flow 2 are processed by the same QoS in FIG. 31, data flow 1 and data flow 2 are transmitted and received through the same EPS bearer. That is, data flow 1 and data flow 2 are transmitted and received between a UE and an eNB through the same DRB 1 and data flow 1 and data flow 2 are transmitted and received between an eNB and S-GW/P-GW through the same S1-U/S5 bearer 1.

However, data flow 3 that should be processed with different QoS from data flow 1 is transmitted and received by generating other EPS bearer from data flow 1.

As such, in the case that data is transmitted and received by generating respective logical path according to QoS, delay may occur in data transmission and reception owing to the time required for generating the logical path and multiple signaling.

In addition, many resources may be consumed for managing the generated logical path in a network.

Furthermore, the following problems are existed for generating and maintaining a logical path according to QoS in advance in order to reduce such delay.

Quality degradation for other service: Rate policing influences on other service quality (e.g., data rate).

Decrease of other user/service capacity: In the case that network resources are in short, owing to preempted resource (GBR), and the like, a request for generating a new logical path may be rejected or a logical path of which priority is low may be released.

Accordingly, in order to solve the problems, the present invention proposes a method for transmitting and receiving data without additional transmission delay while not influencing on a quality of other service.

In the present invention, a logical path means a path through which data (or message) moves, and may also be referred to various terms having the same or similar meaning such as a radio path, a session, a bearer, and the like.

Figure 32:
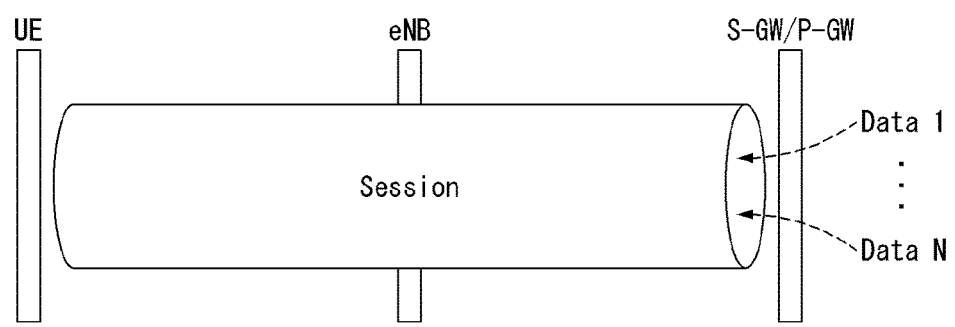
FIG. 32 is a diagram illustrating an example of a logical path for data transmission and reception to which the present invention is applied.

FIG. 32 is a diagram illustrating an example of a logical path for data transmission and reception to which the present invention is applied.

Referring to FIG. 32, the data having the same destination are transmitted and received through the same session (or logical path) even in the case that QoS is different. That is, in the case that a single or a plurality of data having the same destination is generated and transmitted/received, even in the case that the single or a plurality of data requires different QoS, the single or a plurality of data may be transmitted through the same session.

In this case, whenever each data is transmitted and received in the session, a configuration may be changed according to QoS of the data which is transmitted and received.

As another embodiment of the present invention, between the eNB and the S-GW/P-GW, a plurality of data of which QoS is different may be transmitted and received through the same data, and between the eNB and the UE, each logical path is configured according to QoS and data may be transmitted and received.

Through such a method, even in the case that QoS is different, the data having the same destination is transmitted and received through the same session, not configuring a separate session, and accordingly, delay in data transmission and reception may be reduced.

FIG. 33 is a diagram illustrating an example of configuring a logical path for data transmission and reception to which the present invention is applied.

Referring to FIG. 33, when uplink data or downlink data is generated, the generated data may be transmitted and received through a session which is previously generated.

Particularly, in FIG. 33, data flow 1 and data flow 2 are transmitted and received to/from S-GW/P-GW with the same QoS through session 1, and data flow 3 is transmitted and received to/from S-GW/P-GW, which is different from the S-GW/P-GW to which data flow 1 is transmitted, with different QoS from that of data flow 1 through session 2.

In this case, when data flow 4 transmitted and received to/from the same S-GW/P-GW as data flow 3 even in the case that data flow 4 has different QoS from data flow 3, data flow 4 may be transmitted and received through a preconfigured logical path.

First, (a) after a quality of session 2 previously generated is changed temporarily according to QoS of data flow 4, data flow 4 may be transmitted and received.

In this case, data flow 4 may be transmitted and received between a UE and an eNB, S-GW/P-GW through the logical path of which quality is changed temporarily.

Alternatively, (b) data flow 4 is transmitted and received by temporarily changing quality of a logical path between a UE and an eNB in session 2 previously generated according to QoS of data flow 4, and data flow 4 is transmitted and received between an eNB and S-GW/P-GW by generating a new logical path according to QoS of data flow 4.

As such, new data is generated, the generated data is transmitted and received by changing preconfigured quality of session without generating a separate session, and accordingly, delay may be reduced.

FIG. 34 is a diagram illustrating another example of configuring a logical path for data transmission and reception to which the present invention is applied.

Referring to FIG. 33, when uplink data or downlink data is generated, the generated data may be transmitted and received through a session which is previously generated or by generating a new session and through the generated session.

Particularly, in FIG. 34, data flow 1 and data flow 2 are transmitted and received to/from S-GW/P-GW with the same QoS through session 1, and data flow 3 is transmitted and received to/from S-GW/P-GW, which is different from the S-GW/P-GW to which data flow 1 is transmitted, with different QoS from that of data flow 1 through session 2.

In this case, when data flow 4 transmitted and received to/from the same S-GW/P-GW as data flow 3 even in the case that data flow 4 has different QoS from data flow 3, data flow 4 may be transmitted and received through a preconfigured logical path or a new logical path.

First, (a) in session 2 previously generated, only the quality of a logical path between an eNB and S-GW/P-GW is changed temporarily according to QoS of data flow 4, and data flow 4 may be transmitted and received. And a new logical path is generated according to QoS of data flow 4 between a UE and an eNB, and data flow 4 may be transmitted and received.

Alternatively, (b) a logical path between an eNB and S-GW/P-GW as well as a logical path between a UE and an eNB is also newly generated according to QoS of data flow 4, and data flow 4 may be transmitted and received.

Figure 35:
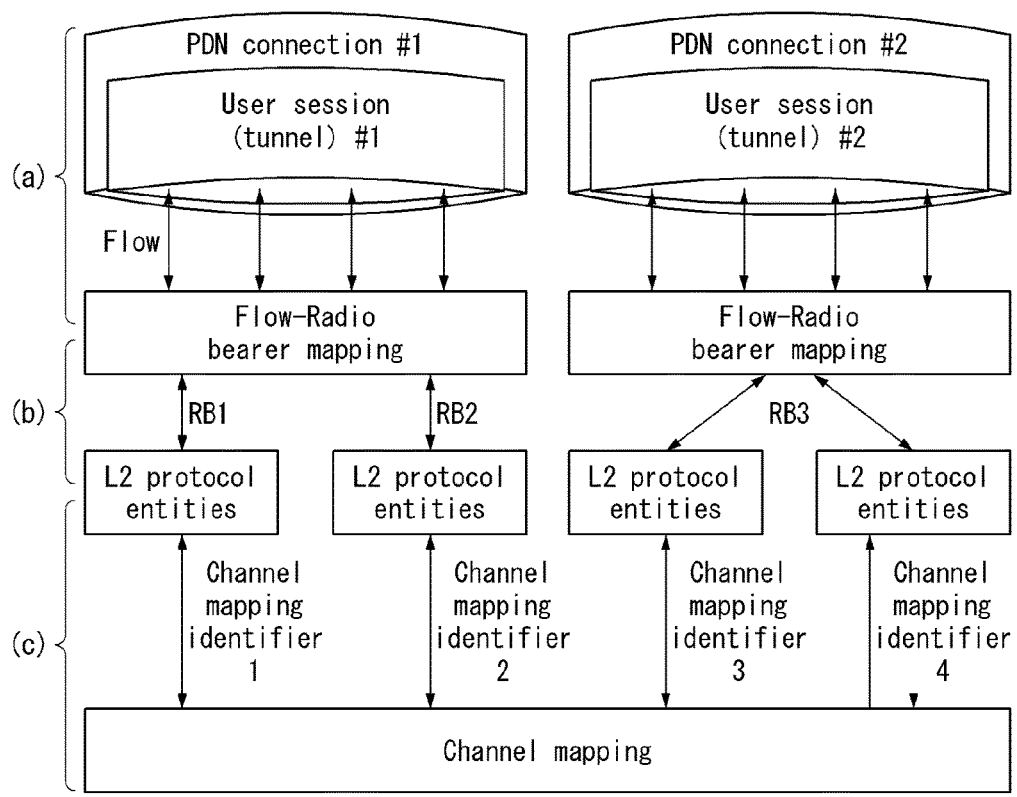
FIG. 35 is a diagram illustrating an example of a mapping relation between a path in a wired network and a path in a wireless network.

FIG. 35 is a diagram illustrating an example of a mapping relation between a path in a wired network and a path in a wireless network.

Referring to FIG. 35, when a PDN connection or a user session is established between a UE and a gateway, the path in a wired network between an eNB and a network node is mapped to the path in a wireless network between the eNB and the UE.

More particularly, the path in a wireless network is mapped to L2 Protocol entities, and L2 Protocol entities are mapped to respective transport channels.

Particularly, in the case that the preconfigured logical path is reconfigured according to a requested quality for generated data before a logical path configuration for data transmission and reception described in FIG. 32 to FIG. 34 is completed or without a path generation and data is transmitted and received, each of the logical paths may be mapped with each other.

Specifically, three types of mapping relation to be considered in a wireless network aspect may be existed as below such that a path in a wireless network (e.g., radio bearer and L2 Protocol entity) is determined according to a quality process for a path (e.g., Tunnel) in a wired network and data flow of the corresponding path in a wireless communication system.

As shown in FIG. 35, the mapping relation includes (a) mapping between a path in a wired network between an eNB and a network and a path in a wireless network between the eNB and a UE, (b) mapping between paths in a wireless network and (c) mapping between a path in a wireless network and a transport channel.

(a) Mapping Between a Path in a Wired Network and a Path in a Wireless Network

The mapping between a path in a wired network and a path in a wireless network means mapping between a path between an eNB and a network node and a path between a UE and the eNB.

In this case, a path in a single wired network may be mapped to a path in one or more wireless network, and a path in a single wireless network may be mapped to a path in only a single wired network.

(b) Mapping Between Paths in a Wireless Network

The mapping between paths in a wireless network means mapping between a logical path between a UE and an eNB and L2 Protocol entities.

In this case, two methods may be existed in the mapping between paths in a wireless network.

First, a single logical path may include L2 Protocol entities which are processed with the same quality. In the case that a new data flow should be transmitted and an additional quality configuration is setup, the existing L2 protocol entity may be changed in an environment according to the corresponding quality or a new L2 protocol entity may be associated with a newly generated logical path.

Second, a single logical path may include L2 Protocol entities which are processed with at least one different quality. In the case that QoS configuration is changed due to an additional data transmission, the existing L2 protocol entity may be changed in an environment according to the corresponding quality or a new L2 protocol entity may be associated additionally.

(c) Mapping Between a Path in a Wireless Network and a Transport Channel

The mapping between a path in a wireless network and a transport channel means mapping between L2 protocol entity and a transport channel.

In this case, four methods may be existed in a configuration of channel mapping identifier in the mapping between a path in a wireless network and a transport channel.

First, in the mapping between L2 protocol entity and a transport channel, a channel mapping identifier may include a channel mapping index.

Second, the channel mapping identifier may include a channel mapping index and quality/priority. In this case, the channel mapping index may be setup as a new value of channel mapping index.

Third, the channel mapping identifier may include a channel mapping index and quality/priority. In this case, the channel mapping index may be setup as a previous value of channel mapping index.

Fourth, the channel mapping identifier may include a session index and quality/priority.

At this time, in the case that data is transmitted without a separate quality configuration, the channel mapping identifier for the data may be constructed through the third or fourth method in order to represent a transport path and requested quality/priority of the data.

For example, an eNB that receives the channel mapping identifier together with uplink data may detect that a UE requests a data transmission which is not configured through the value of channel mapping identifier, and may transmit data through the path indicated by the channel mapping identifier by processing the data according to the quality indicated by the value.

Figure 36:
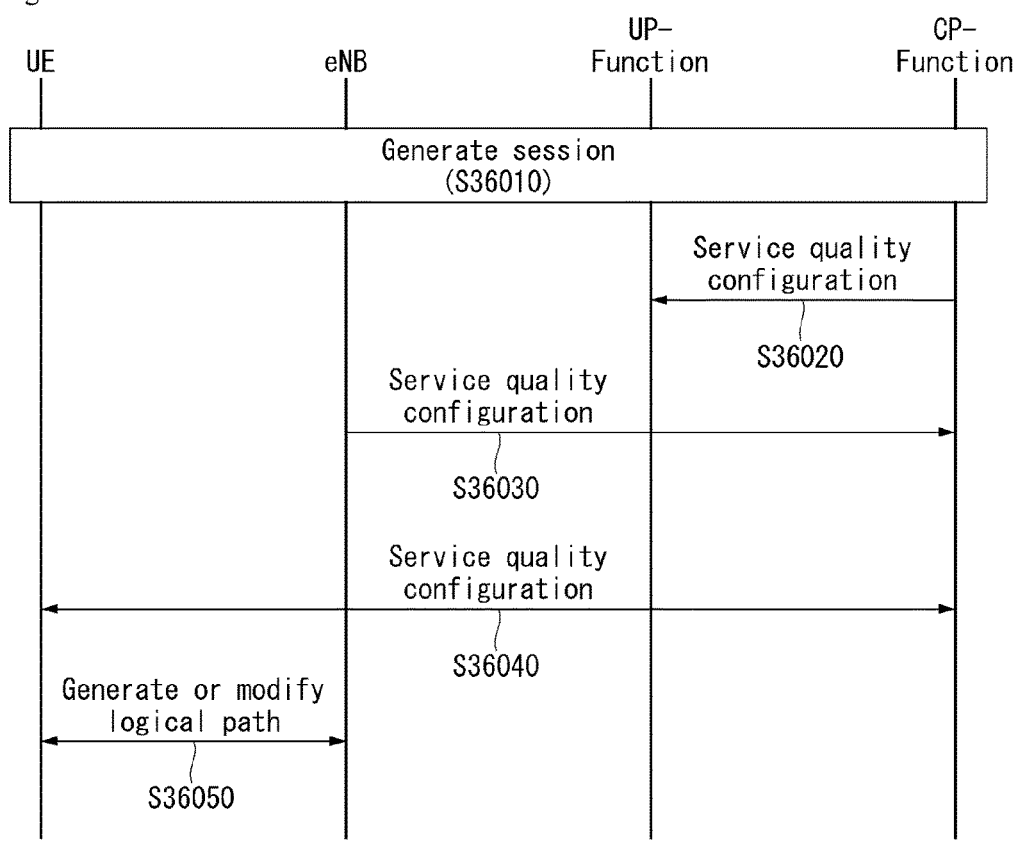
FIGS. 36 and 37 are diagrams illustrating an example of a method and mapping relation for transmitting information for path mapping to which the present invention may be applied.
Figure 37:
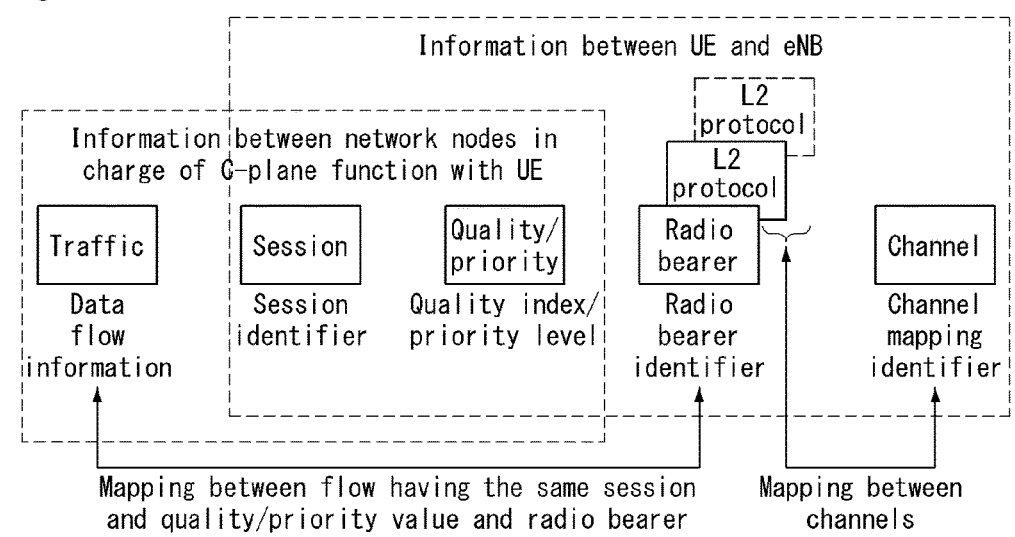

FIGS. 36 and 37 are diagrams illustrating an example of a method and mapping relation for transmitting information for path mapping to which the present invention may be applied.

Referring to FIG. 36 and FIG. 37, information for mapping between the path in a wired network and the path in a wireless network described in FIG. 35 may be received through a network node that performs C-plane function.

Particularly, a session (a first session) may be generated between a UE and a data network (step, S36010). The session may transmit all traffics in relation to the session without regard to QoS properties of an individual data traffic flow. QoS differentiation between multiple of data flows which is multiplexed in the same session may be provided through a QoS marking method which is applied to each packet.

The CP-Function that is a network node that performs the C-plane function may transmit identification information of data flow (e.g., flow descriptor, flow traffic template), a quality profile, configuration information in relation to priority (e.g., quality class index, quality profile index, flow priority indicator, guaranteed bit rate, maximum bit rate, priority level mapped to data quality, identification code of wireless quality, and flow priority level) and identification information of a session (e.g., PDN connection, user session, tunnel) to an eNB and a UE through step S36010.

In addition, one or more sessions may be generated in step S36010, and environmental information (e.g., logical wireless path identifier, quality information including configuration information in relation to priority, channel mapping identifier, etc.) of each session and a session identifier may be transmitted to the UE.

In the present invention, a logical wireless path may mean a wireless logical path for transmitting and receiving data between the UE and the eNB.

Through the information obtained through step S36010, the eNB and the UE may setup the mapping relation described in FIG. 36 as shown in FIG. 37.

The mapping relation may be used during the process that the eNB and the UE transmit and receive data.

eNB

Select a logical wireless path to process each downlink data flow which is received through a session Select a session to transmit the uplink data flow which is received through each logical wireless path

UE

Select a logical wireless path to process each uplink data flow

Table 5 below represents an example of a single session and a single logical wireless path mapped to it, and Table 6 below represents an example of two sessions and a single logical wireless path mapped to it.

TABLE 5

| Mapping between a path in a wired network and a path in a wireless network and mapping paths in a wireless network | | | Mapping between a path in a wireless network and a transport channel | | |
|---|---|---|---|---|---|
| | | | Element: | Element: (example: Binary format) | Element: |
| Session identifier | Quality/Priority | Radio bearer identifier | Channel mapping index | Channel mapping index, Quality/Priority | Session identifier, Quality/Priority |
| #1 | #3 | #1 | #1 | 0010011 | 0010011 |

TABLE 6

| Mapping between a path in a wired network and a path in a wireless network and mapping paths in a wireless network | | | Mapping between a path in a wireless network and a transport channel | | |
|---|---|---|---|---|---|
| | | | Element: | Element: | Element: |
| Session identifier | Quality/Priority | Radio bearer identifier | Channel mapping index | Channel mapping index, Quality/Priority | Session identifier, Quality/Priority |
| #1 | #3 | #1 | #1 | 0010011 | 0010011 |

Later, the CP-Function transmits information for modifying a preconfigured session and a logical wireless path and/or information for generating a logical wireless path and information for mapping in order to transmit data to the UP-Function, the eNB and the UE which are network nodes that perform U-Plane function through a service quality configuration message (steps, S36020, S365030 and S36040).

The service quality configuration message may include information of data flow to transmit, a quality profile corresponding to the data flow, configuration information in relation to priority and session identification information.

In the case that the UE is able to implicitly identify that the data flow is mapped to a certain logical path only with the data flow information, the service quality configuration message transmitted in step S36040 may not include the session identification information.

For example, the UE may identify it implicitly through the data flow information received in step S36010 and the field value (e.g., UP address source address of the UE) coincident between the data flow information received in step S36010 and the data flow information transmitted in step S36040.

Later, the eNB and the UE may generate or modify a logical wireless path between the eNB and the UE (step, S35050).

At this time, through the generation or modification process of the logical wireless path, the eNB may transmit an environmental configuration of each logical wireless path or environmental information (e.g., logical wireless path identifier, quality information including priority related configuration information, channel mapping identifier, etc.) for environmental reconfiguration and the identifier of the session to the UE.

Table 7 below is a table illustrating an example that newly generated two logical wireless paths are mapped to the preconfigured session in Table 5.

TABLE 7

| Mapping between a path in a wired network and a path in a wireless network and mapping paths in a wireless network | | | Mapping between a path in a wireless network and a transport channel | | |
|---|---|---|---|---|---|
| | | | Element: | Element: | Element: |
| Session identifier | Quality/Priority | Radio bearer identifier | Channel mapping index | Channel mapping index, Quality/Priority | Session identifier, Quality/Priority |
| #1 | #3 | #1 | #1 | 0010011 | 0010011 |
| | #1 | #2 | #2 | 0100001 or 0010001 | 0010001 |
| | #5 | #3 | #3 | 0110101 or 0010101 | 0010101 |

Table 8 below is a table illustrating an example that L2 protocol entity of different configuration is mapped to the preconfigured session and the existing logical priority path of Table 5.

TABLE 8

| Mapping between a path in a wired network and a path in a wireless network and mapping paths in a wireless network | | | Mapping between a path in a wireless network and a transport channel | | |
|---|---|---|---|---|---|
| | | | Element: | Element: | Element: |
| Session identifier | Quality/Priority | Radio bearer identifier | Channel mapping index | Channel mapping index, Quality/Priority | Session identifier, Quality/Priority |
| #1 | #3 | #1 | #1 | 0010011 | 0010011 |
| | #1 | #1 | #2 | 0100001 or 0010001 | 0010001 |
| | #5 | #1 | #3 | 0110101 or 0010101 | 0010101 |

As represented in Table 8, in the case of being mapped to the existing logical wireless path, since the UE may detect the session identifier implicitly, the session identifier may not be included in the message of generating or modifying the logical wireless path in step S36050.

Figure 38:
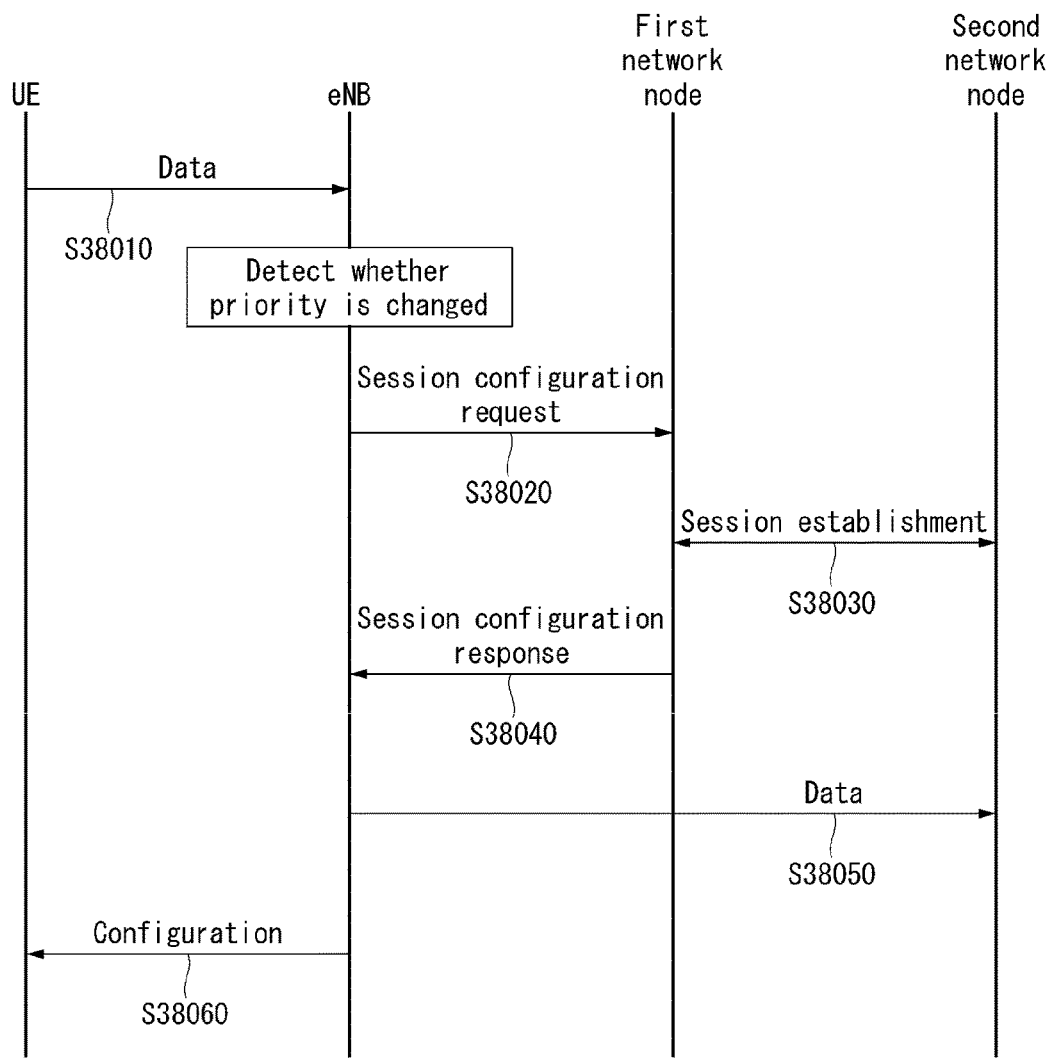
FIG. 38 is a flowchart illustrating an example of a method for transmitting and receiving data through a configuration of a logical path to which the present invention may be applied.

FIG. 38 is a flowchart illustrating an example of a method for transmitting and receiving data through a configuration of a logical path to which the present invention may be applied.

Referring to FIG. 38, when uplink data is generated, a UE may transmit the uplink data generated through a part of the previously configured logical path and a new logical path as in the method described in FIG. 33(b) or FIG. 34(b).

Hereinafter, in the present invention, transmission and reception of data through the whole or a part of configuration change of the logical path (including both of wired and wireless) which is previously configured as in the method described in FIG. 32 to FIG. 34 is referred to a priority inversion (PI).

Particularly, the UE may receive an identifier that represents whether an eNB supports a transmission through the priority change from the eNB and QoS profile (e.g., QCI, Guaranteed bit rate (GBR), Maximum bit rate (MBR), etc.) for a service in which a transmission through priority change is allowed, and configuration information (e.g., priority level, prioritizedBitRate, logicalChannelGroup) in relation to priority.

At this time, the information may be transmitted with being included in system information (e.g., SIB), an RRC message (e.g., RRC Connection Reconfiguration or step S36050) of FIG. 36 which is unicasted.

In the case that data of a service in which a transmission through the priority change is allowed is generated after detecting that the eNB supports the priority change, the UE transmits the data to the eNB (step, S38010).

At this time, the UE may transmit an identifier that the uplink data is data supporting the priority change to the eNB together.

In the case that a logical path is existed between the eNB and the UE that corresponds to the quality of the uplink data, the UE may transmit the uplink data to the eNB through it.

However, in the case that a logical path corresponding to the uplink data quality is not existed, the UE selects one of the preconfigured logical paths between the eNB and the UE, and transmits the uplink data to the eNB.

At this time, the configuration of the selected logical path may be changed according to the quality of the data.

In addition, the logical path to which the priority change is applied may be restricted by NAS message or AS message which is transmitted through a network.

The eNB that receives the data from the UE transmits a session configuration request message to a first network node in order to request to generate a session (a second session) that corresponds to a priority level of the data (step, S38020).

The session configuration request message may include parameters represented in Table 9 below.

TABLE 9

| Parameter | Descriptions |
|---|---|
| Linked session identity | Session identifier corresponding to LCID included in received data |
| Traffic flow aggregate | source/destination IP address and port number included in received data |
| Required QoS | Requested quality or quality profile index corresponding to a priority level of received data |
| Transport Layer Address | IP address of an eNB |
| GTP-TEID | Tunnel identifier for downlink use |

The first network node may establish a session (a second session) between the eNB and a second network node with the second network node through a session establishment process (step, S38030).

For example, the first network node may request a session configuration to the second network node represented by the Linked session identity included in the session configuration request message received from the eNB and may receive a response to it.

After receiving a response from the second network node, the first network node transmits a session configuration response message to the eNB in response to the session configuration request message (step, S38040).

The session configuration response message may include parameters as represented in Table 10 below.

TABLE 10

| Parameter | Descriptions |
| --- | --- |
| session identity | Generated session identifier |
| Linked session identity | |
| Traffic flow template | Final TFT |
| E-RAB ID | Generated E-RAB identifier |
| session QoS | Final session quality |
| E-RAB Level QoS Parameters | Final E-RAB Level quality |
| Transport Layer Address | S-GW IP address |
| GTP-TEID | Tunnel identifier of uplink use |

The eNB transmits the data to the second network node through the generated session (step, S38050).

Later, the eNB transmits a configuration message to the UE in order to generate a logical path between the eNB and the UE according to the parameter included in the session configuration response message (step, S38060).

At this time, in the case that Linked session identity, Traffic flow template, QoS and the like included in the session configuration response message are changed, the changed information may be included in the configuration message.

In this case, the configuration message may be an RRC Connection Reconfiguration message.

When the UE receives the configuration message or transmits a configuration response message to the eNB in response to the configuration message, the UE may stop the data transmission through priority change.

Later, when a logical path to which the quality of data is applied is generated between the eNB and the UE through step S38060, the UE may restart a transmission of the data through the logical path which is generated.

In addition, configurations of the session and the logical path that are previously configured are restored with the quality of previously transmitted data, and in the case that a transmission of the previous data is stopped; a transmission of the previous data is performed again.

Through such a method, data having different quality may be transmitted through preconfigured logical wireless path without newly generating a logical wireless path.

Figure 39:
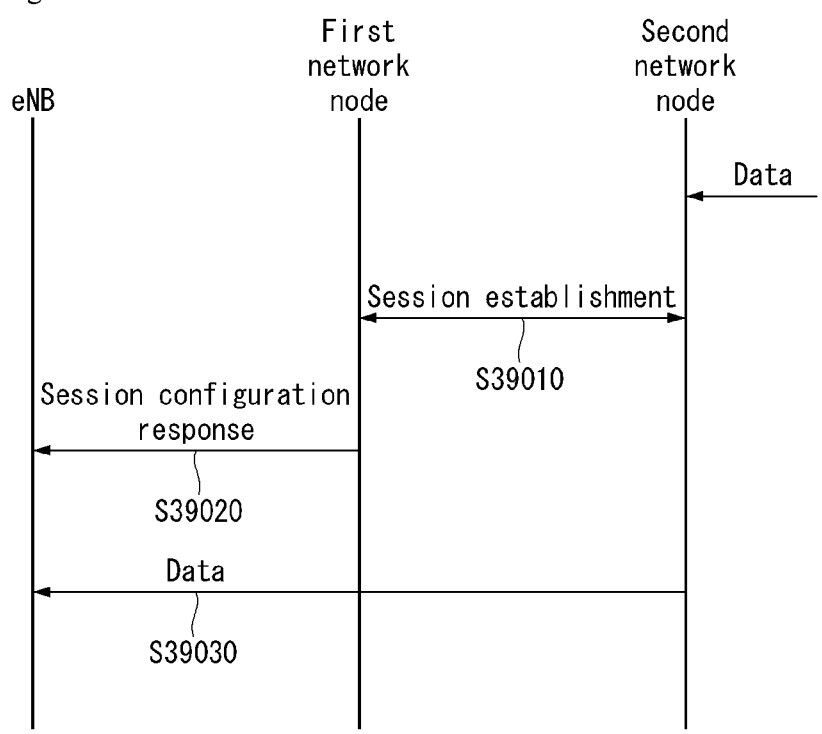
FIG. 39 is a flowchart illustrating another example of a method for transmitting and receiving data through a configuration of a logical path to which the present invention may be applied.

FIG. 39 is a flowchart illustrating another example of a method for transmitting and receiving data through a configuration of a logical path to which the present invention may be applied.

Referring to FIG. 39, different from FIG. 38, in the case that downlink data is generated, the data may be transmitted by using the preconfigured logical path through the priority change described above.

Particularly, when downlink data is generated, a second network node may establish a session (a first session) between the second network node and an eNB through a session establishment process with a first network node (step, S39010).

Later, the first network node transmits a session configuration response message to the eNB (step, S39020).

The session configuration response message may include parameters as represented in Table 11 below.

TABLE 11

| Parameter | Descriptions |
| --- | --- |
| session identity | Generated session identifier |
| Linked session identity | |
| Traffic flow template | Final TFT |
| E-RAB ID | Generated E-RAB identifier |

TABLE 11-continued

| Parameter | Descriptions |
| --- | --- |
| session QoS | Final session quality |
| E-RAB Level QoS Parameters | Final E-RAB Level quality |
| Transport Layer Address | S-GW IP address |
| GTP-TEID | Tunnel identifier of uplink use |

The second network node transmits downlink data to the eNB through the generated session (step, S39030), and the eNB transmits the downlink data to a UE.

In this case, the eNB may transmit an identifier indicating that the data supports the priority change together to the UE.

In the case that a logical wireless path corresponding to the quality of the downlink data is existed, the eNB may transmit the data through the path to the UE.

However, in the case that a logical wireless path corresponding to the quality of the downlink data is not existed, the eNB selects one of the previously configured logical paths and transmits the data to the UE through it.

In this case, a configuration of the selected logical path may be changed according to the quality of the downlink data.

In addition, the logical path to which the priority change is applied may be restricted by NAS message or AS message which is transmitted by a network.

Figure 40:
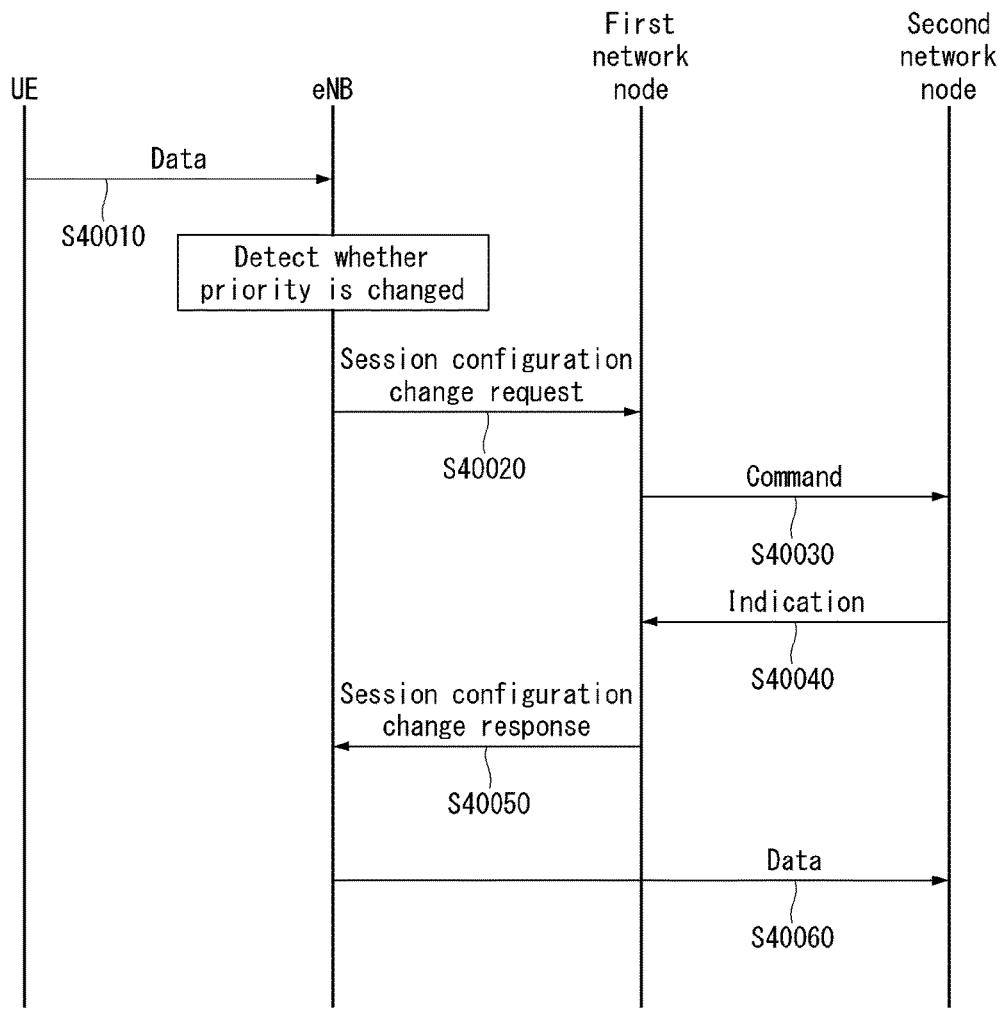
FIG. 40 is a flowchart illustrating an example of a method for transmitting and receiving data through a configuration change of a logical path to which the present invention may be applied.

FIG. 40 is a flowchart illustrating an example of a method for transmitting and receiving data through a configuration change of a logical path to which the present invention may be applied.

Referring to FIG. 40, when uplink data is generated, a UE may transmit the uplink data through a logical path which is previously configured as described in FIG. 33(a) or FIG. 34(a).

Particularly, after a session is configured through the method described in FIG. 36 and FIG. 37, the UE may receive an identifier indicating whether the eNB supports a transmission through the priority change, QoS profile (e.g., QCI, Guaranteed bit rate (GBR), Maximum bit rate (MBR), etc.) for the service in which a transmission through priority change is allowed and configuration information (e.g., priority level, prioritizedBitRate and logicalChannelGroup) in relation to priority.

At this time, the information may be transmitted with being included in system information (e.g., SIB), an RRC message (e.g., RRC Connection Reconfiguration or step S36050) of FIG. 36) which is unicasted.

In the case that data of a service in which a transmission through the priority change is allowed is generated after detecting that the eNB supports the priority change, the UE transmits the data to the eNB (step, S40010).

At this time, the UE may transmit an identifier that the uplink data is data supporting the priority change to the eNB together.

In the case that a logical wireless path is existed that corresponds to the quality of the uplink data, the UE may transmit the uplink data to the eNB through it.

However, in the case that a logical path corresponding to the uplink data quality is not existed, the UE selects one of the preconfigured logical paths, and transmits the uplink data to the eNB.

At this time, the configuration of the selected logical path may be changed according to the quality of the data.

In addition, the logical path to which the priority change is applied may be restricted by NAS message or AS message which is transmitted through a network.

The eNB that receives the data from the UE may detect that the uplink data is data transmitted through priority change.

In order to change a configuration of a session (a first session) mapped to the logical path used in the transmission of the uplink data according to a service quality (a first service quality) of the uplink data, the eNB transmits a session configuration request message to a first network node (step, S40020).

At this time, the session is a session generated for transmitting and receiving at least one data that requires a service quality (a second service quality) which is different from that of the uplink data.

The session configuration request message may include parameters represented in Table 12 below.

TABLE 12

| Parameter | Descriptions |
|---|---|
| Selected session identity | Session identifier corresponding to LCID included in received data |
| Traffic flow aggregate | source/destination IP address and port number included in received data |
| Required QoS | Requested quality or quality profile index corresponding to a priority level of received data |

The first network node that receives the session configuration request message performs a session configuration change process with a second network node.

For example, the first network node transmits a command that requests to change a configuration selected by the second network node according to a service quality of the uplink data (step, S40030).

The command may include an identifier indicating that a configuration of the selected session is temporarily changed according to a service quality of the uplink data.

In the case that the second network node permits the configuration change of the session, the second network node may transmit an indication message indicating a success of the session configuration change to the first network node (step, S40040).

The first network node that receives the indication message may know that the configuration of the selected session is modified according to the service quality of the uplink data, and may notify that the configuration of the selected session is changed by transmitting a session configuration change response message (step, S40050).

Later, the eNB transmits the uplink data to the second network through the selected session (step, S40060).

At this time, in the case that the at least one data transmitted previously in the selected session is consecutive data, the at least one data is needed to be retransmitted by restoring the configuration of the selected session to as the configuration before the change after the transmission of the uplink data is completed.

Accordingly, the eNB, the first network node and the second network node may store (or keep) the previous context information of the selected session.

Through such a method, by changing a logical path generated previously and a configuration of a session, data is able to be transmitted even in the case that a new logical path or session is not generated.

Figure 41:
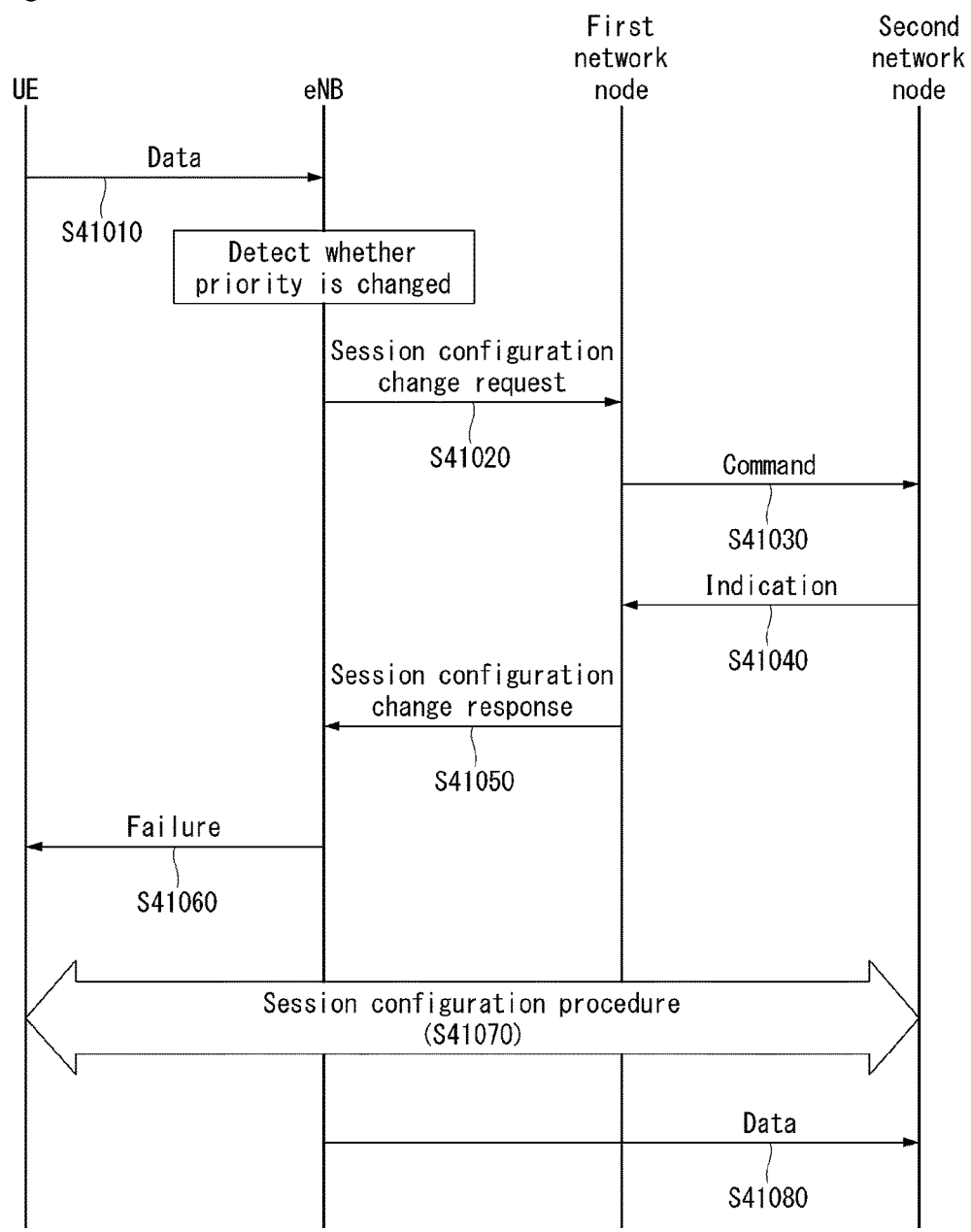
FIG. 41 is a flowchart illustrating another example of a method for transmitting and receiving data through a configuration change of a logical path to which the present invention may be applied.

FIG. 41 is a flowchart illustrating another example of a method for transmitting and receiving data through a configuration change of a logical path to which the present invention may be applied.

Referring to FIG. 41, when a configuration change of the selected session in FIG. 40 is failed, a new session is generated and uplink data may be transmitted.

First, since steps S41010 to S41030 are the same as steps S40010 to S40030 of FIG. 40, the description is omitted.

After step S40030, in the case that a change of the session is not allowed, a second network node may transmits an indication message indicating that a session configuration change is failed to the first network node (step, S41040).

The first network node that receives the indication message may know that a configuration change of the selected session is failed, and may notify that a configuration change of the selected session is failed by transmitting a session configuration change response message to the eNB (step, S41050).

Later, the eNB may notify that a configuration change of the previously configured session is failed to the UE (step, S41060), and may configure a new session (a second session) according to the first service quality through the method described in FIG. 21 to FIG. 23 (step, S41070).

At this time, step S41060 may not be performed.

The eNB transmits the uplink data to the second network node through the session generated according to the first service quality (step, S41080).

Figure 42:
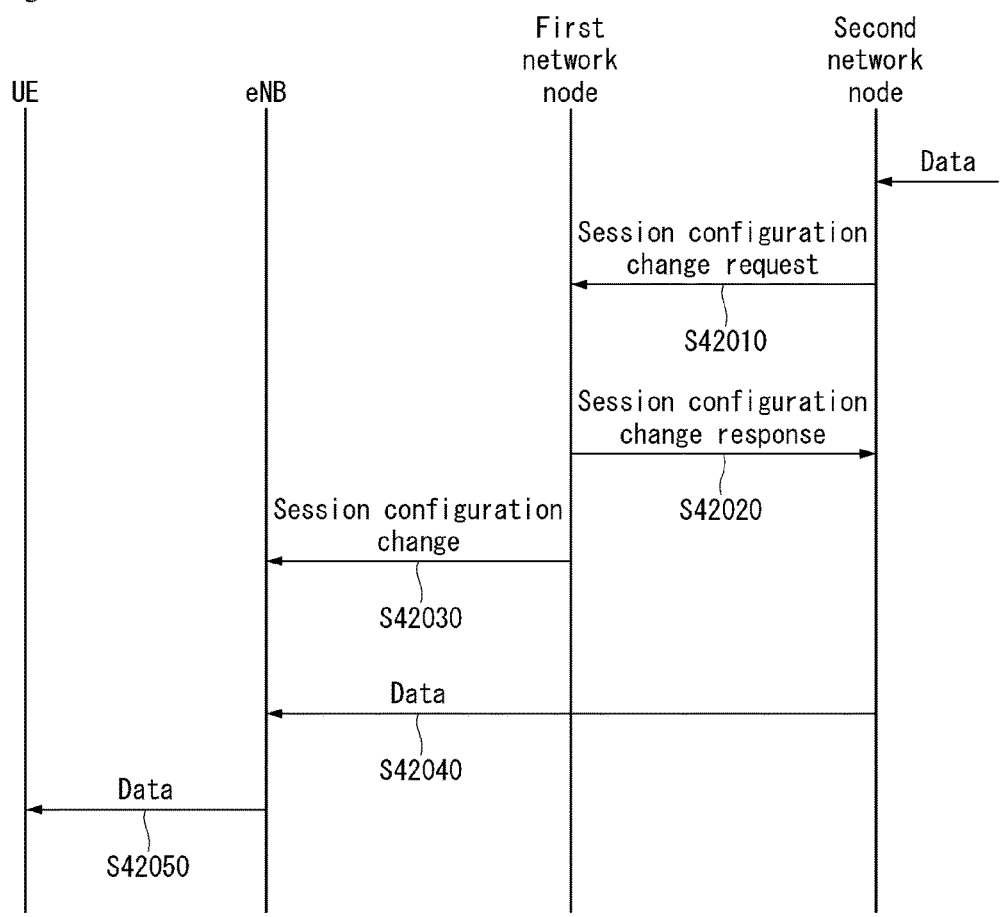
FIG. 42 is a flowchart illustrating another example of a method for transmitting and receiving data through a configuration change of a logical path to which the present invention may be applied.

FIG. 42 is a flowchart illustrating another example of a method for transmitting and receiving data through a configuration change of a logical path to which the present invention may be applied.

Referring to FIG. 42, when downlink data is generated, a UE may transmit the uplink data through a logical path which is previously configured as described in FIG. 33(a) or FIG. 34(a).

Particularly, after a session (a first session) is configured through the method described in FIG. 36 and FIG. 37, the UE may receive an identifier indicating whether the eNB supports a transmission through the priority change, QoS profile (e.g., QCI, Guaranteed bit rate (GBR), Maximum bit rate (MBR), etc.) for the service in which a transmission through priority change is allowed and configuration information (e.g., priority level, prioritizedBitRate and logical-ChannelGroup) in relation to priority.

At this time, the information may be transmitted with being included in system information (e.g., SIB), an RRC message (e.g., RRC Connection Reconfiguration or step S36050) of FIG. 36) which is unicasted.

Later, when downlink data of a service that supports the priority change is generated, the second network node selects a session for transmitting the downlink data among the preconfigured sessions based on an identifier indicating that it is data supporting the priority change transmitted together with the downlink data.

The second network node that selects the session for transmitting the downlink data performs a session configuration change process for changing the configuration of the selected session based on the service quality of the downlink data.

For example, the second network node transmits a session configuration change request message that requests to change a configuration of the selected by the first network node according to a service quality of the uplink data (step, S42010).

The session configuration change request message may include an identifier indicating that a configuration of the session is temporarily changed according to a service quality of the downlink data.

In the case that the first network node changes successfully the configuration of the session according to the service quality of the downlink data, the first network node may transmit an indication message indicating a success of the session configuration change to the second network node (step, S42020).

The first network node may transmit a session configuration change message including a session ID indicating a session in which the configuration is changed to the eNB (step, S42030).

Later, the second network node transmits the downlink data to the eNB through the session (step, S42040), and the eNB transmits the downlink data to the UE (step, S42050).

At this time, in the case that the at least one data transmitted previously in the selected session is consecutive data, the at least one data is needed to be retransmitted by restoring the configuration of the selected session to as the configuration before the change after the transmission of the uplink data is completed.

Accordingly, the eNB, the first network node and the second network node may store (or keep) the previous context information of the selected session.

Figure 43:
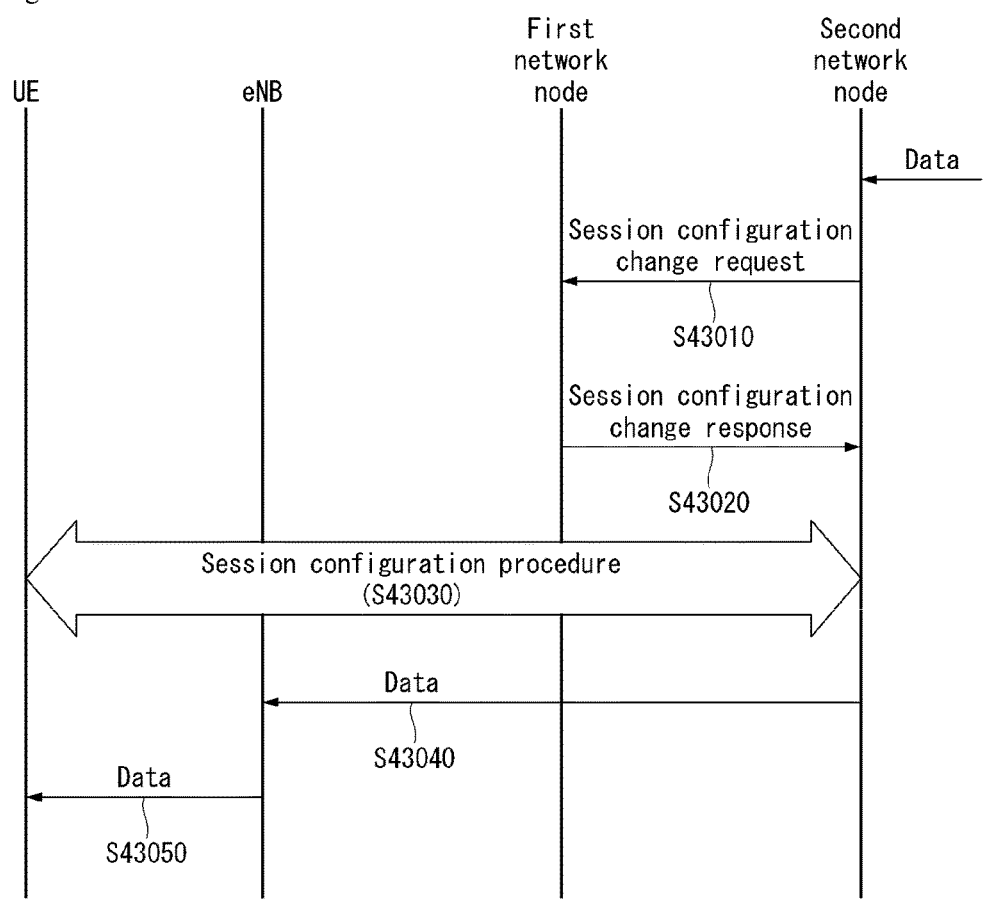
FIG. 43 is a flowchart illustrating another example of a method for transmitting and receiving data through a configuration change of a logical path to which the present invention may be applied.

FIG. 43 is a flowchart illustrating another example of a method for transmitting and receiving data through a configuration change of a logical path to which the present invention may be applied.

Referring to FIG. 43, when a configuration change of the selected session in FIG. 42 is failed, a new session is generated and uplink data may be transmitted.

First, since step S43010 is the same as step S42010 of FIG. 42, the description is omitted.

After step S42020, in the case that the first network node fails to change the session configuration, the first network node may transmits a session configuration change response message indicating that a session configuration change is failed to the second network node (step, S43020).

The second network node that receives the session configuration change response message may know that a change of the session configuration is failed.

Later, the second network node may configure a new session (a second session) through the method described in FIG. 21 to FIG. 23 (step, S43030).

The second network node transmits the downlink data to the eNB through the session generated according to the quality of the downlink data (step, S43040), and the eNB transmits the downlink data to the UE (step, S43050).

Figure 44:
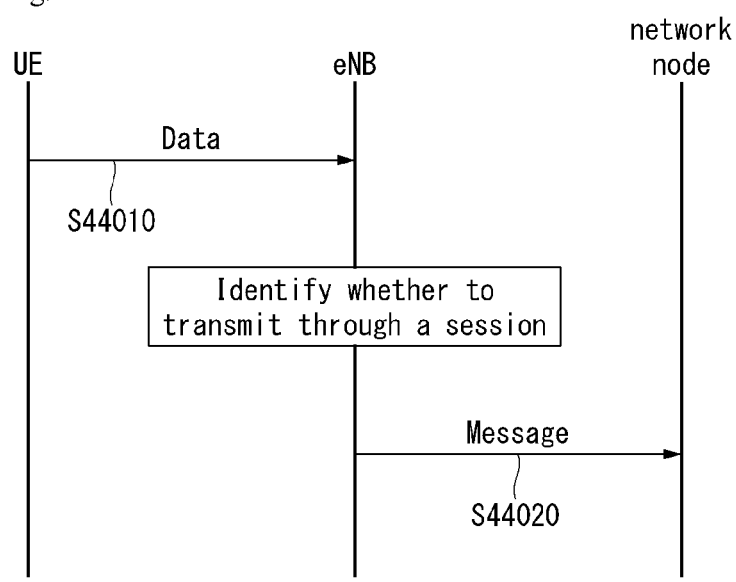
FIG. 44 is a flowchart illustrating an example of a method for transmitting and receiving data through a preconfigured logical path to which the present invention may be applied.

FIG. 44 is a flowchart illustrating an example of a method for transmitting and receiving data through a preconfigured logical path to which the present invention may be applied.

Referring to FIG. 44, when uplink data is generated, a UE may transmit the uplink data without generating a separate session according to a quality of the uplink data.

Particularly, a session may be configured through the method described in FIG. 36 and FIG. 37. At this time, the session may be configured for each network node.

At this time, the session may transmit all data transmitted to the same network node without regard to a quality of data as described in FIG. 36.

In addition, the session may be mapped to at least one logical wireless path. That is, the session generated between the eNB and the network node may be mapped to at least one logical wireless path which is generated between the UE and the eNB.

After the session is configured, the UE may receive an identifier indicating whether the eNB supports a transmission through the priority change, QoS profile (e.g., QCI, Guaranteed bit rate (GBR), Maximum bit rate (MBR), etc.) for the service in which a transmission through priority change is allowed and configuration information (e.g., priority level, prioritizedBitRate and logicalChannelGroup) in relation to priority.

At this time, the information may be transmitted with being included in system information (e.g., SIB), an RRC message (e.g., RRC Connection Reconfiguration or step S36050) of FIG. 36) which is unicasted.

After the UE detects that the eNB supports the priority change, when data of the service in which a transmission through the priority change is allowed is generated, the UE transmits the uplink data through the logical wireless path mapped to the session that corresponds to flow information of the data to the eNB (step, S44010).

The data may explicitly include a destination address field representing destination information to which the uplink data is transmitted, a source address field representing source information for transmitting the uplink data, data flow information, a session identifier indicating a session in which the data is transmitted, quality information of the data and priority information.

Alternatively, through the method described in FIG. 36, in the case that the eNB may detect a session identifier indicating a session mapped to the logical wireless path and a priority level of the session which is mapped, the data may not include the session identifier and the priority information.

In addition, the UE may transmit an identifier indicating that the uplink data is transmitted through a session without regard to a service quality of data together.

The eNB detects that the uplink data is data of a service that supports a transmission through a session without regard to the service quality of data using the identifier, and selects a session (a first session) by at least one of the channel mapping identifier value described in FIG. 35, the destination address field, the source address field, the data flow information, the session identifier, the quality information, or the priority information.

Later, the eNB transmits a message including the uplink data and a protocol header for transmitting and receiving data between the eNB and the network node to the network node through the session (step, S44020).

The protocol header includes a tunnel ID of a session identifier that corresponds to the channel mapping identifier included in the uplink data and a requested quality or quality profile index that corresponds to the priority level of the data.

The tunnel ID may be setup as a tunnel ID value of the session identifier for distinguishing the selected session.

In the case that the network node receives the message successfully, the network node transmits a response indicating a reception success to the eNB, and in the case that the network node fails to receive the message successfully, the network node transmits a response indicating a reception failure to the eNB.

Through such a method, a plurality of data of which quality is different but destination is the same may be transmitted and received through a single session.

Figure 45:
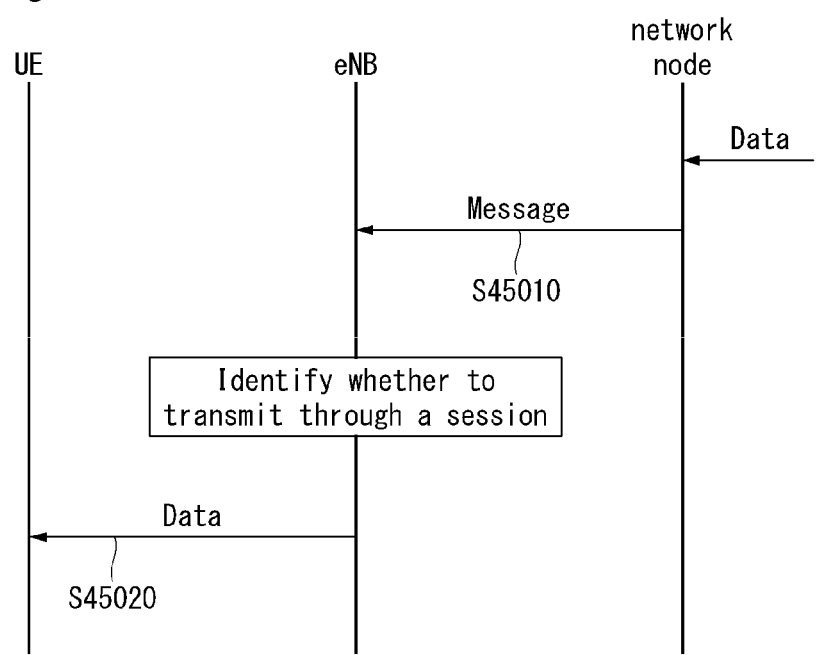
FIG. 45 is a flowchart illustrating another example of a method for transmitting and receiving data through a preconfigured logical path to which the present invention may be applied.

FIG. 45 is a flowchart illustrating another example of a method for transmitting and receiving data through a preconfigured logical path to which the present invention may be applied.

Referring to FIG. 45, when downlink data is generated, a network node may transmit the uplink data without generating a separate session according to a quality of the downlink data.

Particularly, a session may be configured through the method described in FIG. 36 and FIG. 37.

At this time, the session may transmit all data transmitted to the same network node without regard to a quality of data as described in FIG. 36.

In addition, the session may be mapped to at least one logical wireless path. That is, the session generated between the eNB and the network node may be mapped to at least one logical wireless path which is generated between the UE and the eNB.

After the session is configured, the UE may receive an identifier indicating whether the eNB supports a transmission through the priority change, QoS profile (e.g., QCI, Guaranteed bit rate (GBR), Maximum bit rate (MBR), etc.) for the service in which a transmission through priority change is allowed and configuration information (e.g., priority level, prioritizedBitRate and logicalChannelGroup) in relation to priority.

At this time, the information may be transmitted with being included in system information (e.g., SIB), an RRC message (e.g., RRC Connection Reconfiguration or step S36050) of FIG. 36) which is unicasted.

Later, when downlink data of which destination is toward the UE, the network node transmits a message including the data and a protocol header for transmitting and receiving data between the eNB and the network node to the eNB through the session (step, S45010).

The protocol header includes a tunnel ID of a session identifier that corresponds to the uplink data and a requested quality or quality profile index that corresponds to the priority level of the data.

The tunnel ID may be setup as a tunnel ID value of the session identifier for distinguishing the selected session.

In addition, the message may further include an identifier indicating that the downlink data is transmitted through a single session without regard to the quality of data.

The message may include a destination address field indicating destination information to which the downlink data is transmitted and a source address field indicating source information for transmitting the downlink data.

The network node may select a session for transmitting the message through at least one of the destination address field and the data flow information.

The eNB receiving the message recognizes that the downlink data is transmitted through one session regardless of service quality, and transmits the downlink data to the UE through the logical radio path mapped with the session (S45020).

Later, in the case that the UE receives the data successfully, the UE may transmit a response to it to the eNB.

As another embodiment of the present invention, in the method of changing a configuration of the previously configured session according to the service quality of uplink data or downlink data described in FIGS. 38 to 45, in the case that a transmission of at least one data which is transmitted before the configuration of the session is changed is stopped owing to the configuration change of the session, the changed configuration is restored again, and the transmission of at least one data which is transmitted previously may be performed again.

At this time, two cases are existed for the timing of restoring the changed configuration of the session as below.

First, in the case that a new session or a logical path is configured for transmitting and receiving uplink or downlink data, the changed configuration of the existing session may be restored when the new session or the logical path is generated.

Particularly, a UE, an eNB, a first network node and a second network node may perform a process for generating a new session with the transmission and reception of uplink or downlink data simultaneously.

Later, the UE or the second network node stops a transmission of the uplink or downlink data in the session which is previously generated at a specific timing (e.g., timing when the UE receives or transmits a message indicating a session generation completion).

And then, the UE or the second network node transmits the uplink or downlink data through the generated session, and the eNB may restore the configuration of the previously generated session by requesting a quality restoration to the network node at a specific timing, and may restart the transmission of the at least one data after the restoration is completed.

At this time, the data of RLC or PDCP unit which is normally transmitted until the stop timing of transmitting the at least one data may be stored in the eNB. Information of timer in relation to data transmission and the like may be suspended, and may be restarted when the new session is generated.

Second, a configuration of a previously generated session is changed only on a specific time, and uplink or downlink data may be transmitted and received.

Particularly, the configuration of the previously generated session is changed through a unicast or broadcast indication between the UE and the eNB, or the UE and the network node (the first network node and the second network node), and a specific time for transmitting and receiving uplink or downlink data may be configured.

Alternatively, the specific time may be configured through the session change process described in FIG. 40 to FIG. 44.

For example, the eNB and the network node may configure a start time, an end time and duration of a transmission of uplink or downlink data through the configuration change of the existing session.

When the specific time is ended, the transmission of uplink or downlink data is stopped and the changed configuration of the existing session is restored.

Particularly, the eNB may restore to the context of the existing session and/or the logical path, and may restore the changed configuration by requesting a network node to restore quality.

Alternatively, without separate signaling, a network may restore the changed configuration on the timing when the uplink or downlink transmission is stopped.

Later, through the session of which configuration is restored, a transmission of the at least one data which is previously transmitted may be restarted.

FIGS. 46 to 50 are diagrams illustrating an example of data structure to which the present invention may be applied.

Referring to FIG. 46 to FIG. 49, the data or message transmitted through the method described above may be transmitted in a MAC PDU format.

Particularly, in the case that the message is transmitted in a MAC PDU format, a UE may request a resource for transmitting the message through Buffer Status Report (BSR).

Figure 46:
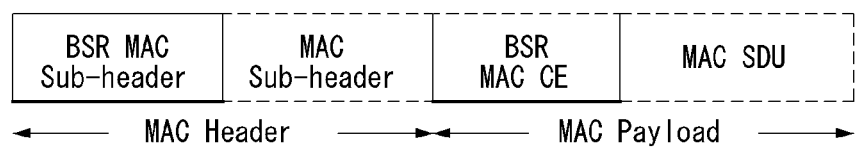

In the case that the BSR and the message are transmitted in a MAC PDU format, the BSR and the message may have the structure as shown in FIG. 46. That is, the BSR includes a BSR MAC sub header and a BSR MAC CE, and the message may include a MAC sub header and a MAC SDU.

Figure 47:
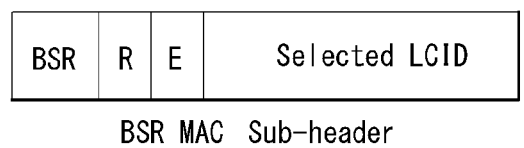

FIG. 47 shows an example of the BSR MAC sub header. The BSR MAC sub header may represent whether a MAC PDU to be transmitted includes a BSR MAC CE, a session selected for transmitting the message and a logical wireless path.

An eNB may know whether the BSR MAC CE is transmitted through the BSR MAC sub header.

Figure 48:
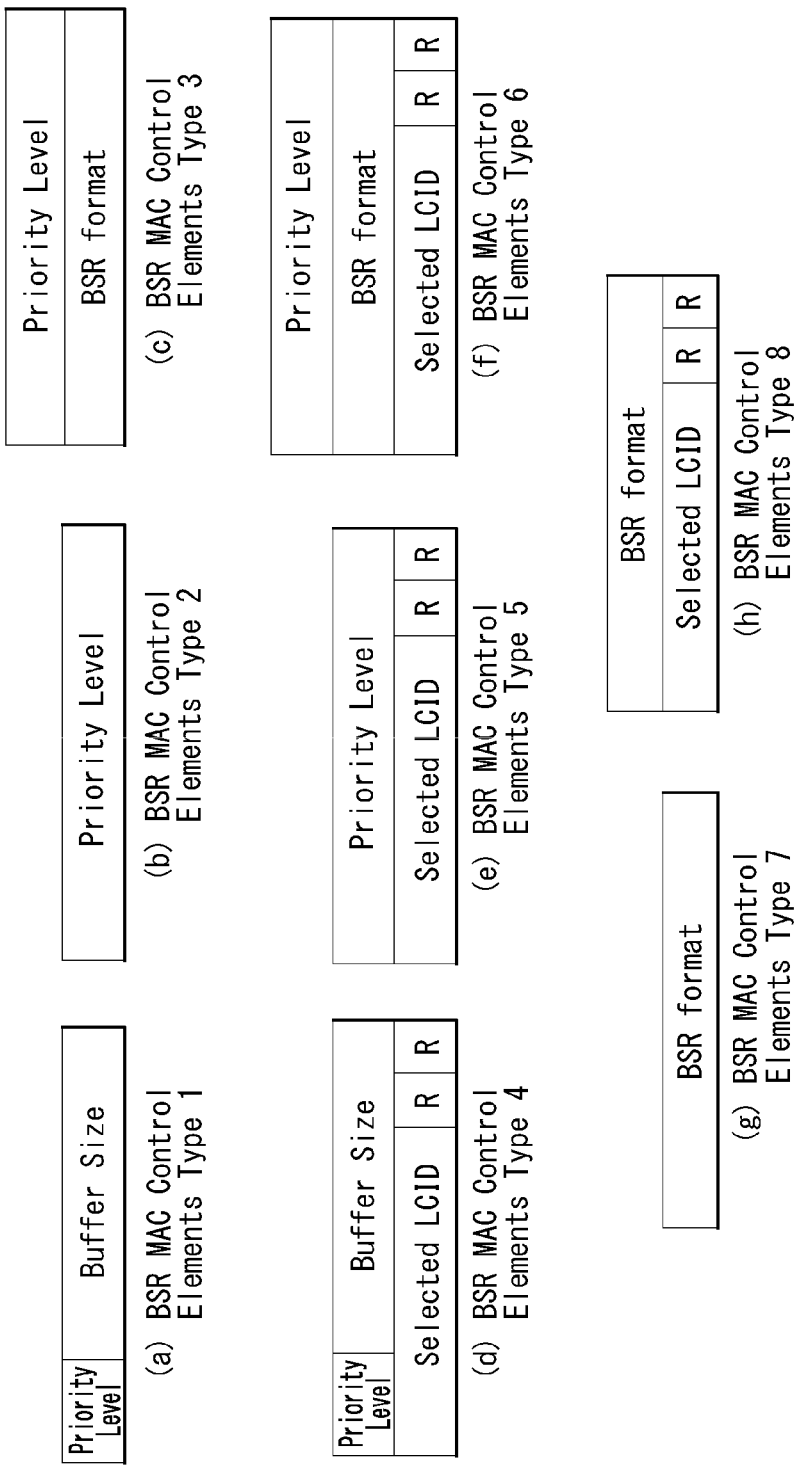

FIG. 48 shows an example of various types of the BSR MAC CE. As shown in FIG. 48, the BSR MAC CE may include a Priority Level, a Buffer Size, a session selected for transmitting the message and a Layer 2 identifier indicating a logical wireless path (e.g., Logical Channel Identifier (LCID)).

The eNB that receives the BSR may allocate a resource for transmitting the message to the UE by considering a priority level, a buffer size, and the like included in the BSR MAC CE. In the case that the priority level is different from the priority level configured in the existing logical wireless path which is selected, the eNB may change the priority level to a value included in the BSR MAC CE or a preconfigured value, or may add a priority level.

The UE may transmit the message to the eNB through the resource allocated from the eNB.

At this time, the message may include the MAC sub header and the MAC SDU as described above, and may include a MAC CE selectively.

FIG. 49(a) and FIG. 49(b) show an example of the MAC sub header, and FIG. 49(c) shows an example of the MAC CE.

As shown in FIG. 49(a) and FIG. 49(b), the MAC sub header may include an LCID indicating a session in which the message is transmitted and a logical wireless path, and a PI field indicating that the message is transmitted by changing or adding the quality of a preconfigured session and a preconfigured logical wireless path.

FIG. 50(a) and FIG. 50(b) are diagrams showing a PDCI PDU in the case that the message is processed in a PDCP.

A PI field in FIG. 50 indicates that the message is transmitted by changing or adding the quality of a preconfigured session and a preconfigured logical wireless path.

A quality management different from other quality management is required for the session and the logical wireless path selected for transmitting the message. Accordingly, the message is needed to be processed in the selected session and the logical wireless path according to a priority level of the message and QoS profile of the message, and so on.

Accordingly, since the quality of the session and the logical wireless path is changed or added based on a quality of the message, a priority with other sessions in the same UE may be changed temporarily.

That is, when new data that requires low latency occurs, without separate generation process of a session and a logical wireless path, the new data may be transmitted using the previously generated session and the logical wireless path.

In this case, the UE and the eNB may change or add the quality of the session and the logical wireless path dynamically such that the new data is processed according to the quality of the new data.

As another embodiment of the present invention, even in the case that the UE is in an idle state, the UE may transmit the message through a resource allocated by requesting a resource for transmitting the message.

At this time, the message may be transmitted by generating new session and logical wireless path, or may be transmitted by changing or adding the quality of the session and the logical wireless path preconfigured.

The UE may notify an identifier indicating that message is transmitted by changing or adding the quality of a session and a logical wireless path that are previously configured, session and logical wireless path identifiers, Layer 2 ID indicating a logical wireless path, a priority level and QoS profile index to the eNB through an RRC message or an L2 message/header/CE.

At this time, in the case that a network node or an eNB selects the session for transmitting the message, the identifier for the session and the logical wireless path may not be transmitted.

Such a method may also be used for downlink data transmission as well as uplink data transmission.

Figure 51:
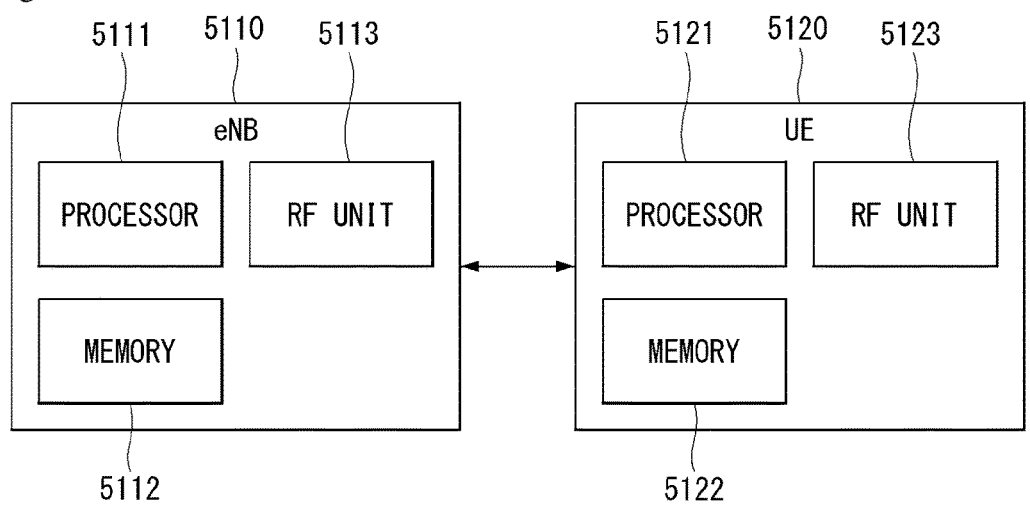
FIG. 51 is a diagram illustrating an inner block diagram of a wireless device to which the present invention may be applied.

FIG. 51 is a diagram illustrating an inner block diagram of a wireless device to which the present invention may be applied.

Here, the wireless device may be an eNB and a UE, and the eNB includes both of a macro eNB and a small eNB.

As shown in FIG. 51, the eNB 5110 and the UE 5120 include communication units (transmitting/receiving units, RF units, 5113 and 5123), processors 5111 and 5121, and memories 5112 and 5122.

The eNB and the UE may further input units and output units.

The communication units 5113 and 5123, the processors 5111 and 5121, the input units, the output units, and the memories 5112 and 5122 are operatively connected with each other in order to conduct the methods as proposed in the present disclosure.

The communication units (transmitting/receiving units or RF units, 5113 and 5123), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 5111 and 5121 implement functions, procedures, and/or methods as proposed in the present disclosure. The layers of radio interface protocols may be implemented by the processors.

The processors may be represented as control parts, controllers, control units, or computers.

The memories 5112 and 5122 are connected with the processors and store protocols or parameters for performing the method proposed in the present disclosure.

The processors 5111 and 5121 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for transmitting and receiving data performed by an eNB in a wireless communication system, comprising:
receiving a first message requesting a first service quality from a device,
wherein the first message includes a first indicator indicating a transmission through a configuration change of a preconfigured session;
selecting a first session for transmitting the first message according to a specific criteria among at least one preconfigured session,
wherein the first session is a session configured for transmitting at least one message requesting a second service quality;
transmitting a configuration change request message that requests a configuration change of the first session based on the first service quality to a network node;
receiving a configuration change response message indicating a configuration change result in response to the configuration change request message;
transmitting the first message through the first session or a second session according to the configuration change response message; and
performing a procedure for establishing a third session supporting the first service quality when the first message is transmitted through the first session,
wherein a configuration of the first session is temporarily changed according to the first service quality, and the configuration is changed back to a previous configuration after the first message is transmitted or the third session is established,
wherein the procedure for establishing the third session is performed simultaneously with transmitting the first message through the first session, and
wherein the first message includes at least one of a destination address field including destination information of the first message or a source address field including transmitter information of the first message.

2. The method of claim 1, wherein the first message is transmitted through the first session, when the configuration change response message indicates a configuration change success, and
wherein the method further comprises storing configuration information of the first session configured for transmitting at least one message requesting the second service quality before the configuration change of the first session.

3. The method of claim 1, wherein the first message is transmitted through the second session, when the configuration change response message indicates a configuration change failure.

4. The method of claim 3, further comprising:
transmitting a request message requesting a configuration of the second session to the network node; and
receiving a response message in response to the request message.

5. The method of claim 3, further comprising:
transmitting a request message requesting a logical wireless path configuration between the eNB and the device based on the first service quality to the device; and
receiving a response message in response to the request message.

6. The method of claim 1, further comprising:
receiving a second message including a second identifier indicating whether the eNB supports a transmission through a configuration change of a preconfigured session from the eNB.

7. The method of claim 1, wherein the specific criteria is one of a priority or a similarity with the first service quality.

8. The method of claim 2, further comprising:
recovering the configuration of the first session, when the procedure for establishing the third session is completed, by using the configuration information.

9. The method of claim 2, further comprising:
configuring a configuration change maintenance time of the first session based on the first service quality with the terminal or the network node.

10. The method of claim 9, further comprising:
recovering the configuration of the first session when the configuration change maintenance time expires, by using the configuration information.

11. The method of claim 1, wherein the procedure for establishing the third session is completed after the configuration of the first session is changed according to the first service quality.

12. A device for transmitting and receiving data in a wireless communication system, comprising:
a communication unit for transmitting and receiving a radio signal with exterior; and a processor functionally connected to the communication unit, wherein the processor is configured to perform:

receiving a first message requesting a first service quality from a device, wherein the first message includes a first indicator indicating a transmission through a configuration change of a preconfigured session;

selecting a first session for transmitting the first message according to a specific criteria among at least one preconfigured session, wherein the first session is a session configured for transmitting at least one message requesting a second service quality;

transmitting a configuration change request message that requests a configuration change of the first session based on the first service quality to a network node, wherein the configuration change of the first session is temporary;

receiving a configuration change response message indicating a configuration change result in response to the configuration change request message;

transmitting the first message through the first session or a second session according to the configuration change response message; and performing a procedure for establishing a third session supporting the first service quality when the first message is transmitted through the first session, wherein a configuration of the first session is temporarily changed according to the first service quality, and the configuration is changed back to a previous configuration after the first message is transmitted or the third session is established, wherein the procedure for establishing the third session is performed simultaneously with transmitting the first message through the first session, and wherein the first message includes at least one of a destination address field including destination information of the first message or a source address field including transmitter information of the first message.

13. The device of claim 12, wherein the procedure for establishing the third session is completed after the configuration of the first session is changed according to the first service quality.

* * * * *